United States Patent
Crocker et al.

(10) Patent No.: US 11,637,908 B2
(45) Date of Patent: Apr. 25, 2023

(54) APPARATUS, METHOD, AND COMPUTER PROGRAM PRODUCT FOR MODIFYING USER INTERFACES BASED ON AN APPLICATION CONTEXT-BASED CONCENTRATION MODE STATUS

(71) Applicant: Slack Technologies, LLC, San Francisco, CA (US)

(72) Inventors: Matthew Crocker, San Francisco, CA (US); Andrew Locascio, San Francisco, CA (US); Ohjoong Kwon, Sunnyvale, CA (US); Shiranka Arsiri Miskin, Palo Alto, CA (US); Machisté Naóri Quintana, San Francisco, CA (US)

(73) Assignee: Slack Technologies, LLC, San Francisco, CA (US)

( * ) Notice: Subject to any disclaimer, the term of this patent is extended or adjusted under 35 U.S.C. 154(b) by 0 days.

(21) Appl. No.: 16/938,604

(22) Filed: Jul. 24, 2020

(65) Prior Publication Data
US 2021/0029207 A1    Jan. 28, 2021

Related U.S. Application Data

(60) Provisional application No. 62/879,199, filed on Jul. 26, 2019.

(51) Int. Cl.
| | |
|---|---|
| *H04L 67/54* | (2022.01) |
| *G06F 3/0481* | (2022.01) |
| *H04L 65/403* | (2022.01) |

(52) U.S. Cl.
CPC ............ *H04L 67/54* (2022.05); *G06F 3/0481* (2013.01); *H04L 65/403* (2013.01)

(58) Field of Classification Search
CPC ...... H04L 67/24; H04L 65/403; G06F 3/0481
(Continued)

(56) References Cited

U.S. PATENT DOCUMENTS

| 2005/0055412 | A1* | 3/2005 | Kaminsky | .............. | H04L 51/04 |
|---|---|---|---|---|---|
| | | | | | 709/207 |
| 2006/0026253 | A1* | 2/2006 | Kessen | ................ | G06Q 10/107 |
| | | | | | 709/207 |

(Continued)

OTHER PUBLICATIONS

"Die, Email, Die! A Flickr Cofounder Aims To Cut Us All Some Slack", Readwriteweb, LexisNexis, https://advance.lexis.com/api/permalink/33dd79e2-90f5-409d-ae27-5a2c7e86bf31/?context=1000516. (dated Aug. 14, 2013, 4:15 PM) 2 pages.
(Continued)

*Primary Examiner* — Sherrod L Keaton
(74) *Attorney, Agent, or Firm* — Holland & Hart, LLP

(57) ABSTRACT

Systems, apparatuses, methods, and computer program products are provided for managing an application context-based concentration mode. Various embodiments of the present disclosure are directed to an improved group-based communication system, apparatus, method, and computer program products for managing a concentration mode associated with a group-based communication application. Specifically, embodiments are provided for setting (such as by activating and/or deactivating, as appropriate) a concentration mode associated with the group-based communication application to reflect a concentration mode status. In some embodiments, the concentration mode status is set to modify a rendering of at least one user interface associated with the group-based communication application.

20 Claims, 19 Drawing Sheets

(58) Field of Classification Search
USPC .......................................................... 715/751
See application file for complete search history.

(56) References Cited

U.S. PATENT DOCUMENTS

| | | | | |
|---|---|---|---|---|
| 2009/0100171 A1* | 4/2009 | Haynes | ................. | G06F 15/173 709/224 |
| 2012/0150789 A1* | 6/2012 | Jhoney | ............. | G06Q 10/06311 706/46 |
| 2018/0287982 A1 | 10/2018 | Draeger et al. | | |
| 2019/0073108 A1* | 3/2019 | Pourcyrous | ........... | G06F 3/0488 |

OTHER PUBLICATIONS

"How Slack changed the way we work by putting the customer experience first", Repeat Customer Podcast, Episode 3, [online][retrieved May 9, 2019]. Retrieved from the Internet: URL: https://www.zendesk.com/resources/slack-customer-experience/, (2019) 13 pages.

Adrienne LaFrance, "The Triumph of Email", Atlantic Online, LexisNexis, https://advance.lexis.com/api/permalink/32d7ddd9-d4c1-4a73-86f7-08ab5842fde6/?context=1000516, (dated Jan 6, 2 016) 5 pages.

David Auberbach, "Re-Animator. How Stewart Butterfield created Flickr and Slack out of the ashes of failed projects" [online][retrieved May 9, 2019]. Retrieved from the Internet: URL: https://slate.com/business/2014/05/stewart-butterfield-flickr-and-slack-how-he-snatched-victory-from-the-jaws-of-defeat.html (dated May 28, 2014, 2:48 PM) 8 pages.

Ernie Smith, "Picking Up The Slack", Tedium, [online][retrieved May 9, 2019]. Retrieved from the Internet: URL https://tedium.co/2017/10/17/irc-vs-slack-chat-history/. (dated Oct. 17, 2017) 13 pages.

Internet Relay Chat, Wikipedia, [online][retrieved May 30, 2019]. Retrieved from the Internet: URL: https://en.wikipedia.org/wiki/Internet_Relay_Chat. (dated May 28, 2019) 20 pages.

Jonathan Vanian, "Why these startups think chat apps are the next big thing in workplace collaboration", Gigaom, LexisNexis, https://advance.lexis.com/api/permalink/e83778c8-09c8-43aa-9ba0-88526283de69/?context=1000516, (dated Aug. 1, 2014, 5:45 PM) 4 pages.

Matsumoto, T. et al., "Chocoa Communicator—A New Communication System Based on Awareness and Text Communications-", Fujitsu Sci. Tech. J., 36, 2, (Dec. 2000) 154-161.

Matthew Ingram, "Flickr co-founder launches Slack, an all-in-one messaging tool designed to kill email forever", Gigaom, LexisNexis, https://advance.lexis.com/api/permalink/0b676b7c-aec3-4560-861e-d030d1dd008c/?context=1000516, (dated Feb. 12, 2014, 7:03 PM), 2 pages.

Michael Carney, "Slack is thriving on a cocktail of whimsy and great timing", Pandodaily, LexisNexis, https://advance.lexis.com/api/permalink/dd2d4ee5-2ddf-4d3a-a1d9-3bcee5e38b74/?context=1000516, (dated Feb. 6, 2015, 2:12 AM) 3 pages.

Mike Isaac, "Slack, a Start-Up With an App to Foster Business Collaboration, Is Valued at $1.1 Billion", The New York Times Blogs (Bits), LexisNexis, https://advance.lexis.com/api/permalink/3eb84b34-a8f9-4d7d-9573-89d9598a4963/?context=1000516. (dated Oct. 31, 2014) 2 pages.

Oikarinen, J. & Reed, D., "Internet Relay Chat Protocol", Request for Comments: 1459, Network Working Group, [online][retrieved May 30, 2019]. Retrieved from the Internet: URL: https://www.rfc-editor.org/rfc/rfc1459.txt. (dated May 1993) 57 pages.

Rebecca Walberg, "Email biggest office waste of time: survey", National Post, At FP10, LexisNexis, https://advance.lexis.com/api/permalink/96268e3f-26ad-48ac-a98f-6c39804ebded/?context=1000516, (dated Mar. 4, 2014) 2 pages.

Robert Hof, "Stewart Butterfield On How Slack Became A $2.8 Billion Unicorn", Forbes, [online][retrieved May 9, 2019]. Retrieved from the Internet: URL: https://www.forbes.com/sites/roberthof/2015/06/02/stewart-butterfield-on-how-slack-became-a-2-8-billion-unicorn-2/#7c31937d7d9c. (dated Jun. 2, 2015, 3;25 PM), 3 pages.

The Big Pivot w/ Slack's Stewart Butterfield, Masters of Scale Podcast, Episode 13 (Aired Nov. 14, 2017), https://mastersofscale.com/#/stewart-butterfield-the-big-pivot/, (dated Jan. 17, 2018) 27 pages.

\* cited by examiner

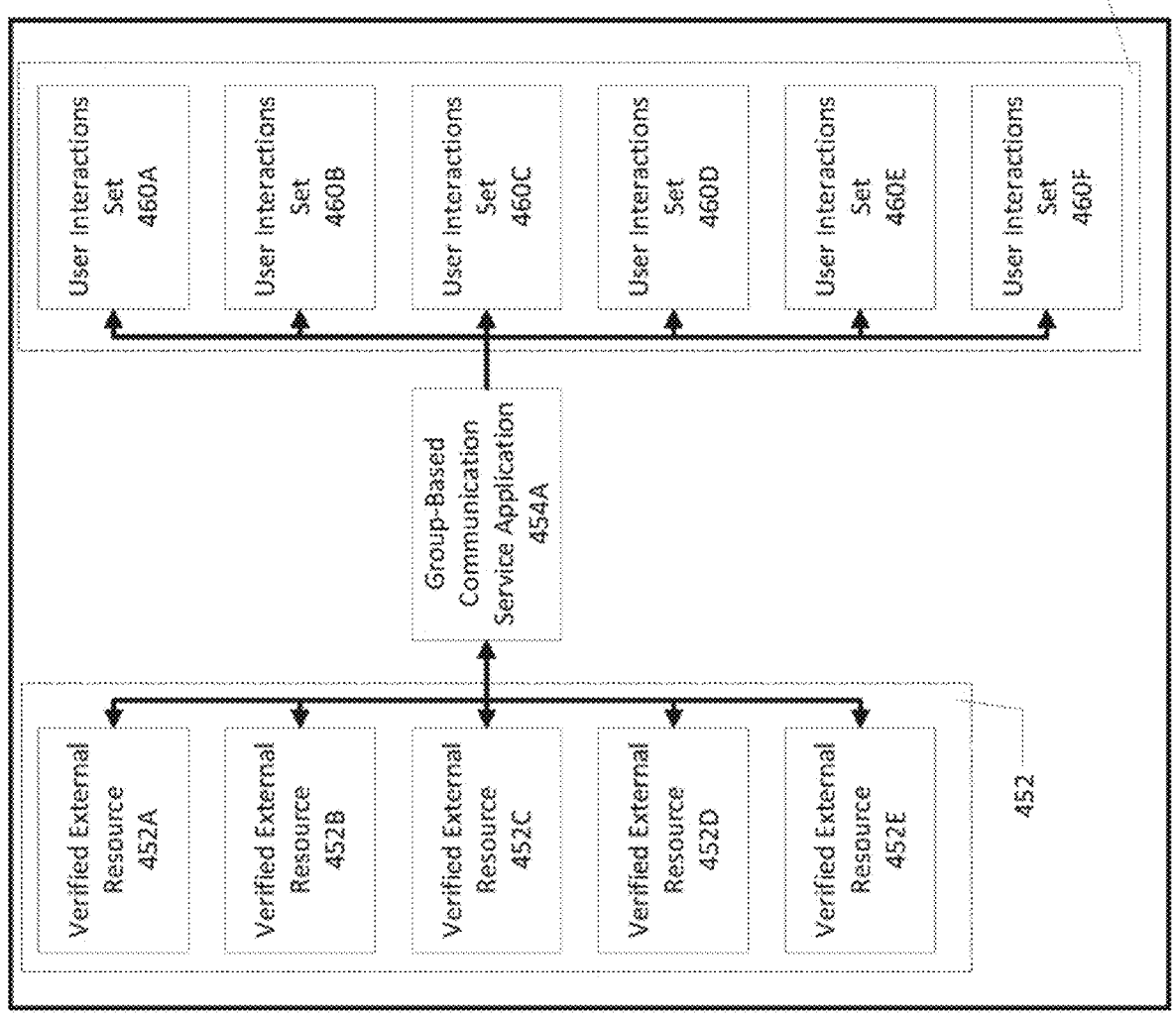

APPARATUS, METHOD, AND COMPUTER PROGRAM PRODUCT FOR MODIFYING USER INTERFACES BASED ON AN APPLICATION CONTEXT-BASED CONCENTRATION MODE STATUS

CROSS-REFERENCE TO RELATED APPLICATIONS

This application claims the priority of U.S. Provisional Application No. 62/879,199, filed Jul. 26, 2019, the entire contents of which are incorporated herein by reference.

TECHNOLOGICAL FIELD

Embodiments of the present disclosure relate, generally, to modifying interface renderings based on an application context-based concentration mode status, and more specifically, to application interaction signal detection and analysis for toggling activation of a concentration mode and/or toggling of one or more application settings of a group-based communication service application.

BACKGROUND

Various systems enable activation of a do-not-disturb mode for modifying one or more interfaces, for example based on user input regarding a preferred set of notifications based on a current focus of the user. Applicant has discovered problems with current systems, methods, apparatuses, and computer program products for management interfaces. Through applied effort, ingenuity, and innovation, Applicant has solved many of these identified problems by developing solutions embodied in the present disclosure, which are described in detail below.

BRIEF SUMMARY

In general, embodiments of the present disclosure provide methods, including computer-implemented methods, apparatuses, systems, computer program products, and/or the like, for detecting an application context signal set and analyzing the application context signal set for determining and setting a concentration mode status associated with modifying one or more interfaces rendered via a client device.

In embodiments, an apparatus for managing an application context-based concentration mode is provided. The apparatus comprises at least one processor and at least one memory, the at least one memory having computer-coded instructions therein, the computer-coded instructions configured to, in execution with the at least one processor, cause the apparatus to detect an application context signal set associated with user engagement, by a client device associated with a user account identifier, with an executed application set. In some embodiments, the apparatus is configured to generate an application context-based concentration score based on the application context signal set. In some embodiments, the apparatus is configured to transmit, to a group-based communication system, the application context-based concentration score. In some embodiments, the apparatus is configured to receive, from the group-based communication system, a concentration mode status indicator, wherein the concentration mode status indicator is generated by the group-based communication system based on the application context-based concentration score. In some embodiments, the apparatus is configured to modify a rendering within a user interface of the client device, based on a concentration mode status set according to the concentration mode status indicator, the rendering within the user interface associated with a group-based communication service application.

In some embodiments, to modify the rendering within the user interface, the apparatus is configured to determine the concentration mode status represents an activated status; and augment a rendering of an application task bar item.

In some embodiments, the apparatus is configured to identify a trained context-based concentration determination model based on the user identifier, the executed application set, or a combination thereof, and apply the application context signal set to the trained context-based concentration determination model to generate the application context-based concentration score.

In some embodiments, to detect at least a portion of the application context signal set, the apparatus is configured to determine at least an application full screen status associated with at least one executed application of the executed application set.

In some embodiments, to detect at least a portion of the application context signal set, the apparatus is configured to determine at least a focused application identifier.

In some embodiments, to detect at least a portion of the application context signal set, the apparatus is configured to parse a user interactions set to determine an application interactions rate associated with the executed application set.

In some embodiments, to detect at least a portion of the application context signal set, the apparatus is configured to detect at least one application context signal comprising a user interaction associated with the group-based communication service application; generate a user interactions set comprising the at least one application context signal; and store the user interactions set associated with the client device or the user account identifier.

In some embodiments, to detect at least a portion of the application context signal set, the apparatus is configured to detect at least one application context signal comprising a user interaction associated with a verified external resource accessed using the group-based communication service application; generate a user interactions set comprising the at least one application context signal; and store the user interactions set associated with the client device or associated with the user account identifier.

In some embodiments, the apparatus is configured to render a signal gathering approval interface. In some embodiments, the apparatus is configured to receive a signal gathering authentication in response to user engagement, via a client device, with the signal gathering approval interface. In some embodiments, the apparatus is configured to store, in a user approval database, the signal gathering authentication associated with the client device or associated with the user service account.

In embodiments, another apparatus for managing an application context-based concentration mode is provided. The apparatus comprises at least one processor and at least one memory, the at least one memory having computer-coded instructions therein, the computer-coded instructions configured to, in execution with the at least one processor, cause the apparatus to detect an application context signal set associated with user engagement with at least one executed software application; generate a concentration mode activation indicator based on the application context signal set; and modify a rendering within a user interface, based on a concentration mode status set according to the concentration mode activation indicator, the rendering within the user interface associated with a group-based communication service application.

In some embodiments, the apparatus is further configured to transmit, to a group-based communication system, the concentration mode activation indicator.

In some embodiments, to modify the rendering within a user interface of the client device, the apparatus is configured to determine the concentration mode status represents an activated status; and augment a task bar item based on the concentration mode status.

In some embodiments, the apparatus is further configured to identify a trained context-based concentration determination model, wherein to generate the application context-based concentration score, the apparatus is configured to apply the application context signal set to the trained context-based concentration determination model.

In some embodiments, to detect at least a portion of the application context signal set, the apparatus is configured to determine at least an application full screen status associated with the group-based communication service application executed by the apparatus or an external resource executed by the apparatus.

In some embodiments, to detect at least a portion of the application context signal set, the apparatus is configured to determine at least a focused application identifier.

In some embodiments, to detect at least a portion of the application context signal set, the apparatus is configured to parse a user interactions set to determine an application interactions rate associated with an executed applications set.

In some embodiments, to detect at least a portion of the application context signal set, the apparatus is configured to detect at least one application context signal comprising a user interaction associated with the group-based communication service application; generate a user interactions set comprising the at least one application context signal; and store the user interactions set associated with the client device or the user account identifier.

In some embodiments, to detect at least a portion of the application context signal set, the apparatus is configured to detect at least one application context signal comprising a user interaction associated with a verified external resource accessed using the group-based communication service application; generate a user interactions set comprising the at least one application context signal; and store the user interactions set associated with the client device or associated with the user account identifier.

In some embodiments, the apparatus is further configured to render a signal gathering approval interface. In some embodiments, the apparatus is further configured to receive a signal gathering authentication in response to user engagement with the signal gathering approval interface.

In embodiments, yet another apparatus for managing an application context-based concentration mode is provided. The apparatus comprises at least one processor and at least one memory, the at least one memory having computer-coded instructions therein, the computer-coded instructions configured to, in execution with the at least one processor, cause the apparatus to receive a concentration mode activation indicator or an application context-based concentration score. In some embodiments, the apparatus is configured to determine a concentration mode status based on the concentration mode activation indicator or the application context-based concentration score. In some embodiments, the apparatus is configured to identify a concentration profile based at least on the concentration mode status, the concentration profile comprising a group-based communication service application setting set. In some embodiments, the apparatus is configured to modify a rendering within a user interface based on the group-based communication service application setting set from the concentration profile, the rendering within the user interface associated with a group-based communication service application.

In some embodiments, the apparatus is configured to identify a current datetime timestamp, wherein the apparatus is configured to identify the concentration profile based on the concentration mode status and the current datetime timestamp.

In some embodiments, the group-based communication service application setting set comprises a communication notification setting, and the apparatus is configured to receive indication of a newly received group-based communication; determine whether the newly received group-based communication satisfies the group-based communication service application setting set; and generate notification information associated with the newly received group-based communication based on the determination, wherein the rendering is modified based on the notification information associated with the newly received group-based communication.

In some embodiments, the concentration mode status represents an activated status, and the apparatus is configured to transmit, to a second client device associated with a second user, a last active status associated with a first user based on the concentration mode status.

In embodiments still, yet another apparatus for managing an application context-based concentration mode is provided. The apparatus comprises at least one processor and at least one memory, the at least one memory having computer-coded instructions therein, the computer-coded instructions configured to, in execution with the at least one processor, cause the apparatus to receive a set of application context signal sets, the set of application context signal sets comprising at least one application context signal set, each application context signal set associated with a corresponding client device. In some embodiments, the apparatus is configured to train a context-based concentration determination model based on the set of application context signal sets. In some embodiments, the apparatus is configured to provide the trained context-based concentration determination model to at least one client device to cause the client device to set a concentration mode status based on an output from the trained context-based concentration determination model.

In some embodiments, the context-based concentration determination model comprises a machine learning model.

In some embodiments, the apparatus is configured to cause the client device to tune the context-based concentration determination model based on a user-specific application context signal set associated with the client device or a user account associated with the client device.

In other embodiments, one or more a computer-implemented method(s) for managing an application context-based concentration mode is provided. In embodiments, a computer-implemented method comprises one or more operational steps. In embodiments, a computer-implemented method comprises one or more operational steps described with respect to the embodiment apparatuses disclosed above.

In other embodiments, one or more computer program products for managing an application context-based concentration mode is provided. In embodiments, the computer program product comprises at least one non-transitory computer-readable storage medium having computer-executable program code instructions stored therein that, in execution with a processor, are configured to perform the one or more operational steps described with respect to the embodiment apparatuses disclosed above.

An exemplary apparatus for managing an concentration mode comprises at least one processor and at least one memory, the at least one memory having computer-coded instructions therein, the computer-coded instructions configured to, in execution with the at least one processor, cause the apparatus to: detect a set of signals associated with user engagement, by a client device associated with a user account identifier, with a set of executed applications; determine whether the set of signals satisfies at least one concentration criterion; in response to a determination that the set of signals satisfies the at least one concentration criterion, receive, from the group-based communication system, a status indicator, wherein the status indicator is generated by the group-based communication system; and modify a rendering within a user interface of the client device, based on the status indicator, wherein the rendering is within the user interface associated with a group-based communication application.

In some embodiments, determining whether the set of signals satisfies the at least one concentration criterion comprises at least one of: generating a concentration score based on the set of signals; identifying an output from a model based on the concentration score; determining an application full screen status associated with at least one executed application of the set of executed applications; and determining a focused application identifier.

In some embodiments, to modify the rendering within the user interface, the apparatus is configured to: determine the status indicator represents an activated status; and in response to determining that the status indicator represents an activated status, update the rendering within the user interface.

In some embodiments, the apparatus is further configured to: identify a trained model based on the user account identifier, the set of executed applications, or a combination thereof, and apply the set of signals to the trained model to generate a concentration score.

In some embodiments, to detect at least a portion of the set of signals, the apparatus is configured to: parse a set of user interactions to determine an application interactions rate associated with the set of executed applications.

In some embodiments, to detect at least a portion of the set of signals, the apparatus is configured to: detect at least one signal comprising a user interaction associated with an external resource accessed using the group-based communication application; generate a set of user interactions comprising the at least one signal; and store the set of user interactions associated with the client device or associated with the user account identifier.

In some embodiments, the apparatus is further configured to: render a signal gathering approval interface; receive a signal gathering authentication in response to user engagement, via the client device, with the signal gathering approval interface; and store, in a user approval database, the signal gathering authentication associated with the client device or associated with the user service account.

An exemplary computer-implemented method for managing an concentration mode comprises: detecting an set of signals associated with user engagement, by a client device associated with a user account identifier, with a set of executed applications; determining whether the set of signals satisfies at least one concentration criterion; in response to a determination the set of signals satisfies at least one concentration criterion, receiving, from the group-based communication system, a status indicator, wherein the status indicator is generated by the group-based communication system; and modifying a rendering within a user interface of the client device, based on the status indicator, wherein the rendering is within the user interface associated with a group-based communication application.

In some embodiments, determining whether the set of signals satisfies the at least one concentration criterion comprises at least one of: generating a concentration score based on the set of signals; identifying an output from a model based on the concentration score; determining an application full screen status associated with at least one executed application of the set of executed applications; and determining a focused application identifier.

In some embodiments, modifying the rendering within the user interface comprises: determining the status indicator represents an activated status; and updating the rendering within the user interface of the client device.

In some embodiments, the computer-implemented method further comprises: identifying a trained model based on the user account identifier, the set of executed applications, or a combination thereof, and applying the set of signals to the trained model to generate a concentration score.

In some embodiments, receiving at least a portion of the set of signals comprises: parsing a set of user interactions to determine an application interactions rate associated with the set of executed applications.

In some embodiments, receiving at least a portion of the set of signals comprises: detecting at least one signal comprising a user interaction associated with an external resource accessed using the group-based communication application; generating a set of user interactions comprising the at least one signal; and storing the set of user interactions associated with the client device or associated with the user account identifier.

In some embodiments, the computer-implemented method, further comprises: rendering a signal gathering approval interface; receiving a signal gathering authentication in response to user engagement, via the client device, with the signal gathering approval interface; and storing, in a user approval database, the signal gathering authentication associated with the client device or associated with the user service account.

An exemplary, non-transitory computer-readable storage medium stores one or more programs, the one or more programs comprising instructions, which when executed by one or more processors of an electronic device having a display, causes the electronic device to: detect a set of signals associated with user engagement, by a client device associated with a user account identifier, with a set of executed applications; determine whether the set of signals satisfies at least one concentration criterion; in response to a determination that the set of signals satisfies the at least one concentration criterion, receive, from the group-based communication system, a status indicator, wherein the status indicator is generated by the group-based communication system; and modify a rendering within a user interface of the client device, based on the status indicator, wherein the rendering is within the user interface associated with a group-based communication application.

In some embodiments, determining whether the set of signals satisfies the at least one concentration criterion comprises at least one of: generating a concentration score based on the set of signals; identifying an output from a model based on the concentration score; determining an application full screen status associated with at least one executed application of the set of executed applications; and determining a focused application identifier.

In some embodiments, to modify the rendering within the user interface, the apparatus is configured to: determine the status indicator represents an activated status; and in response to determining that the status indicator represents an activated status, update the rendering within the user interface.

In some embodiments, the apparatus is further configured to: identify a trained model based on the user account identifier, the set of executed applications, or a combination thereof, and apply the set of signals to the trained model to generate a concentration score.

In some embodiments, to detect at least a portion of the set of signals, the apparatus is configured to: parse a set of user interactions to determine an application interactions rate associated with the set of executed applications.

In some embodiments, the apparatus is further configured to: render a signal gathering approval interface; receive a signal gathering authentication in response to user engagement, via the client device, with the signal gathering approval interface; and store, in a user approval database, the signal gathering authentication associated with the client device or associated with the user service account.

An exemplary apparatus for managing an concentration mode comprises at least one processor and at least one memory, the at least one memory having computer-coded instructions therein, the computer-coded instructions configured to, in execution with the at least one processor, cause the apparatus to: detect an set of signals associated with user engagement with at least one executed software application; generate an activation indicator based on the set of signals; and modify a rendering within a user interface, based on the activation indicator, the rendering within the user interface associated with a group-based communication application.

In some embodiments, the apparatus is further configured to: transmit, to a group-based communication system, the activation indicator.

In some embodiments, to modify the rendering within a user interface of the client device, the apparatus is configured to: determine the activation indicator represents an activated status; and augment a task bar item based on the concentration mode status.

In some embodiments, the apparatus is further configured to: identify a trained model, wherein to generate the concentration score, the apparatus is configured to apply the set of signals to the trained model.

In some embodiments, to detect at least a portion of the set of signals, the apparatus is configured to: determine at least an application full screen status associated with the group-based communication application executed by the apparatus or an external resource executed by the apparatus.

In some embodiments, to detect at least a portion of the set of signals, the apparatus is configured to: determine at least a focused application identifier.

In some embodiments, to detect at least a portion of the set of signals, the apparatus is configured to: parse a set of user interactions to determine an application interactions rate associated with an executed applications set.

In some embodiments, to detect at least a portion of the set of signals, the apparatus is configured to: detect at least one signal comprising a user interaction associated with the group-based communication application; generate a set of user interactions comprising the at least one signal; and store the set of user interactions associated with the client device or the user account identifier.

In some embodiments, to detect at least a portion of the set of signals, the apparatus is configured to: detect at least one signal comprising a user interaction associated with a verified external resource accessed using the group-based communication application; generate a set of user interactions comprising the at least one signal; and store the set of user interactions associated with the client device or associated with the user account identifier.

In some embodiments, the computer-coded instructions are further configured to cause the apparatus to: render a signal gathering approval interface; and receive a signal gathering authentication in response to user engagement with the signal gathering approval interface.

An exemplary apparatus for managing an concentration mode comprises at least one processor and at least one memory, the at least one memory having computer-coded instructions therein, the computer-coded instructions configured to, in execution with the at least one processor, cause the apparatus to: receive a concentration mode activation indicator or a concentration score; determine a concentration mode status based on the concentration mode activation indicator or the concentration score; identify a concentration profile based at least on the concentration mode status, the concentration profile comprising a rendering rule; and modify a rendering within a user interface based on the rendering rule from the concentration profile, the rendering within the user interface associated with a group-based communication application.

In some embodiments, the computer-coded instructions are further configured to cause the apparatus to: identify a current datetime timestamp, wherein the apparatus is configured to identify the concentration profile based on the concentration mode status and the current datetime timestamp.

In some embodiments, the rendering rule comprises a communication notification setting, and wherein the apparatus is further configured to: receive indication of a newly received group-based communication; determine whether the newly received group-based communication satisfies the rendering rule; and generate notification information associated with the newly received group-based communication based on the determination, wherein the rendering is modified based on the notification information associated with the newly received group-based communication.

In some embodiments, the concentration mode status represents an activated status, and wherein the apparatus is further configured to: transmit, to a second client device associated with a second user, a last active status associated with a first user based on the concentration mode status.

In some embodiments, the apparatus comprises at least one processor and at least one memory, the at least one memory having computer-coded instructions therein, the computer-coded instructions configured to, in execution with the at least one processor, cause the apparatus to: receive a plurality of sets of signals, the plurality of sets of signals comprising at least one set of signals, each set of signals associated with a corresponding client device; train a model based on the plurality of sets of signals; and provide the trained model to at least one client device to: cause the client device to set a concentration mode status based on an output from the trained model.

In some embodiments, the model comprises a machine learning model.

In some embodiments, the apparatus is further configured to: cause the client device to tune the model based on a user-specific set of signals associated with the client device or a user account associated with the client device.

An exemplary computer-implemented method for managing an concentration mode comprises: detecting an set of signals associated with user engagement with at least one executed software application; generating a concentration mode activation indicator based on the set of signals; and modifying a rendering within a user interface, based on the concentration mode activation indicator, the rendering within the user interface associated with a group-based communication application.

In some embodiments, the computer-implemented method, further comprises: transmitting, to a group-based communication system, the concentration mode activation indicator.

In some embodiments, the rendering within a user interface of the client device comprises: determining the concentration mode status represents an activated status; and augmenting a task bar item based on the concentration mode status.

In some embodiments, the computer-implemented method of claim 36, further comprises: identifying a trained model, wherein generating the concentration score comprises applying the set of signals to the trained model.

In some embodiments, detecting at least a portion of the set of signals comprises: determining at least an application full screen status associated with the group-based communication application or an external resource.

In some embodiments, detecting at least a portion of the set of signals comprises: determining at least a focused application identifier.

In some embodiments, detecting at least a portion of the set of signals comprises: parsing a set of user interactions to determine an application interactions rate associated with an executed applications set.

In some embodiments, detecting at least a portion of the set of signals comprises: detecting at least one signal comprising a user interaction associated with the group-based communication application; generating a set of user interactions comprising the at least one signal; and storing the set of user interactions associated with the client device or the user account identifier.

In some embodiments, detecting at least a portion of the set of signals comprises: detecting at least one signal comprising a user interaction associated with a verified external resource accessed using the group-based communication application; generating a set of user interactions comprising the at least one signal; and storing the set of user interactions associated with the client device or associated with the user account identifier.

In some embodiments, the computer-implemented method further comprises: rendering a signal gathering approval interface; and receiving a signal gathering authentication in response to user engagement with the signal gathering approval interface.

An exemplary computer-implemented method for managing an concentration mode comprises: receiving a concentration mode activation indicator or a concentration score; determining a concentration mode status based on the concentration mode activation indicator or the concentration score; identifying a concentration profile based at least on the concentration mode status, the concentration profile comprising a rendering rule; and modifying a rendering within a user interface based on the rendering rule from the concentration profile, the rendering within the user interface associated with a group-based communication application.

In some embodiments, the computer-implemented method further comprises: identifying a current timestamp, wherein identifying the concentration profile based on the concentration mode status and the current timestamp.

In some embodiments, the rendering rule comprises a communication notification setting, and wherein the computer-implemented method further comprises: receiving indication of a newly received group-based communication; determining whether the newly received group-based communication satisfies the rendering rule; and generating notification information associated with the newly received group-based communication based on the determination, wherein the rendering is modified based on the notification information associated with the newly received group-based communication.

In some embodiments, the concentration mode status represents an activated status, and wherein the computer-implemented method further comprises: transmitting, to a second client device associated with a second user, a last active status associated with a first user based on the concentration mode status.

An exemplary computer-implemented method for managing an concentration mode comprises: receiving a plurality of sets of signals, the plurality of sets of signals comprising at least one set of signals, each set of signals associated with a corresponding client device; training a model based on the plurality of sets of signals; and providing the trained model to at least one client device for: causing the client device to set a concentration mode status based on an output from the trained model.

In some embodiments, the model comprises a machine learning model.

In some embodiments, the computer-implemented method further comprises: causing the client device to tune the model based on a user-specific set of signals associated with the client device or a user account associated with the client device.

An exemplary, computer program product for managing an concentration mode comprises at least one non-transitory computer-readable storage medium having computer-executable program code instructions stored therein, the computer-executable program code instructions, in execution with a processor, configured to: detect an set of signals associated with user engagement with at least one executed software application; generate an activation indicator based on the set of signals; and modify a rendering within a user interface, based on the activation indicator, the rendering within the user interface associated with a group-based communication application.

In some embodiments, the computer program product is further configured to: transmit, to a group-based communication system, the activation indicator.

In some embodiments, to modify the rendering within a user interface of the client device, the computer program product is configured to: determine the concentration mode status represents an activated status; and augment a task bar item based on the concentration mode status.

In some embodiments, the computer program product is further configured to: identify a trained model, wherein to generate the concentration score, the computer program product is configured to apply the set of signals to the trained model.

In some embodiments, to detect at least a portion of the set of signals, the computer program product is configured to: determine at least an application full screen status associated with the group-based communication application or an external resource.

In some embodiments, to detect at least a portion of the set of signals, the computer program product is configured to: determine at least a focused application identifier.

In some embodiments, to detect at least a portion of the set of signals, the computer program product is configured to: parse a set of user interactions to determine an application interactions rate associated with an executed applications set.

In some embodiments, to detect at least a portion of the set of signals, the computer program product is configured to: detect at least one signal comprising a user interaction associated with the group-based communication application; generate a set of user interactions comprising the at least one signal; and store the set of user interactions associated with the client device or the user account identifier.

In some embodiments, to detect at least a portion of the set of signals, the computer program product is configured to: detect at least one signal comprising a user interaction associated with a verified external resource accessed using the group-based communication application; generate a set of user interactions comprising the at least one signal; and store the set of user interactions associated with the client device or associated with the user account identifier.

In some embodiments, the computer program product is further configured to: render a signal gathering approval interface; and receive a signal gathering authentication in response to user engagement with the signal gathering approval interface.

An exemplary computer program product for managing an concentration mode comprises at least one non-transitory computer-readable storage medium having computer-executable program code instructions stored therein, the computer-executable program code instructions, in execution with a processor, configured to: receive a activation indicator or a concentration score; determine a concentration mode status based on the activation indicator or the concentration score; identify a concentration profile based at least on the concentration mode status, the concentration profile comprising a rendering rule; and modify a rendering within a user interface based on the rendering rule from the concentration profile, the rendering within the user interface associated with a group-based communication application.

In some embodiments, the computer program product is further configured to: identify a current timestamp, wherein the computer program product is configured to identify the concentration profile based on the concentration mode status and the current datetime timestamp.

In some embodiments, the rendering rule comprises a communication notification setting, and wherein the computer program product is further configured to: receive indication of a newly received group-based communication; determine whether the newly received group-based communication satisfies the rendering rule; and generate notification information associated with the newly received group-based communication based on the determination, wherein the rendering is modified based on the notification information associated with the newly received group-based communication.

In some embodiments, the concentration mode status represents an activated status, and wherein the computer program product is further configured to: transmit, to a second client device associated with a second user, a last active status associated with a first user based on the concentration mode status.

An exemplary computer program product for managing an concentration mode comprises at least one non-transitory computer-readable storage medium having computer-executable program code instructions stored therein, the computer-executable program code instructions, in execution with a processor, configured to: receive a plurality of sets of signals, the plurality of sets of signals comprising at least one set of signals, each set of signals associated with a corresponding client device; train a model based on the plurality of sets of signals; and provide the trained model to at least one client device to: cause the client device to set a concentration mode status based on an output from the trained model.

In some embodiments, the model comprises a machine learning model.

In some embodiments, the computer program product is further configured to: cause the client device to tune the model based on a user-specific set of signals associated with the client device or a user account associated with the client device.

BRIEF DESCRIPTION OF THE DRAWINGS

Reference will now be made to the accompanying drawings, which are not necessarily drawn to scale, and wherein:

FIGS. 4A-FIG. 4D illustrate example computing environments for detecting and maintaining one or more application context signal set(s), in accordance with example embodiments of the present disclosure;

DETAILED DESCRIPTION

Figure 1:
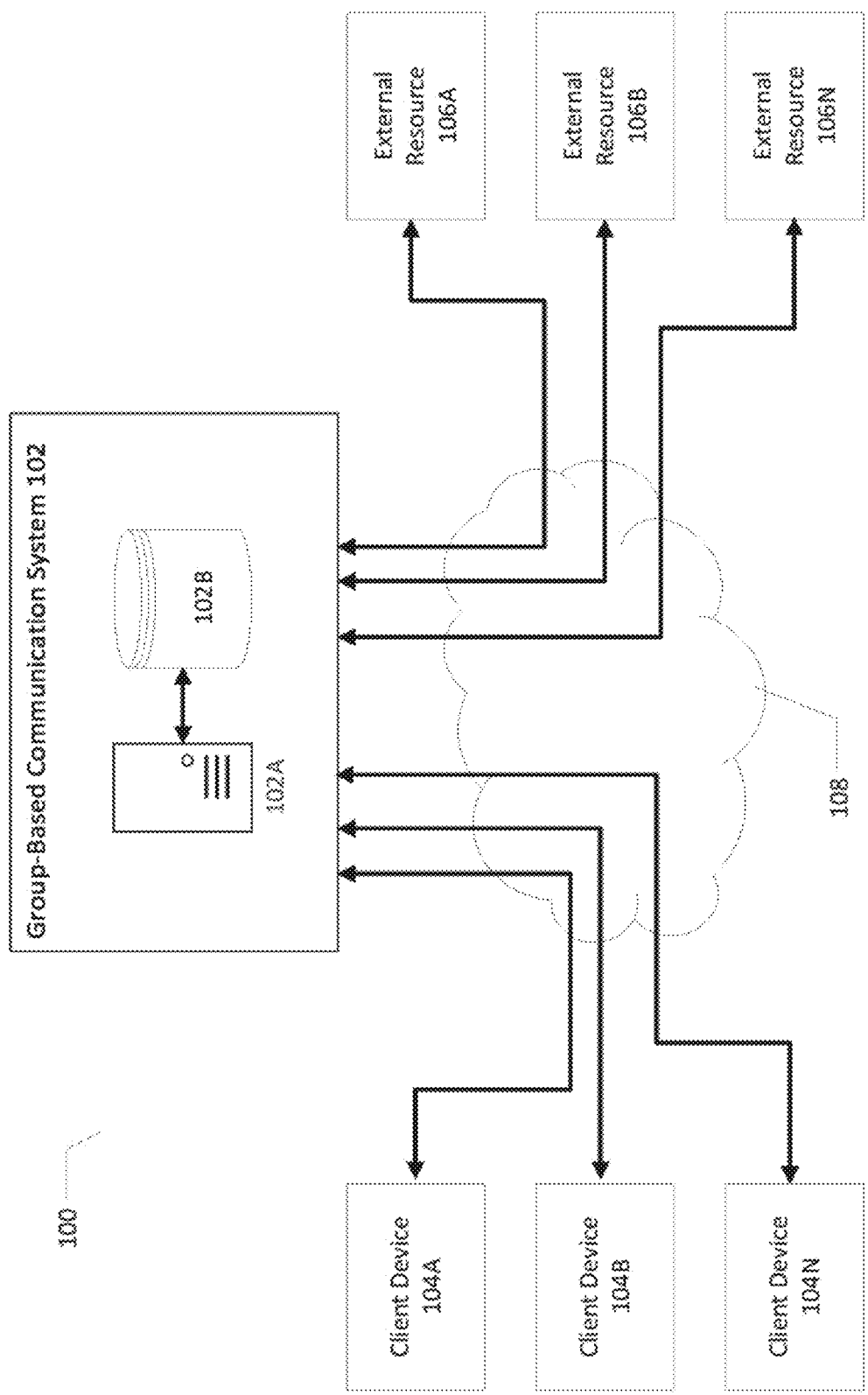
FIG. 1 illustrates a schematic view of a group-based communication system in communication with client devices and external resources, in accordance with example embodiments of the present disclosure.

The present disclosure more fully describes various embodiments with reference to the accompanying drawings. It should be understood that some, but not all embodiments are shown and described herein. Indeed, the embodiments may take many different forms, and accordingly this disclosure should not be construed as limited to the embodiments set forth herein. Rather, these embodiments are provided so that this disclosure will satisfy applicable legal requirements. Like numbers refer to like elements throughout.

Overview

In a group-based communication system, users associated with one or more user accounts communicate with one another in a myriad of ways. In some embodiments, the group-based communication system is a channel-based messaging platform. For example, a user account may be a member of one or more group-based communication interfaces, each group-based communication interface dedicated to a particular organizational group or team having a defined member list. The defined member list may be associated with a list of authenticated user accounts, where each authenticated user account is authenticated and/or permissioned to access the group-based communication interface to communicate with other authenticated user accounts within the group-based communication interface. For example, within a particular group-based communication interface, a user account may communicate with one or more other user accounts via one or many group-based communication channels accessible to the user account within the group-based communication interface.

To access functionality of a group-based communication system, a user may execute and utilize a group-based communication service application executed on a client device controlled by the user. For example, a user may access their user account by launching a group-based communication service application executed on a client device. The group-based communication service application may communicate with a group-based communication system to provide functionality of the group-based communication system to the user. A user may authenticate user account details with the group-based communication system, via the group-based communication service application for example, to access functionality specifically accessible by the corresponding user account (e.g., access group-based communication interfaces, group-based communication channels, verified external resources, and the like made accessible to the user account).

At any given moment, a user may be concentrating on a particular task, such as a work task. In such a circumstance, the user may be highly likely to ignore information received via the group-based communication service application (or particular information, such as communications of a particular type), and/or desire to minimize distractions associated with the group-based communication service application (e.g., notification information rendered associated with newly received group-based communications) to maintain concentration on the task being performed. Similarly, a user's concentration level may vary as time progresses. For example, at a particular time, a user may be in a circumstance of low concentration, such that all information may be provided to the user without detracting from the overall user experience, and/or the provided information is likely (e.g., above a certain prediction threshold) to be interacted with by the user. In other circumstances, a user may be moderately concentrating, such that some information (e.g., work communications) should be provided to the user while other information (e.g., social communications) should be suppressed. One or more settings associated with the group-based communication service application may be manually adjusted by a user as their concentration level changes, however such changes may be inefficient and slow user productivity, especially where a user's concentration levels change with more volatility. If a user must activate a do-not-disturb mode and deactivate the do-not-disturb mode, or set one or more setting values, manually each time a user is concentrating more (or less), such changes may break the user's concentration and contradict the goal of such actions.

In addition to accessing a group-based communication service application via a client device, a user may utilize one or more other applications via their client device. For example, at any given time, a user may have executed a group-based communication service application, browser application, word processing application, image processing application, and/or the like. In a work environment, for example, a user often utilizes a plurality of applications executed via their client device (e.g., a plurality of executed applications for performing various work tasks and communicating with work colleagues). In this regard, a particular application may not be able to determine a user's concentration level based solely on the user's use of the particular application alone. An accurate determination as to whether the user is concentrated or otherwise associated with a high concentration level may be inaccurate by purely analyzing a user's activity from the perspective of a single executed application alone.

In addition to the various benefits described above, an accurate and automatic determination regarding a user's concentration level provides particular technical advantages to the group-based communication system and/or the client device executing the group-based communication service application. For example, by determining an accurate concentration level, the group-based communication system and/or client device may conserve computing resources by providing and/or rendering only a subset of all group-based communications. By limiting the group-based communications provided to only a subset of group-based communications that satisfy particular settings and/or checks, the group-based communication system may conserve networking resources and improve overall network bandwidth. In some embodiments, interfaces for adjusting said settings are not rendered, thus saving computing resources and decluttering interfaces provided via the client device. By saving computer resources in the many ways identified above, and others, embodiments of the present disclosure further improve general computing systems using the particular concrete implementations provided herein.

Various embodiments of the present disclosure are directed to an improved group-based communication system, apparatus, method, and computer program products for managing an application-based concentration mode associated with a group-based communication service application. Specifically, embodiments are provided for setting (such as by activating and/or deactivating, as appropriate) a concentration mode associated with the group-based communication service application to reflect a concentration mode status. In some embodiments, the concentration mode status is set to modify a rendering of at least one user interface associated with the group-based communication service application. The user interface may be modified to indicate that the group-based communication service application has been set to a concentration mode, to modify rendered group-based communication information, and/or to modify notification information rendered for one or more newly received group-based communication(s). For example, the group-based communication service application may render notification information for group-based communication(s) received while concentration mode is not active (e.g., set to an inactive status), and not render notification information for some (or all) group-based communication(s) received while concentration mode is active. Alternatively, the notification information may be rendered when newly received group-based communication(s) satisfy a group-based communication service application settings set, which may be determined based on the concentration mode status.

In some example contexts, embodiments are provided to detect an application context signal set associated with user interactions with an executed application set. The user associated with a particular user account may engage with one or more application(s) of the executed application set via a client device, where the client device is associated with a user account identifier linked to the user account for the user. The application context signal set may include various user interactions and/or user interaction set(s) associated with user engagements and/or interactions of various types with the executed application set. For example, the application context signal set may include user taps, clicks, voice commands, keystrokes, commands, and/or the like for interacting with an executed application of the executed application set. Additionally or alternatively, of the application context signal set may include one or more user interaction(s) identifying the types of executed applications the user is interacting with, how often the user interacts with each executed application, actions per timestamp interval (e.g., actions per minute) associated with each or all executed application(s), and the like.

Each application context signal set may be analyzed to determine whether a user is concentrating or not concentrating, and/or the user's concentration level. For example, if the application context signal set indicates that the user is accessing a word processing threshold for a threshold percentage of time during a particular timestamp interval (e.g., more than 50% of an hour, or another percentage threshold and/or another timestamp interval) and is engaging with the word processing application above a certain interactions rate threshold (e.g., more than X keystrokes, clicks, and/or other interactions per minute, where X is a number), a system may determine the user is likely to be concentrating and thus a concentration mode should be activated (or set to a more-restrictive concentration mode status) to modify one or more renderings to a user interface of the group-based communication service application. Similarly, if the application context signal set indicates the user is accessing various different executed applications, and is associated with a very low interactions rate (e.g., less than Y keystrokes, clicks, and/or other interactions per minute, where Y is a number), and/or accessing particular executed applications designated as and/or determined to be associated with a low concentration level (e.g., the user is engaging exclusively with a video game application), a system may determine the user is likely associated with a low concentration level and a concentration mode should be deactivated (or set to a less-restrictive concentration mode status) to modify one or more renderings to the user interface of the group-based communication service application accordingly. It should be appreciated that, in various embodiments, a myriad of signal combinations may indicate that a particular user is concentrating and/or not concentrating.

The application context signal set may be manipulated and/or otherwise analyzed to set a concentration mode status. For example, the application context signal set may be used to generate an application context-based concentration score representing the concentration level associated with a user for a particular user account. The application context-based concentration score may be used by a group-based communication service application and/or a group-based communication system, to determine a concentration mode status to be set. In another example, the application context signal set may be used to generate a categorical determination, such as a concentration mode activation indicator, for setting a corresponding concentration mode. In some embodiments, the application context signal set is applied to a trained concentration determination model to generate the application context-based concentration score and/or concentration mode activation indicator, for example based on a detected application context signal set.

System Architecture and Example Apparatus

Methods, apparatuses, systems, and computer program products of the present disclosure may be embodied by any of a variety of devices. For example, the method, apparatus, system, and computer program product of an example embodiment may be embodied by a networked device (e.g., an enterprise platform), such as a server or other network entity configured to communicate with one or more devices, such as one or more client devices. Additionally or alternatively, the computing device may include fixed computing devices, such as a personal computer or a computer workstation. Still further, example embodiments may be embodied by any of a variety of mobile devices, such as a portable digital assistant (PDA), mobile telephone, smartphone, laptop computer, tablet computer, wearable, or any combination of the aforementioned devices. In yet other embodiments, the method, apparatus, system, and computer program product of an example embodiment may be embodied by a network device, for example a client device, configured to communicate with an enterprise platform, such as a group-based communication system.

FIG. 1 illustrates an example computing system within which embodiments of the present disclosure may operate. Users may access a group-based communication system 102 via a communications network 108 using any of a variety of client devices 104A-104N (collectively "client devices 104"). The group-based communication system 102 may comprise a group-based communication server 102A and a group-based communication repository 102B. Users may further access functionality, features, or services of one or more external resources 106A-106N (collectively "external resources 106") through the group-based communications system 102.

A user can include an entity, including, without limitation, an individual, a group of individuals, business, organization, and the like. Users may access a group-based communication system using one or more client devices. "Group-based" is used herein to refer to a system, channel, message, grid, or virtual environment that has security sufficient such that the system, channel, message, grid, or virtual environment is accessible only to a defined group of user accounts associated with a defined group of users. The group may be defined by common access credentials such as those of an organization or commercial enterprise. Access may further be facilitated by a validated request to join or an invitation to join transmitted by one group member user to another non-member user. Group identifiers (defined below) are used to associate data, information, messages, etc., with specific group(s) accessible via a group-based communication interface. In some embodiments, a user accesses the systems described herein via a client device. In an example context, a user accesses a group-based communication system via a corresponding user account.

In some embodiments, user profile, user account, and user account details include information associated with a user, including, for example, a user identifier, one or more group-based communication channel identifiers associated with group-based communication channels that the user has been granted access to, one or more group identifiers for group-based communication interfaces with which the user is associated, an indication as to whether the user is an owner/administrator of any group-based communication channels, an indication as to whether the user is an owner/administrator of any group-based communication interfaces, an indication as to whether the user has any group-based communication channel restrictions, a plurality of group-based communications, a plurality of emojis, a plurality of conversations, a plurality of conversation topics, an avatar, an email address, a real name (e.g., John Doe), a username (e.g., jdoe), a password, a time zone, a status, and the like. The user account details can include a subset designation of user credentials, such as, for example, login information for the user to authenticate their identity with a group-based communication system, including the user's username and password.

In some embodiments, a group-based communication interface includes a virtual communications environment or feed that is configured for rendering group-based communication channels and/or group-based communications, and external resources. In some embodiments, a group-based communication interface includes at least a channel selection interface for navigating to a group-based communication channel. Additionally or alternatively, in some embodiments, a group-based communication interface includes at least a selected communication channel interface that refers to a virtual communications environment or feed that is configured to display messaging communications posted by channel members (e.g., validated user accounts accessing the environment using client devices) that are viewable only by the members of the group-based communication channel. The format of the selected communication channel interface may appear differently to different members of the group-based communication channel, however, the content of the interface (i.e., the rendered group-based communications) will be displayed to each member of the group-based communication channel. For instance, a common set of group-based communications will be displayed to each member of the respective group-based communication channel that has navigated to or otherwise selected the group-based communication channel, such that the content of the selected communication channel interface will not vary per member of the group-based communication channel. In some embodiments, the selected communication channel interface is updated as a user associated with a user account navigates (or otherwise selects) a group-based communication channel for viewing, for example via a channel selection interface. Additionally or alternatively, in some embodiments, the group-based communication interface includes a flex interface that may change for each client device based on interactions by the user via the client device. For example, a flex interface may enable searching of one or more group-based communication channels for particular communication content, and update upon user engagement with a common identifier group-based communication to enable viewing of all group-based communications associated with the common identifier (for example all group-based communications forming a communication thread). The flex interface may be rendered to include various details associated with the user account, group-based communication.

The group-based communication system 102 can include a collection of computing services that are accessible to one or more client devices, and that are operable to provide access to a plurality of software applications related to operations of databases. In some examples, the group-based communication platform takes the form of one or more central servers in communication with, or otherwise communicable, with one or more additional servers running software applications, and having access to one or more databases storing electronically managed data objects, digital content items, application-related data, user accounts, and/or the like.

Each of client devices 104A-104N can include one or more computer hardware devices for accessing functionality facilitated by a group-based communication system, an external resource, and/or one or more software applications executable via the client device. In some embodiments, a client device is embodied by a mobile phone, wearable, tablet, personal computer, laptop, smart device, IoT device, or the like.

Communication network 108 may include any wired or wireless communication network including, for example and without limitation, a wired or wireless local area network (LAN), personal area network (PAN), metropolitan area network (MAN), wide area network (WAN), or the like, as well as any hardware, software and/or firmware required to implement it (such as, e.g., network routers, etc.). For example, communications network 108 may include a cellular telephone, an 802.11, 802.16, 802.20, and/or WiMAX network. Further, the communications network 108 may include a public network, such as the Internet, a private network, such as an intranet, or combinations thereof, and may utilize a variety of networking protocols now available or later developed including, but not limited to TCP/IP based networking protocols. For instance, the networking protocol may be customized to suit the needs of the group-based communication system. In some embodiments, the protocol is a custom protocol of JSON (JavaScript Object Notation) objects sent via a WebSocket channel. In some embodiments, the protocol is JSON over RPC ("remote procedural call), JSON over REST ("Representational State Transfer")/HTTP ("HyperText Transfer Protocol"), and the like.

Where a computing device is described herein to receive data from another computing device, it will be appreciated that the data may be received directly from another computing device or may be received indirectly via one or more intermediary computing devices, such as, for example, one or more servers, relays, routers, network access points, base stations, hosts, and/or the like, sometimes referred to herein as a network. Similarly, where a computing device is described herein to send data to another computing device, it will be appreciated that the data may be transmitted directly to another computing device or may be transmitted indirectly via one or more intermediary computing devices, such as, for example, one or more servers, relays, routers, network access points, base stations, hosts, and/or the like.

The group-based communication server 102A may be embodied as a computer or a plurality of computers. The group-based communication system may provide for various functionality associated with managing group-based communications within various group-based environments, and providing functionality associated with the external resources 106. In this regard, the group-based communication server 102A may provide for receiving of electronic data from various sources, including but not limited to the client device 104 and the external resources 106. For example, the group-based communication server 102A may be operable to receive and post, or transmit, group-based communications provided by one or more of the client devices 104. The group-based communication server 102A may access the communications network 108 to perform one or more of the operations described.

The group-based communication repository 102B may be embodied as a data storage device, such as a network attached storage (NAS) device or a plurality of NAS devices, or as a separate database server or plurality of servers. The group-based communication repository 102B includes information accessed and stored by the group-based communication server 102A to facilitate the operations of the group-based communication system 102. For example, the group-based communication repository 102B may include, without limitation, a plurality of group-based communications organized among a plurality of group-based communication interfaces, group-based communication channels, and/or the like. The group-based communication repository 102B may, additionally or alternatively, include information for authenticating users associated with one or more client device(s), and linking an authenticated user account with a client device for enabling an authenticated session.

Each of the client devices 104 may be any computing devices as defined above. Electronic data received by the group-based communication server 102A from the client devices 104 may be provided in various forms and via various methods. For example, the client devices 104 may include desktop computers, laptop computers, smartphones, netbooks, tablet computers, wearables, and the like. Each of the client devices 104 may be include a networking interface to enable such communications, and/or each of the client devices 104 may be associated with a device configured with a network interface to enable such communications (e.g., a wearable device connected to a smartphone).

In an example context, the client devices 104 may execute an application or "app" to interact with the group-based communication system 102. Such applications are typically designed to execute on computing devices dependent on the operating system and/or other configurations of the computing device. For example, an application may be provided that executes on mobile device operating systems such as iOS®, Android®, or Windows®. Alternatively, an application may be provided that executes on a personal computer operating system, such as Windows®, macOS®, Linux®, or another operating system executed on a laptop device, desktop device, or terminal device. These platforms typically provide frameworks that allow applications to communicate with one another and/or with particular hardware and/or software components of the client device. For example, the mobile operating systems and/or personal computer operating systems named above each provide frameworks for interacting with location services circuitry, wired and/or wireless network interfaces, user contacts, and other applications. In an example context, the application is embodied by a group-based communication service application provided by the group-based communication system. In some embodiments, the operating system provides frameworks for altering data controlled by the operating system and the group-based communication service application, for example data used in rendering a dock, status bar, task bar, and/or a task bar item associated with the group-based communication service application. Communication with hardware and software modules executing outside of the application is typically provided via one or more application programming interfaces (APIs) provided by the operating system for the client device and/or provided via an external resource.

Additionally or alternatively, the client devices 104 may interact with the group-based communication system 102 via a web browser. As yet another example, the client devices 104 may include various hardware, firmware, and/or software designed to interface with the group-based communication system 102.

Each of the external resources 106 represents an external system, resource, service, software application, computer, or the like, that a user of a client device associated with a corresponding group-based communication system user account may access via the group-based communication system 102. For example, the group-based communication system 102 may access an external resource via one or more APIs. An external resource may provide specific functionality and/or a specific service via a group-based communication interface of the group-based communication system 102. In one example, one of the external resources 106 may be a validated software source code repository, or the like, which members of a group-based communication workspace may collectively access as they collaborate to develop a new software application.

An external resource of the external resources 106 may be embodied in a variety of ways utilizing a variety of computing devices. For example, an external resource of the external resources 106 may be a computer or server remote from the group-based communication system 102 and accessible over the network 108 (e.g., over the Internet for example).

In some embodiments, the group-based communication system 102 is configured to access an external resource utilizing an external resource user identifier stored by the group-based communication system 102, such as in group-based communication repository 102B. The external resource user identifier may include, or otherwise be associated with and retrievable together with, an external resource access token associated with the external resource and/or a corresponding group-based communication system user account. A group-based communication system 102 may store one or more external resource user identifiers including or associated with an external resource access token(s) to enable API requests to the external resource to be specially tied to an external resource user account linked to the group-based communication system user account via the external resource user identifier.

In some embodiments, an identifier includes electronically managed information that uniquely identifies a particular data object or set of data. In some embodiments, an identifier includes one or more of a binary data value, a numerical data value, ASCII text, text encoded via another encoding schema, a pointer, a memory address, or a combination thereof.

In some embodiments of an exemplary group-based communication system 102, a group-based communication may be sent from a client device of the client devices 104 to a group-based communication system 102. In various implementations, the group-based communication may be sent to the group-based communication system 102 over communications network 108 directly by a client device 104. In other embodiments, the group-based communication may be sent to the group-based communication system 102 via an intermediary such as a messaging server, relay server, and/or the like. For example, one of the client devices 104 may be a desktop, a laptop, a tablet, a smartphone, and/or the like that is executing a group-based communication service application (e.g., a local software application or a browser/web application). In at least one example implementation, the group-based communication may include data such as a communication identifier, sending user account identifier, a group identifier, a group-based communication channel identifier, communications contents (e.g., text, emojis, images, links), attachments (e.g., files), communication hierarchy data (e.g., the group-based communication may be a reply to another group-based communication), third party metadata, and/or the like.

In some embodiments, a group-based communication can include any electronically managed digital content object provided by a user using a client device for transmission associated with a group-based communication channel, where the group-based communication is configured to be rendered to a selected channel communication interface. In an example context, a group-based communication includes one or more of a text data object, image data object, video data object, audio data object, or a combination thereof, provided by a user account via a client device. For example, a user, upon authenticating a corresponding user account and accessing the group-based communication system via a client device for an authenticated session, may provide a group-based communication that includes one or more of a text data object, image data object, video data object, audio data object, or a combination thereof, as communication contents. In some embodiments, each group-based communication is posted to a corresponding group-based communication channel within a particular group-based communication interface managed by the group-based communication system. Additionally or alternatively, in some embodiments, the group-based communication may include or otherwise be associated with a metadata set including a sending user account identifier, a communication identifier, an object identifier, a group identifier, and/or a group-based communication channel identifier.

In one embodiment, one of the client devices 104 may provide the following example group-based communication substantially in the form of a (Secure) Hypertext Transfer Protocol ("HTTP(S)") POST message including eXtensible Markup Language ("XML") formatted data, embodying a particular request for authenticating user account details to initiate an authenticated session, as provided below:

```
POST /authrequest.php HTTP/1.1
Host: www.server.com
Content-Type: Application/XML
Content-Length: 667
<?XML version = "1.0" encoding = "UTF-8"?>
<auth_request>
    <timestamp>2020-12-31 23:59:59</timestamp>
    <user_accounts_details>
        <user_account_credentials>
            <user_name>ID_user_1 </user_name>
            <password>abc123</password>
            //OPTIONAL <cookie>cookieID</cookie>
            //OPTIONAL     <digital_cert_link>www.mydigitalcertificate.com/
JohnDoeDaDoeDoe@gmail.com/mycertifcate.dc</digital_cert_link>
            //OPTIONAL<digital_certificate>_DATA_</digital_certificate>
        </user_account_credentials>
    </user_accounts_details>
    <client_details> //iOS Client with App and Webkit
        //it should be noted that although several client details
        //sections are provided to show example variants of client
        //sources, further messages will include only on to save
        //space
        <client_IP>10.0.0.123</client_IP>
```

-continued

```
        <user_agent_string>Mozilla/5.0 (iPhone; CPU iPhone OS 7_1_1 like Mac OS X)
AppleWebKit/537.51.2 (KHTML, like Gecko) Version/7.0 Mobile/11D201
Safari/9537.53</user_agent_string>
        <client_product_type>iPhone6,1 </client_product_type>
        <client_serial_number>DNXXX1X1XXXX</client_serial_number>
        <client_UDID>3XXXXXXXXXXXXXXXXXXXXXXXXD</client_UDID>
        <client_OS>iOS</client_OS>
        <client_OS_version>7.1.1 </client_OS_version>
        <client_app_type>app with webkit</client_app_type>
        <app_installed_flag>true</app_installed_flag>
        <app_name>nickname.app</app_name>
        <app_version>1.0 </app_version>
        <app_webkit_name>MobileSafari</client_webkit_name>
        <client_version>537.51.2</client_version>
    </client_details>
    <client_details> //iOS Client with Webbrowser
        <client_IP>10.0.0.123</client_IP>
        <user_agent_string>Mozilla/5.0 (iPhone; CPU iPhone OS 7_1_1 like Mac OS X)
AppleWebKit/537.51.2 (KHTML, like Gecko) Version/7.0 Mobile/11D201
Safari/9537.53</user_agent_string>
        <client_product_type>iPhone6,1 </client_product_type>
        <client_serial_number>DNXXX1X1XXXX</client_serial_number>
        <client_UDID>3XXXXXXXXXXXXXXXXXXXXXXXXD</client_UDID>
        <client_OS>iOS</client_OS>
        <client_OS_version>7.1.1 </client_OS_version>
        <client_app_type>web browser</client_app_type>
        <client_name>Mobile Safari</client_name>
        <client_version>9537.53</client_version>
    </client_details>
    <client_details> //Android Client with Webbrowser
        <client_IP>10.0.0.123</client_IP>
        <user_agent_string>Mozilla/5.0 (Linux; U; Android 4.0.4; en-us; Nexus S
Build/IMM76D) AppleWebKit/534.30 (KHTML, like Gecko) Version/4.0 Mobile
Safari/534.30</user_agent_string>
        <client_product_type>Nexus S</client_product_type>
        <client_serial_number>YXXXXXXXXZ</client_serial_number>
        <client_UDID>FXXXXXXXXX-XXXX-XXXX-XXXX-
XXXXXXXXXXXX</client_UDID>
        <client_OS>Android</client_OS>
        <client_OS_version>4.0.4</client_OS_version>
        <client_app_type>web browser</client_app_type>
        <client_name>Mobile Safari</client_name>
        <client_version>534.30</client_version>
    </client_details>
    <client_details> //Mac Desktop with Webbrowser
        <client_IP>10.0.0.123</client_IP>
        <user_agent_string>Mozilla/5.0 (Macintosh; Intel Mac OS X 10_9_3)
AppleWebKit/537.75.14 (KHTML, like Gecko) Version/7.0.3
Safari/537.75.14</user_agent_string>
        <client_product_type>MacPro5,1 </client_product_type>
        <client_serial_number>YXXXXXXXXZ</client_serial_number>
        <client_UDID>FXXXXXXXXX-XXXX-XXXX-XXXX-
XXXXXXXXXXXX</client_UDID>
        <client_OS>Mac OS X</client_OS>
        <client_OS_version>10.9.3</client_OS_version>
        <client_app_type>web browser</client_app_type>
        <client_name>Mobile Safari</client_name>
        <client_version>537.75.14</client_version>
    </client_details>
    <message>
        <message_identifier>ID_message_10</message_identifier>
        <team_identifier>ID_team_1 </team_identifier>
        <channel_identifier>ID_channel_1 </channel_identifier>
        <body contents>That is an interesting invention. I have attached a copy our patent
policy.</body contents>
        <attachments>patent_policy.pdf</attachments>
    </message>
</auth_request>
```

The group-based communication system 102 comprises at least one group-based communication server 102A that may create a storage request data object based upon the received message to facilitate message indexing and storage in a group-based communication repository 102B. In one implementation, the storage request data object may include data such as a communication identifier, a group identifier, a group-based communication channel identifier, a sending user account identifier, topics, responses, communication contents (i.e., body contents), attachments, communication hierarchy data, third party metadata, conversation primitive data, and/or the like. For example, the group-based communication server 102A may provide the following example storage request data object, substantially in the form of a HTTP(S) POST message including XML-formatted data, for example embodying a particular request for posting a group-based communication, as provided below:

```
POST /storage_message.php HTTP/1.1
Host: www.server.com
Content-Type: Application/XML
Content-Length: 667
<?XML version = "1.0" encoding = "UTF-8"?>
<storage_message>
    <message_identifier>ID_message_10</message_identifier>
    <team_identifier>ID_team_1 </team_identifier>
    <channel_identifier>ID_channel_1 </channel_identifier>
    <sending_user_identifier>ID_user_1 </sending_user_identifier>
    <topics>
        <topic>disclosures</topic>
        <topic>patents</topic>
        <topic>policies</topic>
    </topics>
    <responses>
        <response>liked by ID_user_2</response>
        <response>starred by ID_user_3</response>
    </responses>
    <body contents>That is an interesting disclosure. I have attached a copy our patent
policy.</body contents>
    <attachments>patent_policy.pdf</attachments>
    <conversation_primitive>
        conversation includes messages: ID_message_8, ID_message_9, ID_message_10,
        ID_message_11, ID_message_12
    </conversation_primitive>
</storage_message>
```

In embodiments, a sending user account identifier may be associated with the message communication. In one implementation, the message may be parsed (e.g., using PHP—i.e., the script language derived from Personal Home Page Tools—commands) to determine a sending user account identifier of the user who sent the group-based communication.

In embodiments, topics may be associated with the group-based communication. In one implementation, the communication contents may be parsed (e.g., using PHP commands) to determine topics discussed in the group-based communication. For example, hashtags in the group-based communication may indicate topics associated with the group-based communication. In another example, the group-based communication may be analyzed (e.g., by itself, with other group-based communications in a conversation primitive) or parsed using a machine learning technique, such as topic modeling, to determine topics associated with the group-based communication.

In embodiments, data indicating responses may be associated with the group-based communication. For example, responses to the group-based communication by other users may include reactions (e.g., selection of an emoji associated with the group-based communication, selection of a "like" button associated with the group-based communication), clicking on a hyperlink embedded in the group-based communication, replying to the group-based communication (e.g., posting a group-based communication to the group-based communication channel in response to the communication), downloading a file associated with the group-based communication, sharing the group-based communication from one group-based communication channel to another group-based communication channel, pinning the group-based communication, starring the group-based communication, and/or the like. In one implementation, data regarding responses to the group-based communication by other users may be included with the group-based communication, and the group-based communication may be parsed (e.g., using PHP commands) to determine the responses. In another implementation, data regarding responses to the group-based communication may be retrieved from a database. For example, data regarding responses to the group-based communication may be retrieved via a MySQL database command similar to the following:

```
SELECT messageResponses
FROM MSM_Message
WHERE messageID = ID_message_10.
```

For example, data regarding responses to the group-based communication may be used to determine context for the group-based communication (e.g., a social score for the group-based communication from the perspective of some user). In another example, data regarding responses to the group-based communication may be analyzed to determine context regarding the user (e.g., the user's expertise in a topic may be determined based on the responses to the user's group-based communication regarding the topic).

In embodiments, attachments may be included with the group-based communication. If there are attachments, files may be associated with the group-based communication. In one implementation, the group-based communication may be parsed (e.g., using PHP commands) to determine file names of the attachments. For example, file contents may be analyzed to determine context for the group-based communication (e.g., a patent policy document may indicate that the group-based communication is associated with the topic "patents").

In embodiments, third-party metadata may be associated with the group-based communication. For example, third-party metadata may provide additional context regarding the group-based communication or the user that is specific to a company, group, a group-based communication workspace, a group-based communication channel, and/or the like. In one implementation, the group-based communication may be parsed (e.g., using PHP commands) to determine third-party metadata. For example, third-party metadata may indicate whether the user who sent the group-based communication is an authorized representative of the group-based communication channel (e.g., an authorized representative may be authorized by the company to respond to questions in the group-based communication channel).

In embodiments, a conversation primitive may be associated with the group-based communication. In one implementation, a conversation primitive is an element used to analyze, index, store, and/or the like communications. For example, the group-based communication may be analyzed by itself, and may form its own conversation primitive. In another example, the group-based communication may be analyzed along with other group-based communications that make up a conversation, and the group-based communications that make up the conversation may form a conversation primitive. In one implementation, the conversation primitive may be determined as the group-based communication, a specified number (e.g., two) of preceding group-based communications and a specified number (e.g., two) of following group-based communications. In another implementation, the conversation primitive may be determined based on analysis of topics discussed in the group-based communication and other group-based communications (e.g., in the group-based communication channel) and/or proximity (e.g., communication send order proximity, communication send time proximity) of these group-based communications.

In embodiments, various metadata, determined as described above, and/or the contents of the group-based communication may be used to index the communication (e.g., using the conversation primitive) to facilitate various facets of searching (i.e., search queries that return results from group-based communication repository 102B). In at least one example implementation, a storage request data object may be sent from group-based communication server 102A to facilitate indexing in group-based communication repository 102B. In another implementation, metadata associated with the group-based communication may be determined and the communication may be indexed in group-based communication repository 102B. In an example embodiment, the group-based communication may be indexed such that a company's or a group's communications are indexed separately (e.g., in a separate index associated with the group and/or company that is not shared with other groups and/or companies). In one implementation, group-based communications may be indexed at a separate distributed repository (e.g., to facilitate data isolation for security purposes).

If there are attachments associated with the group-based communication, file contents of the associated files may be used to index such files in group-based communication repository 102B to facilitate searching. In one embodiment, the files may be indexed such that a company's or a group's files are indexed at a separate distributed repository.

Figure 2:
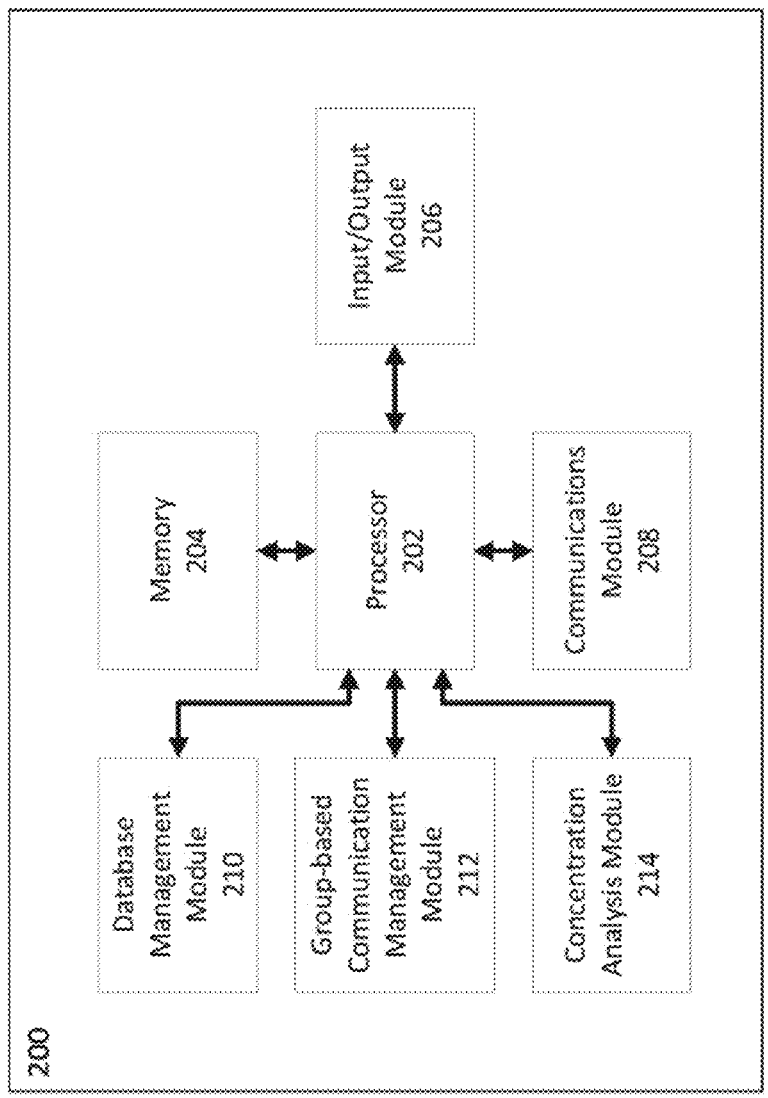
FIG. 2 illustrates a block diagram of an apparatus representing a customized group-based communication system, in accordance with example embodiments of the present disclosure.

The group-based communication system 102 may be embodied by one or more computing systems, such as the apparatus 200 shown in FIG. 2. The apparatus 200 may include a processor 202, memory 204, input/output module 206, communications module 208, database management module 210, group-based communication management module 212, and concentration analysis module 214. The apparatus 200 may be configured, using one or more of the modules to execute the operations described herein.

Although the components are described with respect to functional limitations, it should be understood that the particular implementations necessarily include the use of particular hardware. It should also be understood that certain of the components described herein may include similar or common hardware. For example, two modules may both leverage use of the same processor, network interface, storage medium, or the like to perform their associated functions, such that duplicate hardware is not required for each module. The use of the term "module" and/or the term "circuitry" as used herein with respect to components of the apparatus 200 should therefore be understood to include particular hardware configured to perform the functions associated with the particular module as described herein.

Additionally or alternatively, the terms "module" and "circuitry" should be understood broadly to include hardware and, in some embodiments, software and/or firmware for configuring the hardware. For example, in some embodiments, "module" and "circuitry" may include processing circuitry, storage media, network interfaces, input/output devices, and the like. In some embodiments, other elements of the apparatus 200 may provide or supplement the functionality of the particular module. For example, the processor 202 may provide processing functionality, the memory 204 may provide storage functionality, the communications module 208 may provide network interface functionality, and the like, to one or more of the other modules.

In some embodiments, the processor 202 (and/or co-processor or any other processing circuitry assisting or otherwise associated with the processor) may be in communication with the memory 204 via a bus for passing information among components of the apparatus. The memory 204 may be non-transitory and may include, for example, one or more volatile and/or non-volatile memories. In other words, for example, the memory may be an electronic storage device (e.g., a computer readable storage medium). The memory 204 may be configured to store information, data, content, applications, instructions, or the like, for enabling the apparatus 200 to carry out various functions in accordance with example embodiments of the present disclosure.

The processor 202 may be embodied in any one of a myriad of ways and may, for example, include one or more processing devices configured to perform independently. Additionally or alternatively, the processor 202 may include one or more processors configured in tandem via a bus to enable independent execution of instructions, pipelining, and/or multithreading. The use of the terms "processor," "processing module," and "processing circuitry" may be understood to include a single-core processor, a multi-core processor, multiple processors internal to the apparatus, and/or remote or "cloud" processors.

In an example embodiment, the processor 202 may be configured to execute computer-coded instructions stored in the memory 204 or otherwise accessible to the processor. Alternatively, or additionally, the processor 202 may be configured to execute hard-coded functionality. As such, whether configured by hardware or software means, or by a combination thereof, the processor 202 may represent an entity (e.g., physically embodied in circuitry) capable of performing operations according to an embodiment of the present disclosure while configured accordingly. Alternatively, as another example, when the processor is embodied as an executor of software instructions, the instructions may specifically configure the processor to perform the algorithms and/or operations described herein when the instructions are executed.

As one example context, the processor 202 may be configured to maintain one or more group-based communication channels accessible by various user accounts associated with the client devices 104 (shown in FIG. 1) to enable communication transmission between the client devices 104. The processor 202 ensures that group-based communications intended for exchange between the client devices 104 within the particular group-based communication channel are properly disseminated to those client devices 104 for display within respective display windows or particular interface portions provided via the client devices 104, such as via a group-based communication service application.

Moreover, the processor 202 may be configured to synchronize group-based communications transmitted within particular communication channel with a database for storage and/or indexing of the communications therein. In certain embodiments, the processor 202 may provide stored and/or indexed group-based communications for dissemination to client devices 104. The processor 202 may also be configured synchronize such stored and/or indexed group-based communications across various group-based communication interfaces and/or associated group-based communication channels therein.

In some embodiments, the apparatus 200 may include input/output module 206 that may, in turn, be in communication with processor 202 to provide output to the user and, in some embodiments, to receive an indication of a user input. The input/output module 206 may comprise a user interface (e.g., a group-based communication interface) and may include a display to which the user interface is rendered. In some embodiments, the input/output module 206 may comprise a web user interface, a mobile application (e.g., a mobile group-based communication service application), a desktop application (e.g., a desktop group-based communication service application), a linked or networked client device, a kiosk, or the like. In some embodiments, the input/output module 206 may also include a keyboard, a mouse, a joystick, a touch screen, touch areas, soft keys, a microphone, a speaker, or other input/output mechanisms. The processor and/or user interface module comprising the processor, for example processor 202, may be configured to control one or more functions of one or more user interface elements through computer program instructions (e.g., software and/or firmware) stored on a memory accessible to the processor (e.g., memory 204, and/or the like).

The communications module 208 may be any means such as a device or circuitry embodied in either hardware or a combination of hardware and software that is configured to receive and/or transmit data from/to a network and/or any other device, circuitry, or module in communication with the apparatus 200. In this regard, the communications module 208 may include, for example, at least a network interface for enabling communications with a wired or wireless communication network. For example, the communications module 208 may include one or more network interface cards, antennas, buses, switches, routers, modems, and supporting hardware and/or software, or any other device suitable for enabling communications via a network. Additionally or alternatively, the communication interface may include the circuitry for interacting with the antenna(s) to cause transmission of signals via the antenna(s) or to handle receipt of signals received via the antenna(s).

The group-based communication management module 212 includes hardware, and/or a combination of hardware and software, configured to support functionality associated with a group-based communication system 102. The group-based communication management module 212 may utilize processing circuitry, such as the processor 202, to perform these actions. The group-based communication management module 212 may send data to and/or receive data from group-based communication repository 102B. In some implementations, the sent and/or received data may be data objects embodying one or more group-based communications (e.g., messages, files, links, etc.) organized among a plurality of group-based communication channels. Additionally or alternatively, the group-based communication management module 212 may provide for authenticating user account details to initiate an authenticated session associated with a corresponding client device. During the authenticated session, the apparatus 200, for example via the group-based communication management module 212 may provide native communication functionality and/or functionality associated with one or more verified external resources. It should be appreciated that, in some embodiments, the group-based communication management module 212 may include a separate processor, specially configured field programmable gate array (FPGA), or application-specific integrated circuit (ASIC).

The concentration analysis module 214 includes hardware, software, or a combination thereof, configured to support concentration mode related functionality, features, and/or services of the group-based communication system 102. The concentration analysis module 214 may utilize processing circuitry, such as the processor 202, to perform these actions. The concentration analysis module 214 may send and/or receive data from a group-based communication repository 102B, for example alone or in conjunction with database management module 210. In some embodiments, the sent and/or received data includes application context signal data, including application context signal sets, concentration mode activation indicator(s), application context-based concentration score(s), and/or associated data for correlating the described data with a particular client device and/or user account associated with a client device. The concentration analysis module 214 may cause transmission of information for modifying one or more renderings within a user interface of a client device. In some embodiments, for example, the concentration analysis module 214 provides for detecting one or more application context signal set(s), and/or one or more associated user interaction(s). Additionally or alternatively, in some embodiments, the concentration analysis module 214 provides for analyzing an application context-based concentration score to determine a corresponding concentration mode status, and/or to identify and/or provide a concentration profile based on the determined concentration mode status. The concentration profile may be identified by retrieving an automatically generated or user-configured concentration profile, for example from a data storage, based on the concentration mode status and additional data, for example a current datetime timestamp. It should be appreciated that, in some embodiments, the concentration analysis module 214 may include a separate processor, specially configured FPGA, or specially configured ASIC.

The database management module 210 includes hardware, software, or a combination thereof, configured to support data storage, management, and retrieval functionality, features, and/or services of the group-based communication system 102. The database management module 210 may, for example, include hardware, software, or a combination thereof, for storing, maintaining, and/or retrieving data from a group-based communication repository 102B. The database management module 210 may utilize processing circuitry, such as the processor 202, and memory circuitry, such as memory 204, to perform these actions. The database management module 210 may store, maintain, and/or retrieve group-based communication related data, user account data, concentration mode related data (including but not limited to application context signal set(s), concentration profiles, and the like associated with one or more client devices). The database management module 210 may store, maintain, or retrieve data associated with functionality, services, or features provided by one or more other components of the apparatus 200. For example, the database management module 210 may communicate with a group-based communication database 102B for managing data received by and/or utilized by group-based communication management module 212 and/or concentration analysis module 214. It should be appreciated that, in some embodiments, the database management module 210 may include a separate processor, specially configured FPGA, or specially configured ASIC.

It is also noted that some or all of the data and/or information discussed herein can be based on data received, generated, and/or otherwise maintained by one or more components of the apparatus 200. In some embodiments, one or more external systems (such as a remote cloud computing and/or data storage system, one or more external resources 106) may also be leveraged to provide at least some of the functionality discussed herein.

Figure 3:
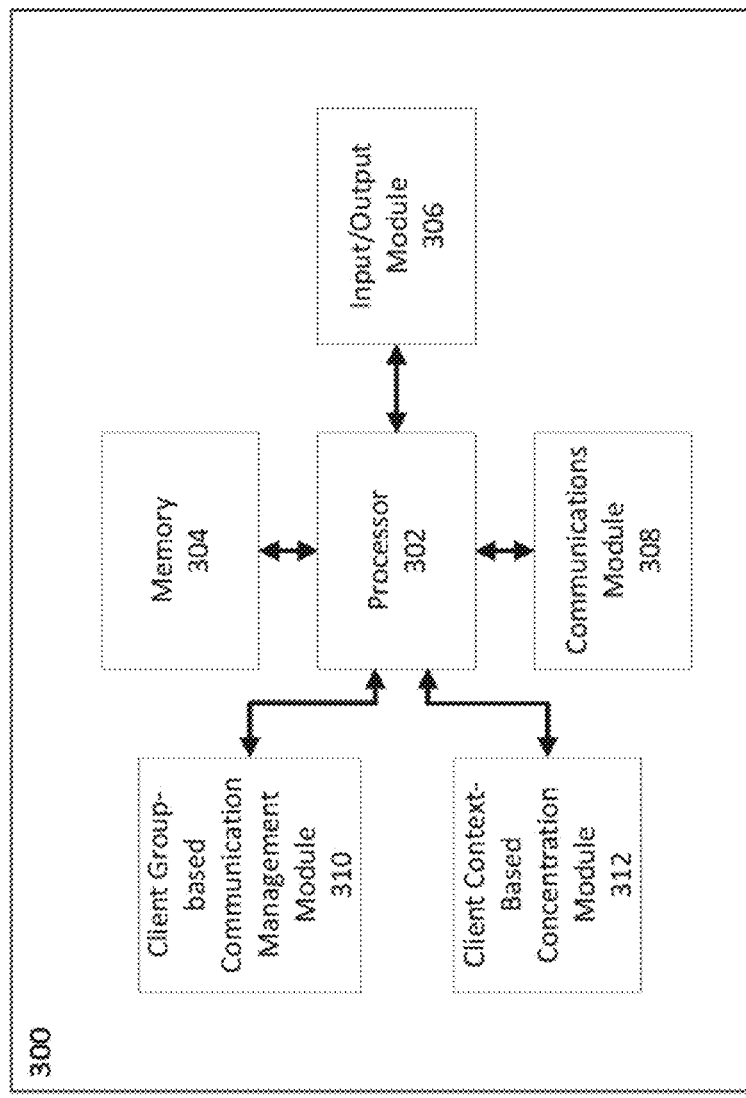
FIG. 3 illustrates a block diagram of an apparatus representing a customized client device, in accordance with example embodiments of the present disclosure.

Any of the client devices 104 may be embodied by one or more computing systems, such as the apparatus 300 shown in FIG. 3. The apparatus 300 may include a processor 302, memory 304, input/output module 306, communications module 308, client group-based communication management module 310, and client context-based concentration module 312. The apparatus 300 may be configured, using one or more of the modules to execute the operations described herein.

Although the components are described with respect to functional limitations, it should be understood that the particular implementations necessarily include the use of particular hardware. It should also be understood that certain of the components described herein may include similar or common hardware. For example, two modules may both leverage use of the same processor, network interface, storage medium, or the like to perform their associated functions, such that duplicate hardware is not required for each module. The use of the term "module" and/or the term "circuitry" as used herein with respect to components of the apparatus 300 should therefore be understood to include particular hardware configured to perform the functions associated with the particular module as described herein.

Additionally or alternatively, the terms "module" and "circuitry" should be understood broadly to include hardware and, in some embodiments, software and/or firmware for configuring the hardware. For example, in some embodiments, "module" and "circuitry" may include processing circuitry, storage media, network interfaces, input/out devices, and the like. In some embodiments, other elements of the apparatus 300 may provide or supplement the functionality of the particular module.

The modules 302-308 may perform functions similar to those described above with respect to the similarly named modules illustrated depicted in the apparatus 200 illustrated in FIG. 2. In the interest of brevity, repeated description of the similarly named components is omitted. It should be appreciated that the similarly named components, with respect to FIG. 3 may interact with, or be utilized in conjunction with, one or more of the modules 310-312 to perform functionality associated with these modules.

The client group-based communication management module 310 includes hardware, and/or a combination of hardware and software, configured to support a client device, for example one of the client devices 104, or particular functionality associated with the client device, for example group-based communication transmitting and/or receiving for rendering to group-based communication interface output to a display of the client device. The client group-based communication management module 310 may utilize processing circuitry, such as the processor 302, to perform these actions. The client group-based communication management module 310 may provide functionality for generating and transmitting group-based communications, and retrieving and rendering group-based communications. For example, the client group-based communication management module 310 may be configured to communicate with the group-based communication system, for example a group-based communication system embodied by the apparatus 200, to transmit group-based communications for posting within a group-based communication channel of a group-based communication interface. Additionally or alternatively, the client group-based communication management module 310 may be configured to communicate with the group-based communication system to retrieve group-based communications for rendering to a group-based communication interface. Additionally or alternatively, the client group-based communication management module 310 may provide for accessing external resource functionality associated with one or more verified external resource, for example through communication with a group-based communication system. It should also be appreciated that, in some embodiments, the client group-based communication management module 310 may include a separate processor, specially configured FPGA or a specially configured ASIC.

The client context-based concentration module 312 includes hardware, software, or a combination thereof, configured to support concentration mode related functionality, features, and/or services of the client device 104. The client context-based concentration module 312 may utilize processing circuitry, such as the processor 302, to perform these actions. The client context-based concentration module 312 may be configured to detect and/or store one or more application context signal sets associated with one or more executed application(s). Additionally or alternatively, the client context-based concentration module 312 may be configured to generate an application context-based concentration score and/or concentration mode activation indicator. In some embodiments, the client context-based concentration module 312 may implement one or more context-based determination models to perform one or more generation and/or determination operations. The client context-based concentration module 312 may be configured for setting one or more settings associated with one or more executed applications, including but not limited to a group-based communication service application. Additionally or alternatively, the client context-based concentration module 312 may be configured to modify one or more renderings based on generated and/or determined data, for example a generated concentration mode status. The client context-based concentration module 312 may provide for storing one or more concentration profiles or associated information, and identifying a concentration profile associated with an application context-based concentration score or a concentration mode status. Additionally or alternatively, the client context-based concentration module 312 may provide for determining whether newly received group-based communication(s) satisfy corresponding group-based communication service application setting(s), and rendering an interface including appropriate information (e.g., generating and rendering notification information for newly received communications that satisfy the settings). It should be appreciated that, in some embodiments, the client context-based concentration module 312 may include a separate processor, specially configured FPGA or ASIC.

It is also noted that some or all of the data and/or information discussed herein can be based on data received, generated, and/or otherwise maintained by one or more components of the apparatus 300. In some embodiments, one or more external systems (such as a remote cloud computing and/or data storage system, one or more external resources 106) may also be leveraged to provide at least some of the functionality discussed herein.

As described above, and as will be appreciated based on this disclosure, embodiments of the present disclosure may be configured as methods, mobile devices, frontend graphical user interfaces, backend network devices, and the like. Accordingly, embodiments may comprise various means including entirely hardware, entirely software, or a combination of hardware and software. Furthermore, embodiments may take the form of a computer program product on at least one non-transitory computer-readable storage medium having computer-readable program instructions (e.g., computer software) embodied in the storage medium. Similarly, embodiments may take the form of computer program code stored on at least one non-transitory computer-readable storage medium. Any suitable computer-readable storage medium may be utilized including non-transitory hard disks, CD-ROMs, flash memory, optical storage devices, or magnetic storage devices.

As will be appreciated, any such computer program instructions and/or other type of code may be loaded onto a computer, processor or other programmable apparatus circuitry to produce a machine, such that the computer, processor, or other programmable circuitry that execute the code on the machine creates the means for implementing various functions, including those described herein.

The computing systems described herein can include clients and servers. A client and server are generally remote from each other and typically interact through a communication network. The relationship of client and server arises by virtue of computer programs running on the respective computers and having a client-server relationship to each other. In some embodiments, a server transmits information/data (e.g., an HTML page or parseable data representation) to a client device (e.g., for purposes of displaying information/data to and receiving user input from a user interacting with the client device). Information/data generated at the client device (e.g., a result of the user interaction) can be received from the client device at the server.

While this disclosure contains many specific implementation details, these should not be construed as limitations on the scope of this disclosure or of what may be claimed, but rather as description of features specific to particular embodiments of particular inventions. Certain features that are described herein in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results, unless described otherwise. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products. Any operational step shown in broken lines in one or more flow diagrams illustrated herein are optional for purposes of the depicted embodiment.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results, unless described otherwise. In certain implementations, multitasking and parallel processing may be advantageous.

Example Computing Environments

FIGS. 4A-4D illustrate example computing environments for detecting and maintaining one or more application context signal set(s), in accordance with various example embodiments. The computing environments may, in some embodiments, be embodied by a software environment executed via a client device, for example a client device embodied by apparatus 300. It should be appreciated that the particular applications and configurations depicted in FIGS. 4A-4D are provided for descriptive purposes only, and not to limit the scope and spirit of the disclosure to the particular configurations depicted.

Figure 4B:
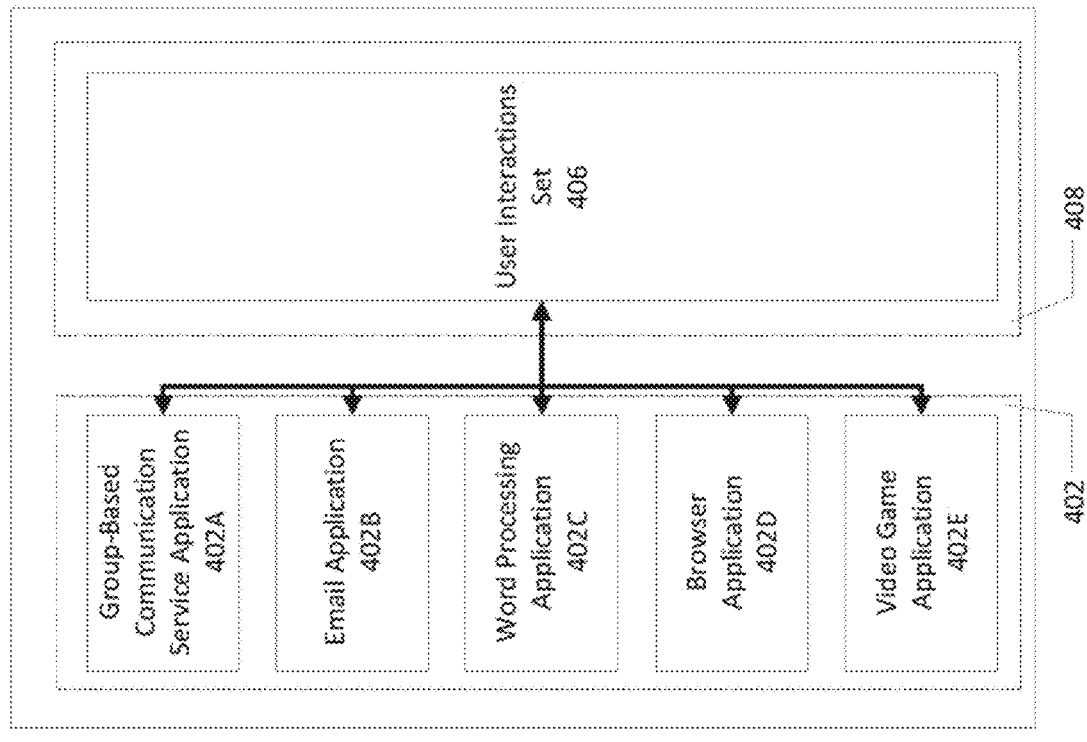
Figure 4A:
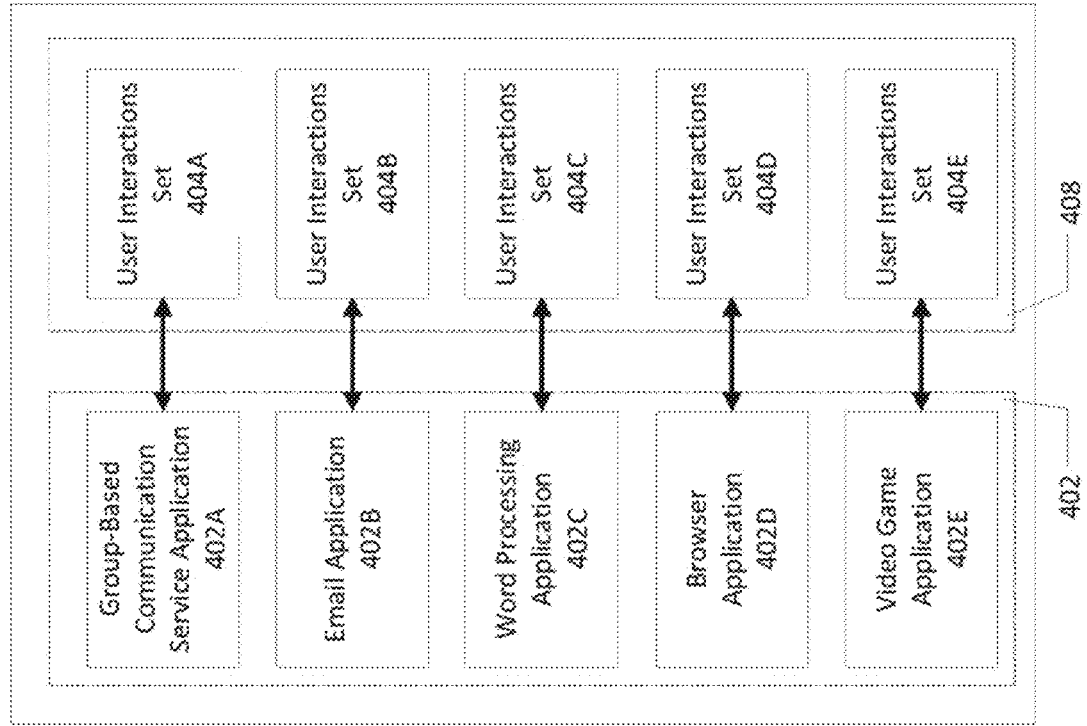

FIG. 4A illustrates a first example computing environment for detecting and maintaining an application context signal set associated with one or more executed application(s), for example executed and/or otherwise maintained by an apparatus 300. The example computing environment includes one or more executed application(s) associated with one or more user interactions set, which may be associated with an application context-based signal set.

In some embodiments, the application context signal set includes received, parsed, extracted, detected, or identified signals associated with one or more applications executed on a client device, or interactions by a user with the one or more applications executed on the client device. Further, set of application context signal sets can include multiple application context signal sets. In some embodiments, each application context signal set is received, detected, retrieved, and/or otherwise associated with a particular client device.

In some embodiments, an executed application includes a software resource, or a combination of associated software resources, processed by and/or executed via a client device. In some embodiments, an executed application is associated with computer-code instructions configured to cause the client device associated with the executed application to perform one or more operations, or otherwise provide functionality associated with the executed application. In an example context, non-limiting examples of an executed application include, without limitation, a browser application, a group-based communication service application, an external resource, a word processing application, and a local application. An executed application set can include electronically managed data including one or more executed applications stored, where the executed applications are stored in a structured order or in an unstructured manner.

For example, as illustrated, the first example computing environment includes executed application set 402. The executed application set 402 may include one or more executed application(s) functioning via the client device embodied by the apparatus 300. The executed application(s) may embody various software applications of various types. Each executed application may be executed on by the apparatus 300 and configured such that each executed application is accessible to the user and the user may interact with each executed application. The user may engage with each of the various executed applications with varying consistency, such that the user engages with each executed application at different rates.

The executed application set 402, as depicted, includes executed applications embodied by group-based communication service application 402A, email application 402B, word processing application 402C, browser application 402D, and video game application 402E (collectively "executed applications 402"). Each of the executed applications 402A-402E may be associated with an application identifier that uniquely identifies the particular application. Additionally or alternatively, each of the executed applications may be associated with an application type identifier. The application type identifier may correspond to the functionality associated with the executed application. For example, web browser applications may be associated with a first application type identifier (e.g., a numerical type of "1" or string type of "browser" for example), and word processing applications may be associated with a second application type identifier (e.g., a numerical type of "2" or a string type of "wordprocessor" for example).

Additionally or alternatively, each application type identifier may be associated with a concentration level indicator. For example, the word processing application 402C may be associated with a first concentration level indicator embodied by a data object that represents, or otherwise indicates, the word processing application 402C is associated with a high concentration level. Additionally or alternatively, the video game application 402E and/or browser application 402D may be associated with a second concentration level indicator embodied by a data object that represents, or otherwise indicates, that the video game application 402E and/or browser application 402D are associated with a low concentration level. The remaining executed applications (e.g., 402A and 402B) may be associated with a third concentration level indicator embodied by a data object that represents, or otherwise indicates, the word processing application 402C is associated with a moderate concentration level. A concentration level indicator may be embodied by a numerical value, for example a decimal value between 0.0 and 1.0. In some embodiments, applications associated with high concentration are associated with higher concentration level indicators (e.g., closer to 1.0) and applications associated with lower concentration are associated with lower concentration level indicators (e.g., closer to 0.0).

In the computing environment illustrated in FIG. 4A, each executed application 402A-402E is associated with a corresponding user interactions set 404A-404E. Each corresponding user interactions set may embody a log of user engagements performed via, or associated with, the corresponding executed application. For example, user interactions set 404A may include zero or more user interactions performed via group-based communication service application 404A. Similarly, user interactions set 404B may include zero or more user interactions performed via the email application 404B, and so on.

In some embodiments, an interaction or a user interaction can include a user keystroke, click, touch, voice command, peripheral engagement, gesture, a combination thereof, or other user action captured via a client device for interacting with an application executed via the client device. In an example context, an interaction is configured to trigger a software-executed process or a particular effect associated with the application executed via the client device. Examples of interactions include keystrokes to insert characters into a word processing application, keystrokes to change the focused application from a first executed application to a second executed application ("tabbing"), a click on a button or other interface component rendered by an executed application, gestures detected via a touchscreen, eye-tracking or other motion-tracking device, for performing functionality made available via the executed application, or the like.

In some embodiments, the user interactions set can include a data log, data structure, or other ledger that includes one or more executed user interactions with the client device or a with one or more software applications executed via the client device. An example user interactions set includes a user interaction log representing one or more previous actions, such as a user tab from a first software application to a second software application, user actions performed within a particular software application, user initiation and/or termination of one or more software application(s), user initiating focus of a particular application, user initiating full-screen of a particular application, and user termination of full-screen of a particular application. It should be appreciated that in some embodiments any user performed action may be logged in a user interactions set.

To facilitate correspondence between an executed application 402A-402E and a user interactions set 404A-404E, each user interactions set may include or be associated with metadata that identifies the executed application associated with the user interactions set. In one such example context, each user interactions set may be associated with an application identifier associated with the corresponding executed application. Upon execution of a newly launched executed application, for example, a new user interactions set may be generated that is associated with the newly executed application. Alternatively, in some embodiments, a new user interactions set may be created upon detecting a first application context signal associated with the newly executed application. For example, each detected application context signal may include and/or otherwise be associated with a particular application identifier associated with the executed application to which the application context signal corresponds (e.g., the executed application that the user engaged with to generate the signal).

The user interactions set may include user interaction(s) that embody any of a number of user actions that may be performed. For example, a user interaction may embody a user click, tap, voice command, gesture, button interaction or other interface component interaction, mouseover event, keystroke, and/or the like, performed within the corresponding executed application. A user interaction, in some embodiments, may also embody an event associated with focusing and/or changing focus of a particular executed application. For example, a user interaction may be detected and/or captured when a user tabs from a currently focused application (e.g., word processing application 402C that the user has been typing within) to a new focused application (e.g., the email application 402B when the user wants to search the web). In this regard, a user interaction may be stored for actions that involve one particular executed application (e.g., a focused executed application), or actions associated with two or more executed applications (e.g., a currently focused application and another application to be focused). Other non-limiting examples of user interactions include an application minimize action, an application full screen action, an application close action, and the like, performed by a user.

In some embodiments, additionally or alternatively, each user interaction may include or otherwise be associated with metadata. The metadata may include a timestamp data object associated with the user interaction, one or more hardware identifiers associated with the user interaction (e.g., identifying one or more hardware devices used by the user to perform the action), a user account associated with the interaction, or the like. In some embodiments, a user interaction includes a metadata set including one or more of these data objects to enable analysis of such metadata, for example in analyzing the user interaction(s) to generate an application context-based concentration score.

The user interactions set 404A-404E may be include in, or otherwise stored as, application context signal set 408. In this regard, the application context signal set 408 may include the various subsets independently managed for each executed application. The individual subsets may be parsed and/or otherwise identified from the application context signal set 408 and used to determine information associated with the user's interactions with the corresponding application. For example, for a particular executed application, the corresponding user interactions set of the application context signal set 408 may be parsed and/or analyzed to determine a user interactions rate representing how often a user engages with the particular executed application. Alternatively or additionally, the application context signal set 408 may be parsed and/or analyzed to determine a user interactions rate representing how often a user engages with one or more executed applications, or all executed applications.

The application context signal set 408 may be used for various purposes. In some embodiments, the application context signal set 408 may be used to generate an application context-based concentration score or a concentration mode activation indicator. In some such embodiments, the application context signal set 408 may be applied to a trained concentration determination model to generate the application context-based concentration score and/or concentration mode activation indicator.

In some embodiments, the application context-based concentration score can include an electronically managed data object associated with a predicted and/or determined concentration level associated with a user accessing a group-based communication system via a corresponding user account. In some embodiments, the concentration level associated with a user represents the likelihood a user will interact with one or more group-based communications, and/or corresponding notifications, associated with one or more group-based communication types. In some embodiments, an application context-based concentration score includes a generated numerical representation of the concentration level associated with the user. In an example context, for example, an application context-based concentration score represents a numerical value between a maximum concentration score and a minimum concentration score (e.g., 100 and 0 respectively, or 1 and 0 respectively), where a greater application context-based concentration score indicates the user is more concentrated (or, in some embodiments, the reverse). In some embodiments, an application context-based concentration score represents an encoded representation from a predefined set of encoded orientations. In an example context, for example, an application context-based concentration score represents an encoded representation from the set of strings indicating various concentration levels, such as "social" or "low concentration," "working" or "moderate concentration," and "busy" or "high concentration." In other embodiments, a predefined set of encoded representations includes additional, fewer, and/or alternative representations. An application context-based concentration score is generated based on received, detected, parsed, and/or otherwise signals identified an application context signal set associated with a corresponding user.

In some embodiments, the concentration mode activation indicator includes electronically managed data representing a determination that concentration mode should be activated associated with a particular user account controlling a particular client device.

Additionally or alternatively, in some embodiments, some or all of the application context signal set 408 is transmitted to a group-based communication system. For example, the application context signal set 408 may be transmitted to the group-based communication system for storage and/or utilization. In some embodiments, the group-based communication system may use received and/or stored application context signal set(s) to train a concentration determination model. In some such embodiments, to enhance user privacy, the application context signal set 408 may be manipulated to anonymize the data therein. Alternatively, a data summary and/or data aggregate information may be transmitted to the group-based communication without sending the specific data objects embodied by application context signal set 408. For example, in some embodiments, the application context signal set sent to the group-based communication system may include one or more data objects embodying a portion of the user interaction(s) in each of the user interactions set 404A-404E.

FIG. 4B illustrates a first example computing environment for detecting an application context signal set associated with one or more executed application(s), for example executed and/or otherwise maintained by an apparatus 300. The example computing environment includes one or more executed application(s) associated with one or more user interactions set, which may be associated with an application context-based signal set.

For example, as illustrated, the first example computing environment includes executed application set 402. The executed application set 402 may include one or more executed application(s) functioning via the client device embodied by the apparatus 300. The executed application(s) may embody various software applications of various types. Each executed application may be executed on by the apparatus 300 and configured such that each executed application is accessible to the user and the user may interact with each executed application. The user may engage with each of the various executed applications with varying consistency, such that the user engages with each executed application at different rates.

FIG. 4B illustrates a second example computing environment for detecting and maintaining an application context signal set associated with one or more executed application(s), for example executed and/or otherwise maintained by an apparatus 300. The example computing environment includes one or more executed application(s) associated with a single user interactions set, which may embody and/or be associated with an application context-based signal set.

In the second example computing environment illustrated by FIG. 4B. The user interactions set 406 may include all user interactions associated with each of the executed applications 402. In this regard, the user interactions set 406 may embody a ledger for all user interactions detected, received, or the like, regardless of the executed application from which the user interaction originated. In some such embodiments, each user interaction may include, or be associated with, an application identifier or other information that identifies the executed application from which the user interaction originated. Alternatively, in some such embodiments, the user interactions may be stored without association with any particular executed application, such that a corresponding application identifier may not be included.

The single user interactions set 406 may be filtered and/or searched based to analyze specific user interactions within the user interactions set 406. For example, in some embodiments, the single user interactions set 406 may be filtered and/or searched based on a particular application identifier to identify an application-specific interactions subset associated with a particular executed application. The application-specific interactions subset may be analyzed to determine various information and/or perform one or more data checks, for example to determine an interactions rate associated with a particular executed application. Alternatively or additionally, in some embodiments, the single user interactions set 406 may be filtered and/or searched to identify an interaction-type subset associated with a particular interaction type. For example, the interaction-type subset may include interactions that include and/or otherwise are associated with a particular interaction type identifier corresponding to the interaction type, for example a keystroke type identifier, a click type identifier, a tap type identifier, and the like. Each interaction-type subset may be analyzed to determine an interaction rate associated with the interaction type, such as a keystroke rate, a click rate, or the like, or a combination thereof.

The single user interactions set 406 may comprise a ledger of all interactions performed via a corresponding client device, for example embodied by apparatus 300. Each interaction may include and/or otherwise be associated with a particular timestamp corresponding to the time at which the interaction occurred and/or was detected. In some such embodiments, the user interaction set 406 may be analyzed to identify and/or calculate an interactions trend. The interactions trend may be used to determine whether the interactions trend indicates the user has increased their concentration level (e.g., where the interactions trend indicates the interactions rate over a particular timestamp interval has increased above a particular threshold rate).

In some embodiments, the apparatus 300 may be configured to store a detected user interaction for a particular timestamp interval. For example, the apparatus 300 may be associated with an interaction expiration interval, such that user interactions are deleted and/or otherwise marked as expired after being stored for longer than the interaction expiration interval. In one such embodiment, for example, the interaction expiration interval may represent a 15-minute interval, a 30-minute interval, an hour interval, or the like. In some embodiments, an interaction expiration interval may be predetermined by the apparatus 300, for example where the interaction expiration interval is hard-coded. In other embodiments, the interaction expiration interval may be determined and/or set by a group-based communication system. In yet other embodiments, the interactions expiration interval may be set by a user via the apparatus 300.

In some embodiments, the single user interactions set 406 may be ordered based on one or more parameters and/or metadata associated with each user interaction. For example, in at least one embodiment, the single user interactions set 406 may be organized based on the timestamp included in and/or associated with each user interaction. Alternatively, in at least another embodiment, the single user instructions set 406 may be organized based on the interaction type identifier associated with each user interaction, the application identifier associated with each user interaction, or the like.

FIG. 4C illustrates a third example computing environment for detecting and maintaining an application context signal set associated with one or more executed application(s), for example executed and/or otherwise maintained by an apparatus 300. The example computing environment includes the group-based communication service application 454A associated with user interactions sets 460A-460F, which may embody and/or be associated with an application context-based signal set, or a portion thereof. It should be appreciated that the third example computing environment may comprise a portion of a complete computing environment. For example, the third example computing environment may be configured for detecting and maintaining one or more user interactions set associated with the group-based communication service application 454A as part of a larger computing environment, such as the first example computing environment depicted in FIG. 4A or the second example computing environment depicted in FIG. 4B.

In the third example computing environment illustrated by FIG. 4C, the group-based communication service application 454A is associated with a verified external resource set 452, specifically comprising verified external resources 452A-452E. The group-based communication service application 454 may provide access to and/or functionality associated with each of the verified external resources 452, for example via communication with a group-based communication system. In this regard, a user of the apparatus 300 may, for example, access functionality associated with the verified external resources 452 through a group-based communication interface rendered via the group-based communication service application 454A. The group-based communication service application 454A may provide native functionality (e.g., group-based communication generating, transmitting, and receiving) as well as the functionality associated with each of the verified external resources 452.

In some embodiments, a verified external resource includes a software application, program, platform, or service that is configured to communicate with the group-based communication system for providing functionality associated with the verified external resource to a user via a group-based communication service application executed on a corresponding client device. A verified external resource provides functionality not provided natively by the group-based communication system. The verified external resource operates on a compiled code base or repository that is separate and distinct from that which supports the group-based communication system. In some embodiments, the verified external resource may communicate with the group-based communication system, and vice versa, through one or more application program interfaces (APIs). In some embodiments, the verified external resource receives tokens and/or other authentication credentials that are used to facilitate secure communication between the validated external resource and the group-based communication system for navigating the network security layers or protocols (e.g., network firewall protocols) securing the group-based communication system. Additionally or alternatively, in some embodiments, a group-based communication system stores one or more authentication token(s) for accessing functionality provided by the verified third-party application.

In some embodiments, the group-based communication facilitates validating and/or otherwise permissioning and provisioning an external resource to be accessible via a group-based communication interface as a verified external resource. In some embodiments, a group-based communication system provides functionality for a user via a user account to permission and/or provision an external resource to be accessible as a verified external resource from within a group-based communication interface that the user account has joined. In other embodiments, a group-based communication system provides functionality for a user via a user account to request that an administrative user associated with a group-based communication interface permission and/or provision the external resource to be accessible as a verified external resource from within the group-based communication interface. In some embodiments, a group-based communication system provides one or more interfaces for navigating, viewing, and selecting an external resource for installation, permissioning, and/or provisioning. In an example context, a group-based communication system provides one or more application store interfaces for browsing and selecting the external resources.

In some embodiments, as illustrated in FIG. 4C for example, the apparatus 300 is configured to detect and maintain user interaction set(s) associated with each verified external resource 452. While accessing functionality associated with a verified external resource through the group-based communication service application 454A, the apparatus 300 may detect, identify, and/or otherwise receive user interactions associated with the functionality of the verified external resource. For example, the group-based communication service application 454A may detect user engagement with particular interface components of a group-based communication interface rendered by the group-based communication service application 454A.

In the depicted embodiment, each of the verified external resources 452 may be associated with a user interaction set, such as user interactions set 460A-460E. Additionally, the group-based communication service application 454A may be associated with a user interaction set, for example user interactions set 460F, for interactions associated with native functionality provided by the group-based communication service application 454A. As such, the user interactions sets 460A-460F may include interactions for each user engagement and/or action performed by the user via the group-based communication service application 454A.

The verified external resources may provide various functionality via the group-based communication service application 454, and/or an associated group-based communication system. For example, verified external resource 452A may embody a video and/or audio conferencing resource that provides audio/visual conferencing functionality to users within a group-based communication interface rendered to the group-based communication service application. Verified external resource 452B may embody a collaborative workflow development tool, for example for creating tasks associated with a particular project. Verified external resource 452C may embody a document management resource, such that a user may store documents in a cloud environment, retrieve documents from a cloud environment, and/or share documents stored in a cloud environment (for example, via one or more group-based communications). It should be appreciated that each verified external resource may be associated with any of a myriad of services, functionality or the like, and that the particular examples provided are not to limit the scope or spirit of the disclosure.

The user interactions set 460A-460F may each be associated with a verified external resource based on an external resource identifier. For example, each detected application context signal originating from a verified external resource provided by the group-based communication service application 454A may include a user interaction comprising the external resource identifier associated with the corresponding verified external resource. For example, if a user interacts with a group-based communication interface component associated with a verified external resource, where the interface component is rendered via the group-based communication service application 454A, the apparatus 300 may detect an application context signal embodying and/or including the user interaction associated with or including the application identifier. The detected application context signal may be parsed to identify the application identifier, such that the user interaction may be stored in the appropriate user interactions set.

Each of the verified external resources 452 may be associated with a different concentration level. For example, a verified external resource may embody a meeting and/or conferencing resource, and may be associated with a concentration level indicator (e.g., a numerical and/or categorical data object) that indicates that a user utilizing the verified external resource is likely highly concentrating. Alternatively, another verified external resource may embody a social networking resource. The social networking resource may be associated with a second concentration level indicator that indicates the user utilizing the user utilizing the social networking resource is likely associated with a low concentration level.

The user interactions sets 460A-460F may be included in, embody, or embody a portion of an application context signal set. In some embodiments, for example, the user interactions sets 460A-460F embody an application context signal set to be transmitted and/or analyzed. In other embodiments, the user interactions sets may form a combined user interactions set, for example which is stored associated with the group-based communication service application 454A (e.g., based on a corresponding application identifier). For example, the user interactions set 460A-460F may embody user interaction set 404A, which (as illustrated in FIG. 4A), may be a subset of the overall application context signal set.

Figure 4D:
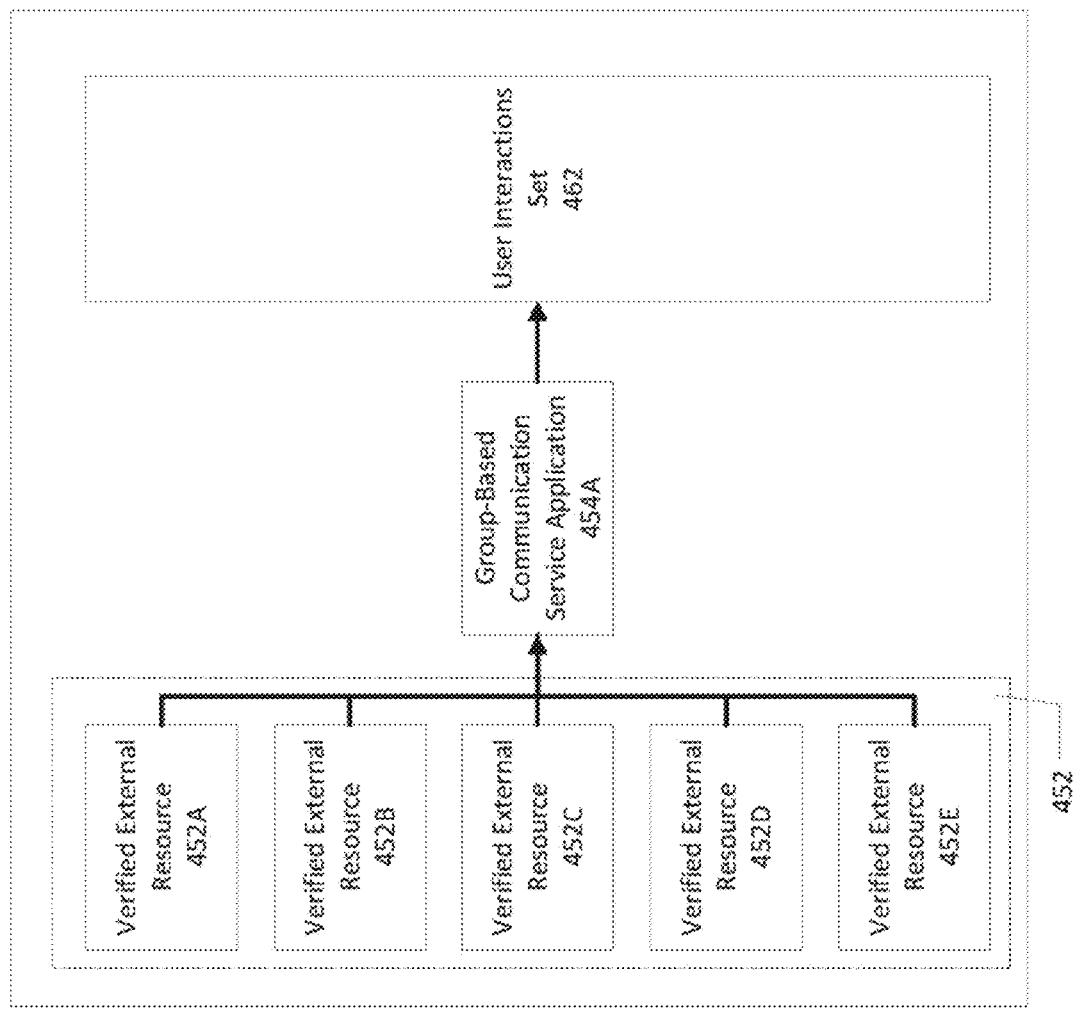

FIG. 4D illustrates a fourth example computing environment for detecting and maintaining an application context signal set associated with one or more executed application(s), for example executed and/or otherwise maintained by an apparatus 300. The example computing environment includes the group-based communication service application 454A associated with user interactions set 406, which may embody and/or be associated with an application context-based signal set, or a portion thereof. It should be appreciated that the fourth example computing environment may comprise a portion of a complete computing environment. For example, the fourth example computing environment may be configured for detecting and maintaining one or more user interactions set associated with the group-based communication service application 454A as part of a larger computing environment, such as the first example computing environment depicted in FIG. 4A or the second example computing environment depicted in FIG. 4B.

In the fourth example computing environment illustrated by FIG. 4D, the group-based communication service application 454A is associated with a verified external resource set 452, specifically comprising verified external resources 452A-452E. The group-based communication service application 454 may provide access to and/or functionality associated with each of the verified external resources 452, for example via communication with a group-based communication system. In this regard, a user of the apparatus 300 may, for example, access functionality associated with the verified external resources 452 through a group-based communication interface rendered via the group-based communication service application 454A. The group-based communication service application 454A may provide native functionality (e.g., group-based communication generating, transmitting, and receiving) as well as the functionality associated with each of the verified external resources 452.

In some embodiments, as illustrated in FIG. 4D for example, the apparatus 300 is configured to detect and maintain user interaction set(s) associated with each verified external resource 452. While accessing functionality associated with a verified external resource through the group-based communication service application 454A, the apparatus 300 may detect, identify, and/or otherwise receive user interactions associated with the functionality of the verified external resource. For example, the group-based communication service application 454A may detect user engagement with particular interface components of a group-based communication interface rendered by the group-based communication service application 454A.

In the depicted embodiment, each of the verified external resources 452 may be associated with a single user interaction set, such as single user interactions set 462. The single user interactions set 462 may be configured to store all user interactions associated with each verified external resources 452. Additionally or alternatively, the single user interactions set 462 may be configured to store all interactions associated with the group-based communication service application, including interactions associated with the native functionality provided via the group-based communication service application 454A.

The verified external resources 452 may provide various functionality via the group-based communication service application 454, and/or an associated group-based communication system. For example, verified external resource 452A may embody a video and/or audio conferencing resource that provides audio/visual conferencing functionality to users within a group-based communication interface rendered to the group-based communication service application. Verified external resource 452B may embody a collaborative workflow development tool, for example for creating tasks associated with a particular project. Verified external resource 452C may embody a document management resource, such that a user may store documents in a cloud environment, retrieve documents from a cloud environment, and/or share documents stored in a cloud environment (for example, via one or more group-based communications). It should be appreciated that each verified external resource may be associated with any of a myriad of services, functionality or the like, and that the particular examples provided are not to limit the scope or spirit of the disclosure.

The user interactions stored in the single user interactions set 462 may each be associated with an external resource identifier that uniquely identifies the verified external resource from which the interaction originated. For example, each detected application context signal originating from a verified external resource provided by the group-based communication service application 454A may include a user interaction comprising the external resource identifier associated with the corresponding verified external resource. For example, if a user interacts with a group-based communication interface component associated with a verified external resource, where the interface component is rendered via the group-based communication service application 454A, the apparatus 300 may detect an application context signal embodying and/or including the user interaction associated with or including the application identifier. The detected application context signal may be parsed to identify the application identifier.

The single user interactions set 462 may embody a user interactions subset of an application context signal set, for example where the single user interactions set 462 is uniquely associated with the group-based communication service application 454A. For example, the user interactions set 462 may embody an example implementation of user interactions set 404A as depicted in FIG. 4A with respect to the first example computing environment. Alternatively, single user interactions set 462 may embody a portion of the single user interactions set 406 as depicted in FIG. 4B with respect to the second example computing environment. It should be appreciated that, in some embodiments, an application context signal set comprises the single user interaction set 462 and one or more other user interaction set(s). In other embodiments, an application context signal set is embodied by, in whole or in part, the single user interaction set 462.

Example Interface Rendering Modifications

Based on Concentration Mode Status

Figure 5A:
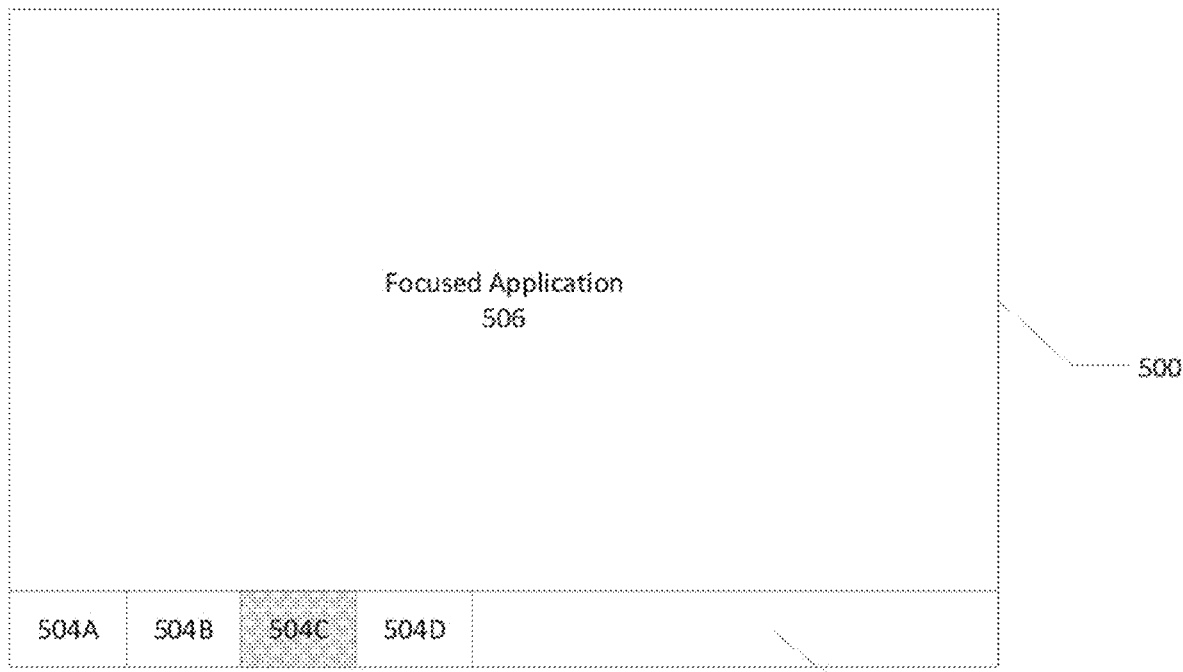
FIG. 5A illustrates a first example display comprising renderings modified based on a concentration mode status, in accordance with example embodiments of the present disclosure.
Figure 5B:
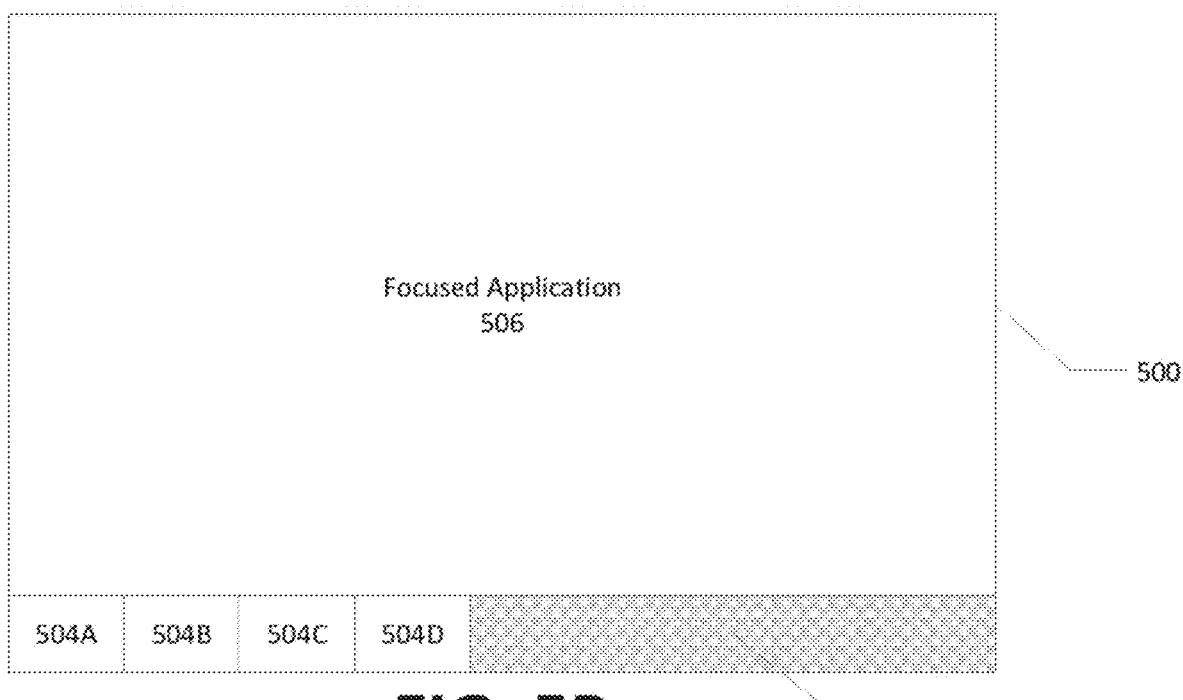
FIG. 5B illustrates a second example display comprising renderings modified based on a concentration mode status, in accordance with example embodiments of the present disclosure.

FIGS. 5A and 5B depict examples of modified renderings based on a set concentration mode status. FIGS. 5A and 5B may, for example, be rendered to a display 500 of a client device, such as a client device embodied by apparatus 300. In some embodiments, for example, the renderings may be displayed via an integrated display (e.g., a touchscreen display integrated into a smartphone or other mobile device), a dedicated LED display, a monitor, or the like.

In some embodiments, concentration mode status includes an electronically represented value indicating whether concentration mode is active for a particular user account associated with a client device accessing the group-based communication system during an authenticated session. In concentration mode, a user may, via the client device, receives limited information regarding received communications, such that the client device only provides information to the user when (1) a group-based communication and/or associated metadata set satisfies one or more applicable group-based communication service application settings that were set corresponding to the concentration mode status, or (2) a group-based communication is otherwise determined important (e.g., the group-based communication is determined to exceed an importance threshold) such that the information associated with the communication should be displayed to the user while concentration mode is active. In some embodiments, when concentration mode is active, the client device suppresses notification information associated with unsatisfactory or unimportant communications.

FIGS. 5A and 5B depict example display comprising renderings modified based on a concentration mode status. For example, FIG. 5A depicts a first example display comprising renderings modified based on a concentration mode status. As illustrated, the display includes a rendering of a focused application 506, and a task bar 502. The focused application 506 may be any one of an executed application set, including but not limited to a group-based communication service application with which a user is engaging. The task bar 502 includes a plurality of task bar items, specifically task bar items 504A-504D. The task bar 502 may, for example, be embodied by a personal computer task bar, dock, or the like rendered via an operating system of a client device, for example a client device embodied by the apparatus 300 and associated with the display 500. In some embodiments, the apparatus 300 may leverage one or more APIs, including but not limited to one or more operating system APIs, to render the task bar 502 and/or task bar items 504A-504D.

In some embodiments, the task bar includes a visual interface associated with an operating system controlled data set for executing one or more applications via the client device, accessing one or more executed applications, and/or otherwise managing one or more executed applications. In some embodiments, task bar comprises one or more task bar item(s), each task bar item associated with an executed application of an executed application set. In some embodiments, one or more executed applications is configured to augment the task bar, for example via one or more APIs associated with the executed application and/or operating system.

In some embodiments, a application task bar item includes an interface item indicating a software application associated with the application task bar item is executing via a client device. An application task bar item is rendered to a task bar included in an interface rendered to a display of the client device. In some embodiments, the application task bar item is configurable by one or more software applications, or a combination of software applications (e.g., the software application associated with the application task bar item and the operating system associated with the client device). For example, in some embodiments, each task bar item is configurable, via communication with the operating system of the client device, by the executable application associated with the task bar item.

In some embodiments, each of the task bar items 504A-504D is associated with a corresponding executed application of an executed application set. For example, the task bar item 504A may be associated with an executed email application, the task bar item 504B may be associated with an executed browser application, the task bar item 504B may be associated with an executed group-based communication service application, and the task bar item 504D may be associated with an executed video game application. It should be appreciated that the particular task bar items could be, in other embodiments, associated with any number of other executed application types, and/or appear in any arrangement and/or combination of executed applications.

In some embodiments, the concentration mode status of the group-based communication service application may modify the task bar, or one or more sub-components thereof. For example, in some embodiments, when the concentration mode status for the group-based communication service application is set to an activated status, the task bar 502 may be modified to indicate the group-based communication service application has been set to an activated status. In an example embodiment, a task bar item associated with the group-based communication service application may be augmented to indicate the concentration mode is activated.

For example, the task bar item 504C may correspond to the group-based communication service application. The augmented task bar item 504C may include a different color, shading, icon, or the like as compared to the task bar item for the group-based communication service application when the concentration mode status is set to an inactive status. In some embodiments, to modify the task bar item to the augmented task bar item 504C. In some embodiments, the apparatus 300 may utilize one or more operating system APIs and/or one or more group-based communication service application APIs.

In other embodiments, to modify at least one rendering based on a concentration mode status, the apparatus 300 may augment a task bar based on the concentration mode status. For example, as depicted by FIG. 5B, a task bar 502 may be augmented upon activation of a concentration mode. To activate concentration mode, the concentration mode status may be set to an activated status. In some embodiments, in response to setting the concentration mode status and/or upon setting a concentration mode status, the task bar 502 is augmented by changing the color, shading, pattern, and/or another property associated with the task bar 502. In this manner, the augmented task bar 502 may indicate to the user that concentration mode has been activated without requiring the user to focus the group-based communication service application.

In some embodiments, augmentation can include applying a visual filter, visual effect, animation, color change, or other visual change to the interface item. For example, in some embodiments, augmenting an interface item refers to altering a background color, a foreground color, a text color, or a background color and a foreground color, associated with the interface item.

In other embodiments, a group-based communication interface provided via the group-based communication service application is modified to indicate whether the concentration mode status is an activated status. For example, in some embodiments, the rendering of the group-based communication interface may be modified upon setting the concentration mode status to an activated status. In an example context, the group-based communication interface may be modified by augmenting the group-based communication interface. The group-based communication interface may be augmented in any of a myriad of ways to indicate the concentration mode status is set to an activated status. For example, the apparatus 300 may augment the group-based communication interface by applying a visual effect to the group-based communication interface of the group-based communication service application.

Additionally or alternatively, in some embodiments, a group-based communication interface provided via the group-based communication service application is modified to include only certain group-based communications or notification information associated with only certain group-based communications upon activation of concentration mode. For example, notification information may only be rendered for one or more newly received group-based communications that satisfy one or more group-based communication service application setting(s). Alternatively, group-based notifications and/or notification information (e.g., badges) associated with group-based communications that do not satisfy one or more group-based communication service application settings may be visually altered (e.g., suppressed, made semi-transparent, hidden, obscured, or the like).

Example System Signal Flow

Figure 6:
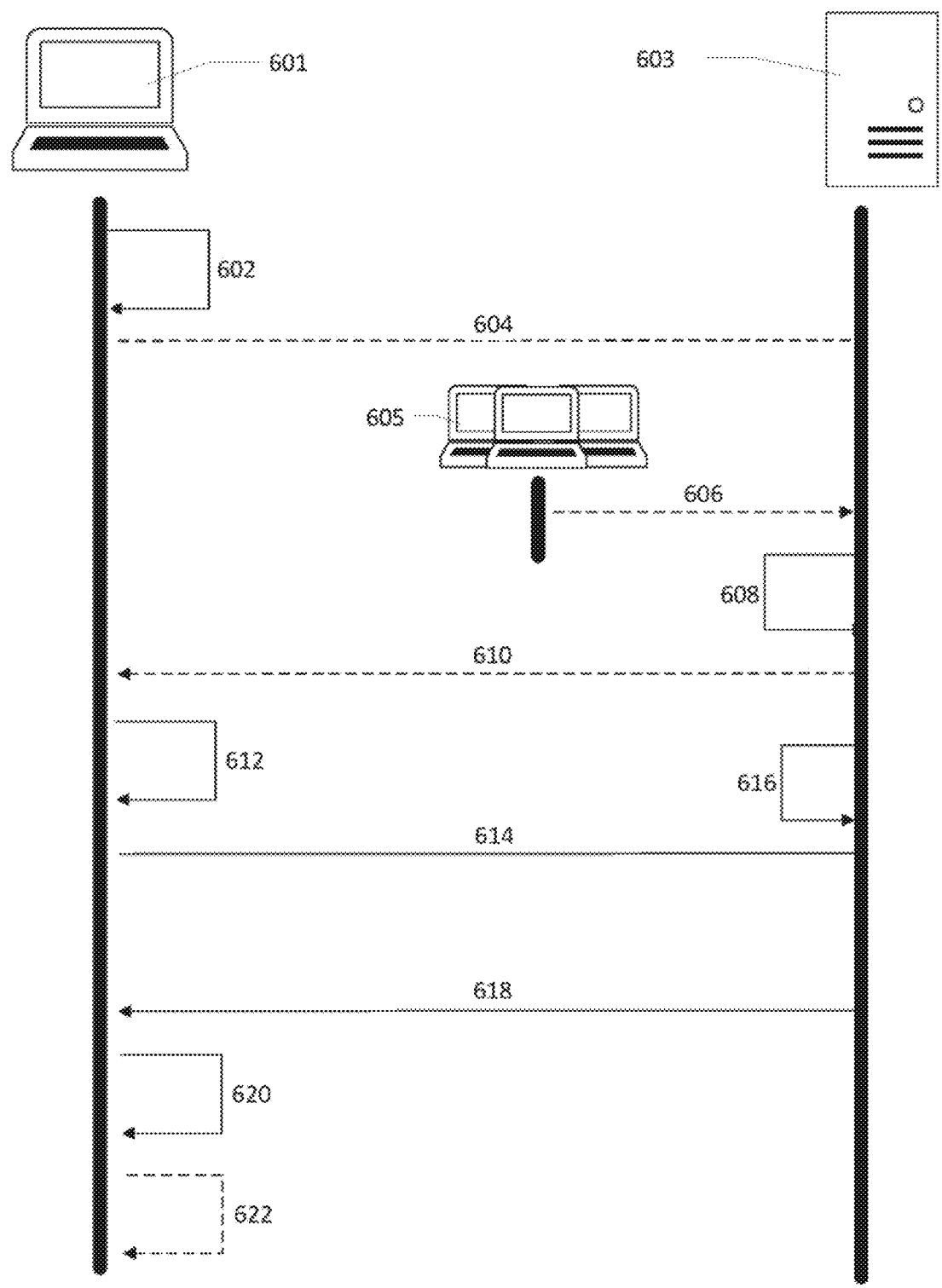
FIG. 6 illustrates an example signal diagram between components of an example system, in accordance with an embodiment of the present disclosure

FIG. 6 illustrates an example signal diagram between components of an example system, in accordance with an embodiment of the present disclosure. In the particular diagram depicted, for example, the signals may be transmitted between devices, apparatuses, and the like, such as a client device 601, for example embodied by the apparatus 300, and a group-based communication system 603, for example embodied by the apparatus 200. In some embodiments, signals may be further transmitted between one or more additional client devices 605, and the client device 601 and/or group-based communication system 603. Optional steps are illustrated in dashed or broken lines. Optional steps may be performed in some embodiments, and not performed in other embodiments. Additionally or alternatively, in some embodiments, a subset of the depicted optional operations are performed.

At step 602, the client device 601 is configured to detect an application context signal set associated with an executed application set. In some embodiments, the application context signal set includes one or more user interaction sets associated with the executed application set. For example, the application context signal set may include clicks, taps, voice commands, keystrokes, gestures, and the like, executed via the client device. Additionally or alternatively, the user interactions may include information associated with one or more actions performed in response to such user engagements. For example, a user interaction may include details associated with one or more functions and/or routines executed in response to one or more user clicks, voice commands, gestures, or other actions.

In some embodiments, the application context signal set may include one or more user interactions associated with a group-based communication service application. For example the application context signal set may include user interactions performed by the user to access native functionality associated with the group-based communication service application.

Additionally or alternatively, the application context signal set may include one or more user interactions associated with one or more verified third-party resources accessible via the group-based communication service application. In this regard, the client device 601 may be configured to detect, receive, identify, or otherwise parse the user interactions directly from the group-based communication service application. For example, the group-based communication service application may be configured to detect and store user interactions performed via one or more verified third-party resources, and generate and/or store such user interactions in a database associated with the client device.

The application context signal set may be detected via one or more APIs. For example, at least a portion of the application context signal set may be detected via one or more operating system APIs. Additionally or alternatively, at least a portion of the application context signal set may be detected via one or more application specific APIs. For example, user interactions associated with a group-based communication service application, or a verified third-party resource accessible via the group-based communication resource, may be detected via an API provided via the group-based communication service application or a corresponding group-based communication system. Similarly, in some embodiments, one or more other applications may provide custom APIs for detecting a portion of the application context signal set associated with the executed application.

At optional step 604, the client device 601 is configured to transmit an application context signal set to the group-based communication system 603. In some embodiments, the transmitted application context signal set comprises the application context signal set detected at step 602. In some other embodiments, the transmitted application context signal set comprises a subset of the data included in the application context signal set detected at step 602. For example, additionally or alternatively in some embodiments, the transmitted application context signal set may embody an anonymized application context signal set, such that data identifying the particular client device 601 and/or user account associated with the client device 601 is removed. In yet other embodiments, the transmitted application context signal set may embody a summarized version of the application context signal set, such that the transmitted application context signal set includes only aggregated data rather than individual user interactions.

At optional step 606, the group-based communication system 603 is configured to receive a set of application context signal sets from one or more other client devices 605. The one or more other client devices 605 may be associated with one or more other user accounts differing from the user account associated with the client device 601. In some embodiments, each additional application context signal set received may embody an additional anonymized application context signal set, such that the application context signal set does not include information for identifying the additional client device of the client devices 605 from which the additional application context signal set was received, and/or does not include data for identifying the additional user account associated with the additional client device from which the additional application context signal set was received. The additional application context signal sets may be each be detected as described herein by a corresponding user device.

At step 608, the group-based communication system 603 is configured to train a context-based determination model based on the received application context signal sets. In some embodiments, the context-based concentration determination model may embody a statistical, algorithmic, or machine learning model, or a combination thereof, trained to generate a concentration mode status based on an application context signal set. The context-based concentration determination model may be embodied by, or utilize, one or more unsupervised or supervised learning implementations. Additionally, the context-based concentration determination model may be implemented using any of a number of clustering, prediction, and/or classification machine learning models. For example, the context-based concentration determination model may be implemented, for example and without limitation, using K-means, regression, decision tree, random forest, and/or support vector machines implementations. Additionally or alternatively, the context-based concentration determination model may be trained to minimize error between predictions generated using an application context signal set, or a subset thereof, and a labelled and/or otherwise enumerated concentration mode status.

At optional step 610, the group-based communication system 603 is configured to provide the trained context-based concentration determination model to the client device 601. For example, the group-based communication system may provide the trained context-based concentration determination model to the cause the client device 601 to store the trained context-based concentration determination model for future use. In some embodiments, the trained context-based concentration determination model may be transmitted to one or more of the additional client devices 605. For example, the trained context-based concentration determination model may be provided to each client device communicable with the group-based communication system 603.

In some embodiments, the trained context-based concentration determination model includes a specially configured statistical, algorithmic, or machine learning model, or a combination thereof, for generating (1) an application context-based concentration score or (2) a concentration mode activation indicator, based on an application context signal set. In some embodiments, a trained context-based concentration determination model utilizes a supervised learning machine learning model or an unsupervised learning machine learning model to generate a corresponding output. A trained context-based concentration determination model is configured to utilize, as input, at least an application context signal set or a portion thereof. In some embodiments, a trained context-based concentration determination model is trained based on a training application context signal set associated with a particular user, or a set of training application context signal sets associated with a user set. Additionally or alternatively, a trained context-based concentration determination model may be trained based on a set of training application context signal sets associated with a third-party user set, and tuned based on a training application context signal set associated with the corresponding user for which the model is trained.

In an example context, the trained context-based concentration determination model is configured to generate an application context-based concentration score associated with a particular user account associated with a client device. In some such embodiments, an application context signal set is detected and applied to the trained context-based concentration determination model to generate the corresponding application context-based concentration score. The application context-based concentration score may, for example, represent a concentration level associated with the user of the user account, such that one or more group-based communication service application settings may be set based on the generated score for providing a notification information with a customized subset of group-based communications that are likely to be of interest to the user. Thus, the group-based communication service application settings may be set such that notifications are only rendered associated with group-based communications with which the user is likely to interact.

At step 612, the client device 601 is configured to generate an application context-based concentration score.

In some embodiments, the client device 601 generates the application context-based concentration score using one or more algorithms and/or mathematical transformations based on the application context signal set. In some embodiments, the client device 601 generates the application context-based concentration score using a trained context-based concentration determination model, which may have been received at an earlier step (for example, at step 610 as illustrated). For example, a detected application context signal set (e.g., a newly detected application context signal set) may be applied to the trained context-based concentration determination model to generate the context-based concentration score. The application context-based concentration score may represent a concentration level associated with the user of the client device 601. In some embodiments, a higher application context-based concentration score corresponds to a higher concentration level, and a lower application context-based concentration score corresponds to a lower concentration level. In other embodiments, a lower concentration score corresponds to a higher concentration level, and a higher application context-based concentration score corresponds to a lower concentration level.

At step 614, client device 601 is configured to transmit the generated application context-based concentration score to the group-based communication system 603. The application context-based concentration score may be transmitted along with information identifying the client device 601 and/or a user account identifier used to access the group-based communication system 603. For example, in some embodiments, the application context-based concentration score may be transmitted associated with a user account identifier that the user associated with the client device 601 authenticated to access the group-based communication system 603.

At step 616, the group-based communication system 603 is configured to determine a concentration mode status indicator based on the received application context-based concentration score. In some embodiments, the group-based communication system may determine the concentration mode status based on a comparison between the application context-based concentration score and one or more concentration thresholds. For example, in a particular context, the concentration mode status may represent a binary status (e.g., an activated status or an inactive status). In some such embodiments, the application context-based concentration score may be compared with a single concentration mode threshold that, when satisfied based on the comparison, the determined concentration mode status indicator represents an activated status. In other embodiments, the concentration mode status may be any of a number of statuses (e.g., an inactive status, a low concentration status, a moderate concentration status, and a high concentration status). In some such embodiments, the application context-based concentration score may be compared with multiple concentration thresholds to determine a concentration mode status based on which concentration thresholds are satisfied. For example, in some example embodiments, a low concentration threshold and a moderate concentration threshold may be satisfied, and the group-based communication system may determine the concentration mode status is a moderate concentration status. In some embodiments, the group-based communication system 603 may identify one or more concentration threshold(s) using a threshold generation model. The threshold generation model may be one or more algorithmic, statistical, or machine learning models trained to generate one or more concentration thresholds for a particular user account.

In some embodiments, the concentration mode status indicator includes a transmission of signals and/or data object(s) from a group-based communication system to a client device based on one or more determination(s) performed by the group-based communication system. The concentration mode status indicator is, in some embodiments, configured to cause the receiving client device to set, and/or toggle, a concentration mode status corresponding to the concentration mode status indicator.

Additionally or alternatively, in some embodiments, the group-based communication system 603 may set a concentration mode status associated with the client device 601. For example, the concentration mode status may be set at a server level for filtering transmission of received group-based communications to the client device 601. For example, group-based communications determined not likely to be engaged with may be suppressed.

At step 618, the group-based communication system 603 is configured to transmit a concentration mode status indicator to the client device 601. In some embodiments, the concentration mode status indicator represents the concentration mode status determined at a previous step. For example, the concentration mode status indicator may include a data object representation of the determined concentration mode status. In some embodiments, the concentration mode status indicator is transmitted as a response to an earlier transmission received from the client device 601, for example in response to the transmission sent at step 614.

At step 620, the client device 601 is configured to set a concentration mode based on the concentration mode indicator to modify one or more renderings. In some embodiments, the concentration mode may be set to modify one or more renderings associated with the group-based communication service application. For example, the client device 601 may modify one or more renderings of a group-based communication interface, notification information associated with newly received group-based communication(s), and/or a task bar and/or task bar item associated with the group-based communication service application. The renderings may be modified as described herein, including but not limited to augmenting the renderings as described.

At optional step 622, the client device 601 is configured to set one or more group-based communication service application settings based on the set concentration mode. For example, the group-based communication service application settings may be set to particular values based on the determined concentration mode status. In some embodiments, the group-based communication service applications settings may be set to a default value set when concentration mode is inactive (e.g., set to an inactive status). The group-based communication service application settings may be changed to particular values set by a user or determined by the group-based communication system 603 when concentration mode is activated (e.g., set to an active status, or one or more associated statuses). In some embodiments, the group-based communication service application settings may be set based on one or more identified concentration profiles, as described herein.

Example Contextual Mode Management Processes

Figure 7:
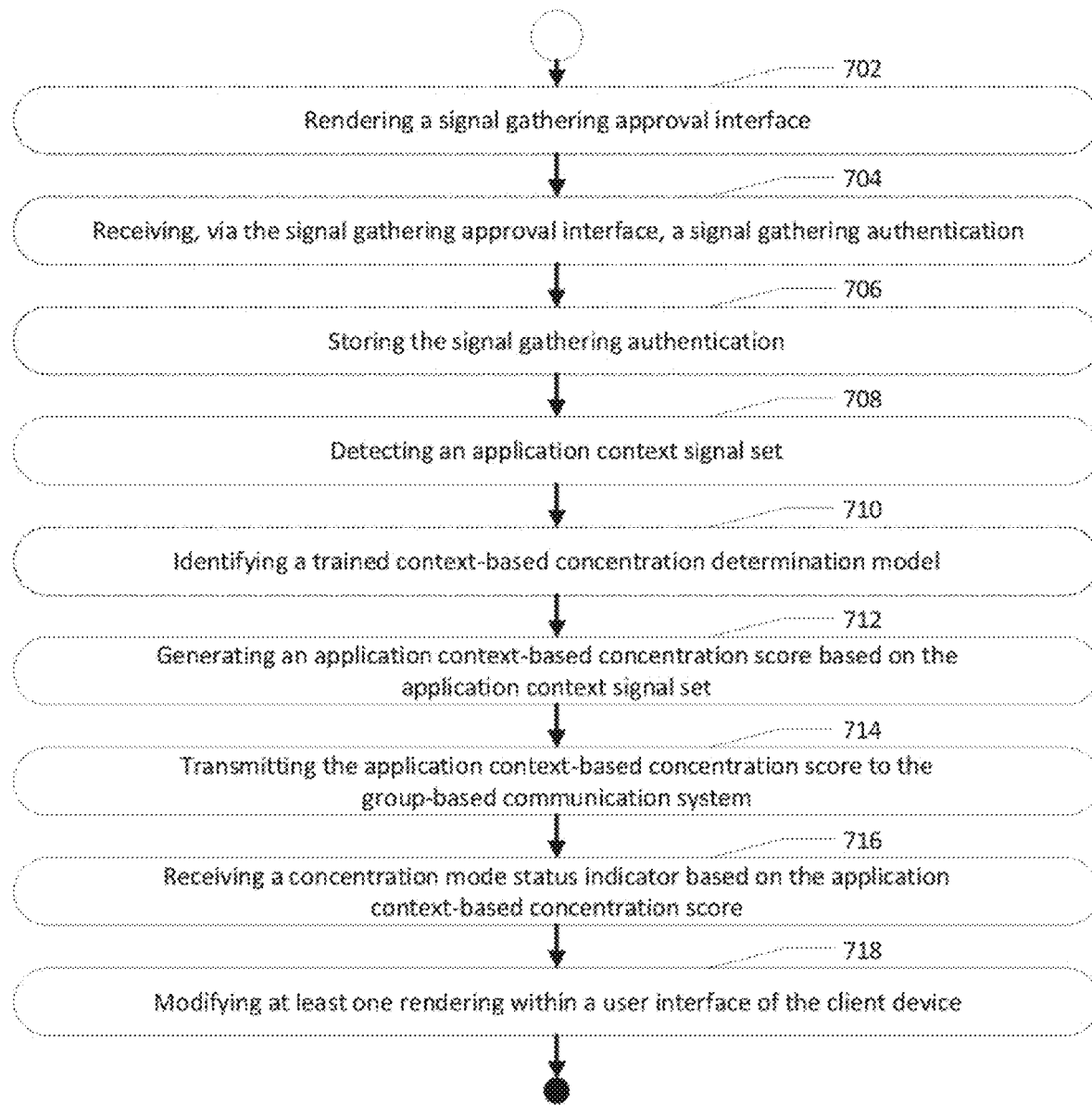
FIG. 7 illustrates a flowchart depicting example operations for managing a concentration mode associated with a client device, specifically, for server-based application context-based concentration score analysis, in accordance with example embodiments of the present disclosure.

FIG. 7 illustrates a flowchart depicting example operations for managing a concentration mode associated with a client device, in accordance with some embodiments of the present disclosure. Specifically, the operations depicted with respect to FIG. 7 include operations for server-based application context-based concentration score analysis. In this regard, the operations depicted, in some embodiments, are performed by a client device. For example, in some embodiments, the operations depicted are performed by a client device embodied by the apparatus 300. The apparatus 300 may be in communication with a group-based communication system, which may be embodied by the apparatus 200.

At optional block 702, the apparatus 300 includes means, such as client group-based communication management module 310, client context-based concentration module 312, input/output module 306, communications module 308, processor 302, and/or the like, or a combination thereof, for rendering a signal gathering approval interface. The signal gathering approval interface may be configured to receive user engagement indicating whether the user approves the apparatus 300 to detect an application context signal set. The apparatus 300 may detect various user interactions associated with various executed applications, including both an executed group-based communication service application and other executed applications. The signal gathering approval interface may include information, text, or the like to inform the user that user interactions will be detected, parsed, and/or other identifier with respect to one or more executed applications.

In some embodiments, the signal gathering approval interface may include at least an approval component. The approval component may be configured to receive a signal gathering authentication, for example in response to user engagement with the approval component. In some embodiments, the approval component is embodied by a button user interface component, for example an "approve" button" configured to receive such user engagement. In some embodiments, the signal gathering approval interface additionally includes a rejection component. For example, the rejection component may be configured to receive a signal gathering rejection in response to use engagement with the rejection component.

In some embodiments, the apparatus 300 generates and/or retrieves the signal gathering approval interface for rendering. In some embodiments, the apparatus 300 may render the signal approval interface using one or more API. For example, in some embodiments, the apparatus 300 may use one or more operating system APIs for rendering the signal gathering approval interface.

In some embodiments, the signal gathering approval interface includes a particular user interface comprising at least an "approval component" for permissioning the group-based communication system and/or group-based communication service application for detecting, parsing, extracting, or otherwise tracking of user actions to detect a corresponding application context signal set. A signal gathering approval interface is rendered to a client device to receive user engagement with the interface.

At optional block 704, the apparatus 300 includes means, such as client group-based communication management module 310, client context-based concentration module 312, input/output module 306, communications module 308, processor 302, and/or the like, or a combination thereof, for receiving, via the signal gathering approval interface, a signal gathering authentication. The signal gathering authentication may, in some embodiments, be embodied by a data object indicating the user engaged with an approval component.

In some embodiments, the signal gathering authentication includes electronic data representing permission in response to a signal gathering approval interface. In some embodiments, a signal gathering authentication is generated and/or received in response to user engagement with an approval component of a signal gathering approval interface.

At optional block 706, the apparatus 300 includes means, such as client group-based communication management module 310, client context-based concentration module 312, communications module 308, processor 302, and/or the like, or a combination thereof, for storing the received signal gathering authentication. In some embodiments, the signal gathering authentication is stored locally. Additionally or alternatively, in some embodiments, the apparatus 300 may transmit the received signal gathering authentication to a group-based communication system for storing. The received signal gathering authentication may be transmitted along with, or including, a client device identifier and/or user account identifier associated with the client device. In some embodiments, the apparatus 300 may perform one or more queries and/or subsequent analysis to determine if a signal gathering authentication for a particular client device and/or user account has been received before detecting an application context signal set.

At block 708, the apparatus 300 includes means, such as client group-based communication management module 310, client context-based concentration module 312, input/output module 306, communications module 308, processor 302, and/or the like, or a combination thereof, for detecting an application context signal set. The application context signal set may include user interactions performed for one or more executed applications that are executing via the apparatus 300. For example, the application context signal set may include user interactions embodying user taps, clicks, voice commands, gestures, keystrokes, or the like, performed within an executed application of an executed application set. In some embodiments, the application context signal set may include one or more user interactions sets. For example, in some embodiments, the application context signal set is embodied by a single user interactions set associated with all executed applications of an executed applications set. In some other embodiments, the application context signal set is embodied by a set of user interactions sets, for example a user interaction set associated with each executed application. In some embodiments, the application context signal set is detected using one or more of the operations described below with respect to FIG. 10.

At block 710, the apparatus 300 includes means, such as client group-based communication management module 310, client context-based concentration module 312, communications module 308, processor 302, and/or the like, or a combination thereof, for identifying a trained context-based concentration determination model. The trained context-based concentration determination model may be trained to generate an application context-based concentration score based on an input application context signal set. In some embodiments, the trained context-based concentration determination model may be received from a group-based communication system and/or retrieved from a database, for example where the trained application-context concentration determination model was received from the group-based communication system at an earlier block.

The trained application context-based concentration determination model may be embodied by any one of a myriad of ways. In some embodiments, the application context-based concentration determination model is embodied by one or more statistical model, algorithmic model, and/or machine learning model, or a combination thereof. In some embodiments, the application context-based concentration determination model includes any one of a myriad of machine learning implementations. For example, the trained application context-based concentration determination model may be embodied by a supervised learning machine learning implementation or an unsupervised machine learning implementation. The trained application context-based concentration determination model may be trained based on previously detected and/or received application context signal sets.

In some embodiments, the trained context-based concentration determination model may be identified based on a user account identifier, a client device identifier, or a combination thereof. For example, in some embodiments, the trained context-based concentration determination model is received from the group-based communication system and tuned for the user account associated with client device. For example, the apparatus 300 may tune one or more parameters based on one or more historical application context signal sets associated with the user account. In this regard, each model may be trained based on aggregate data for multiple user accounts to identify trends associated with user interactions, then specially configured to improve accuracy for a particular user.

In other embodiments, the context-based concentration determination model may be trained by the apparatus 300 directly. For example, the context-based concentration determination model may train the apparatus 300 based on application context signal set(s) previously detected and/or stored by the apparatus 300. Alternatively or additionally, the context-based concentration determination model may retrieve a training application context signal set (e.g., modified to remove private information) from the group-based communication system for training. In yet another embodiment, the context-based concentration determination model may be trained by the apparatus 300 and the group-based communication system. For example, the apparatus 300 and group-based communication system may each perform one or more training operations.

At block 712, the apparatus 300 includes means, such as client group-based communication management module 310, client context-based concentration module 312, processor 302, and/or the like, or a combination thereof, for generating an application context-based concentration score based on the application context signal set. In some embodiments, the application context signal set is analyzed to generate the application context-based concentration score. For example, the application context-based concentration score may be determined by applying the application context signal set to the application context-based concentration determination model. The application context-based concentration score may indicate a concentration level associated with the user account and/or client device associated with the application context signal set.

In some embodiments, the application context-based concentration score may be generated between a concentration score minimum and a concentration score maximum. For example, in some embodiments, the concentration score minimum is 0 and the concentration score maximum is 100, where a higher application context-based concentration score represents the user is concentrating more than a lesser score (or in other embodiments, the reverse is used, where a lower score indicates higher concentration levels). In other embodiments, the concentration score minimum is 0 and the concentration score maximum in 1.0. It should be appreciated that any scale may be used to represent various concentration levels.

At block 714, the apparatus 300 includes means, such as client group-based communication management module 310, client context-based concentration module 312, communications module 308, processor 302, and/or the like, or a combination thereof, for transmitting the application context-based concentration score to a group-based communication system. In some embodiments, the apparatus 300 may transmit the application context-based concentration score to cause the group-based communication system to generate, identify, or otherwise determine a concentration mode indicator based on the application context-based concentration score. For example, in some embodiments, the group-based communication system may be caused to apply the application context-based concentration score to a statistical, algorithmic, and/or machine learning model to determine if the concentration mode status indicator should represent an activated status. In other embodiments, the group-based communication system is caused to compare the application context-based concentration score to a concentration mode threshold to determine the concentration mode status indicator.

At block 716, the apparatus 300 includes means, such as client group-based communication management module 310, client context-based concentration module 312, communications module 308, processor 302, and/or the like, or a combination thereof, for receiving a concentration mode status indicator based on the application the application context-based concentration score. In response to receiving the concentration mode status indicator, the apparatus 300 may perform one or more actions. For example, the apparatus 300 may set one or more statuses, adjust one or more settings, and/or modify one or more renderings based on the concentration mode status to be set based on the concentration mode status indicator.

At block 718, the apparatus 300 includes means, such as client group-based communication management module 310, client context-based concentration module 312, input/output module 306, communications module 308, processor 302, and/or the like, or a combination thereof, for modifying at least one rendering within a user interface of the client device. The at least one rendering may be modified based on a concentration mode status, the concentration mode status set based on the received concentration mode status indicator. In some embodiments, for example, the concentration mode status set is associated with a corresponding group-based communication service application. While in concentration mode, received group-based communications may be suppressed and/or notifications associated with some or all received group-based communications may be suppressed. For example, the apparatus 300 may set one or more group-based communication service application settings based on the concentration mode status, such that notification information associated with a received group-based communication is rendered when the newly received group-based communication, and/or metadata associated with the newly received group-based communication, satisfies the group-based communication service application setting set.

Figure 8:
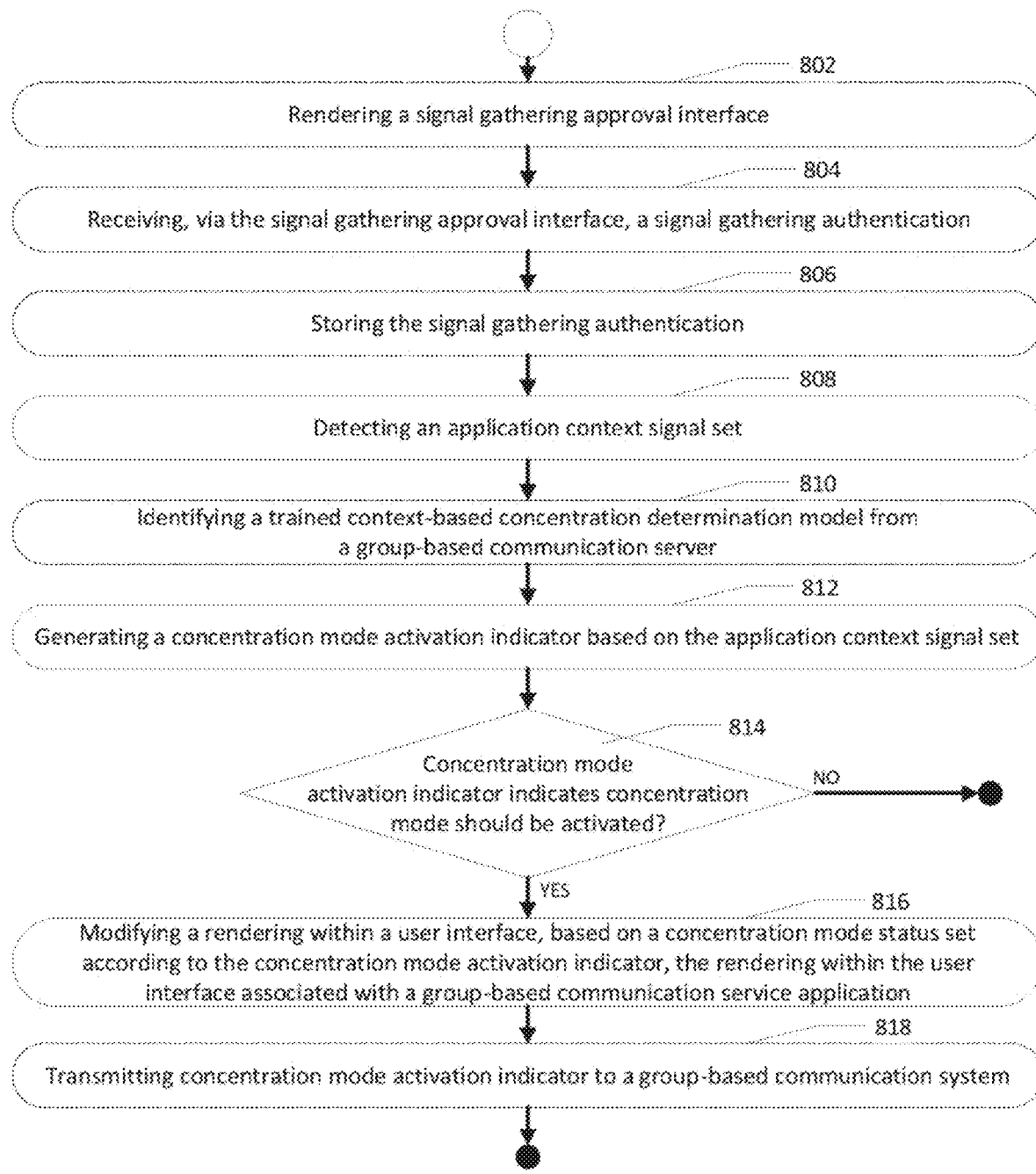
FIG. 8 illustrates a flowchart depicting example operations for managing a concentration mode associated with a client device, specifically, for client-based application context-based concentration score analysis, in accordance with example embodiments of the present disclosure.

FIG. 8 illustrates another flowchart depicting example operations for managing a concentration mode associated with a client device, in accordance with some example embodiments of the present disclosure. Specifically, the operations depicted with respect to FIG. 8 include operations for client-based application context-based concentration score analysis. In this regard, the operations depicted, in some embodiments, are performed by a client device. For example, in some embodiments, the operations depicted are performed by a client device embodied by the apparatus 300. The apparatus 300 may be in communication with a group-based communication system, which may be embodied by the apparatus 200.

At optional block 802, the apparatus 300 includes means, such as client group-based communication management module 310, client context-based concentration module 312, input/output module 306, communications module 308, processor 302, and/or the like, or a combination thereof, for rendering a signal gathering approval interface. The signal gathering approval interface may be configured to receive user engagement indicating whether the user approves the apparatus 300 to detect an application context signal set. The apparatus 300 may detect various user interactions associated with various executed applications, including both an executed group-based communication service application and other executed applications. The signal gathering approval interface may include information, text, or the like to inform the user that user interactions will be detected, parsed, and/or other identifier with respect to one or more executed applications.

In some embodiments, the signal gathering approval interface may include at least an approval component. The approval component may be configured to receive a signal gathering authentication, for example in response to user engagement with the approval component. In some embodiments, the approval component is embodied by a button user interface component, for example an "approve" button" configured to receive such user engagement. In some embodiments, the signal gathering approval interface additionally includes a rejection component. For example, the rejection component may be configured to receive a signal gathering rejection in response to use engagement with the rejection component.

In some embodiments, the apparatus 300 generates and/or retrieves the signal gathering approval interface for rendering. In some embodiments, the apparatus 300 may render the signal approval interface using one or more API. For example, in some embodiments, the apparatus 300 may use one or more operating system APIs for rendering the signal gathering approval interface.

At optional block 804, the apparatus 300 includes means, such as client group-based communication management module 310, client context-based concentration module 312, input/output module 306, communications module 308, processor 302, and/or the like, or a combination thereof, for receiving, via the signal gathering approval interface, a signal gathering authentication. The signal gathering authentication may, in some embodiments, be embodied by a data object indicating the user engaged with an approval component.

At optional block 806, the apparatus 300 includes means, such as client group-based communication management module 310, client context-based concentration module 312, communications module 308, processor 302, and/or the like, or a combination thereof, for storing the received signal gathering authentication. In some embodiments, the signal gathering authentication is stored locally. Additionally or alternatively, in some embodiments, the apparatus 300 may transmit the received signal gathering authentication to a group-based communication system for storing. The received signal gathering authentication may be transmitted along with, or including, a client device identifier and/or user account identifier associated with the client device. In some embodiments, the apparatus 300 may perform one or more queries and/or subsequent analysis to determine if a signal gathering authentication for a particular client device and/or user account has been received before detecting an application context signal set.

At block 808, the apparatus 300 includes means, such as client group-based communication management module 310, client context-based concentration module 312, input/output module 306, communications module 308, processor 302, and/or the like, or a combination thereof, for detecting an application context signal set. The application context signal set may include user interactions performed for one or more executed applications that are executing via the apparatus 300. For example, the application context signal set may include user interactions embodying user taps, clicks, voice commands, gestures, keystrokes, or the like, performed within an executed application of an executed application set. In some embodiments, the application context signal set may include one or more user interactions sets. For example, in some embodiments, the application context signal set is embodied by a single user interactions set associated with all executed applications of an executed applications set. In some other embodiments, the application context signal set is embodied by a set of user interactions sets, for example a user interaction set associated with each executed application. In some embodiments, the application context signal set is detected using one or more of the operations described below with respect to FIG. 10.

At block 810, the apparatus 300 includes means, such as client group-based communication management module 310, client context-based concentration module 312, communications module 308, processor 302, and/or the like, or a combination thereof, for identifying a trained context-based concentration determination model. The trained context-based concentration determination model may be trained to generate an application context-based concentration score based on an input application context signal set. In some embodiments, the trained context-based concentration determination model may be received from a group-based communication system and/or retrieved from a database, for example where the trained application-context concentration determination model was received from the group-based communication system at an earlier block.

The trained application context-based concentration determination model may be embodied by any one of a myriad of ways. In some embodiments, the application context-based concentration determination model is embodied by one or more statistical model, algorithmic model, and/or machine learning model, or a combination thereof. In some embodiments, the application context-based concentration determination model includes any one of a myriad of machine learning implementations. For example, the trained application context-based concentration determination model may be embodied by a supervised learning machine learning implementation or an unsupervised machine learning implementation. The trained application context-based concentration determination model may be trained based on previously detected and/or received application context signal sets.

In some embodiments, the trained context-based concentration determination model may be identified based on a user account identifier, a client device identifier, or a combination thereof. For example, in some embodiments, the trained context-based concentration determination model is received from the group-based communication system and tuned for the user account associated with client device. For example, the apparatus 300 may tune one or more parameters based on one or more historical application context signal sets associated with the user account. In this regard, each model may be trained based on aggregate data for multiple user accounts to identify trends associated with user interactions, then specially configured to improve accuracy for a particular user.

At block 812, the apparatus 300 includes means, such as client group-based communication management module 310, client context-based concentration module 312, communications module 308, processor 302, and/or the like, or a combination thereof, for generating a concentration mode activation indicator based on the application context signal set. In some embodiments, the application context signal set is analyzed to generate the concentration mode activation indicator. For example, the concentration mode activation indicator may be generated by applying the application context signal set to the application context-based concentration determination model. In some embodiments, the concentration mode activation indicator may represent whether concentration mode should be active or inactive. In other embodiments, concentration mode activation indicator may represent a concentration mode status that a group-based communication service application should be set to. Thee concentration mode activation indicator may represent a binary status (e.g., activate or deactivate a concentration mode), or may indicate one of a plurality of concentration mode statuses (e.g., light concentration mode, moderate concentration mode, heavy concentration mode, or the like).

At decision 814, the apparatus 300 includes means, such as client group-based communication management module 310, client context-based concentration module 312, communications module 308, processor 302, and/or the like, or a combination thereof, for determining whether the concentration mode activation indicator indicates that a concentration mode status should be activated. For example, in some embodiments, the concentration mode activation indicator represents a binary activation status (e.g., either activated or deactivated). In other embodiments, the concentration mode activation indicator represents one from a predetermined set of concentration mode statuses. The concentration mode activation indicator may be compared with a predetermined binary activation status or predetermined set of concentration mode statuses to determine whether the concatenation mode activation indicator indicates that a concentration mode status should be activated.

If, at decision 814, apparatus 300 determines the concentration mode activation indicator indicates the concentration mode status should be deactivated, the flow may end. In other embodiments, if the concentration mode activation indicator indicates the concentration mode status should be deactivated, the apparatus 300 may include the identified means for setting a concentration mode for a group-based communication service application to a deactivated status, and/or for modifying at least one rendering within a user interface, based on the concentration mode status set according to the concentration mode activation indicator, and wherein the at least one rendering is within the user interface associated with a group-based communication service application.

At block 816, the apparatus 300 includes means, such as client group-based communication management module 310, client context-based concentration module 312, communications module 308, processor 302, and/or the like, or a combination thereof, for modifying at least one rendering within a user interface, based on a concentration mode status set according to the concentration mode activation indicator, and wherein the at least one rendering is within the user interface associated with a group-based communication service application. In some embodiments, for example, the apparatus 300 sets a concentration status associated with the group-based communication service application to an activated status. In so doing, the apparatus 300 may set one or more group-based communication service application settings used to modify one or more renderings to one or more user interfaces associated with the group-based communication service application. For example, in some embodiments, the group-based communication service application, while in concentration mode, may generate notification information for group-based communications received that satisfy a particular group-based communication service application set.

Alternatively or additionally, upon activation of concentration mode and/or while in concentration mode, the apparatus 300 may modify one or more interfaces by augmenting the interface or a component thereof. For example, in some embodiments, the apparatus 300 may apply a visual effect to the group-based communication interface while concentration mode is active. For example, a group-based communication interface rendered via the group-based communication service application may have one or more colors associated with the interface updated (e.g., a background color, a foreground color, text color, or the like), Additionally or alternatively, in some embodiments, the apparatus 300 augments a task bar and/or a task bar item based on the concentration mode status (e.g., a first color and/or visual effect applied when active, and a second color and/or visual effect applied when deactivated).

At optional block 816, the apparatus 300 includes means, such as client group-based communication management module 310, client context-based concentration module 312, communications module 308, processor 302, and/or the like, or a combination thereof, for transmitting the concentration mode activation indicator to the group-based communication system. In some embodiments, the apparatus 300 may transmit the concentration mode activation indicator to cause the group-based communication system to set a concentration mode associated with the apparatus 300. Alternatively or additionally, in some embodiments, the apparatus 300 transmit the concentration mode activation indicator to cause the group-based communication system to set a last active status associated with a user account associated with the apparatus 300. For example, a user may authenticate a particular user account via the apparatus 300 for accessing the group-based communication system, and functionality thereof, via a group-based communication service application. The last active status may represent a particular timestamp at which the user account was associated with an activated concentration mode, or in other embodiments a particular timestamp at which the user account was associated with an inactive concentration mode status.

Figure 9:
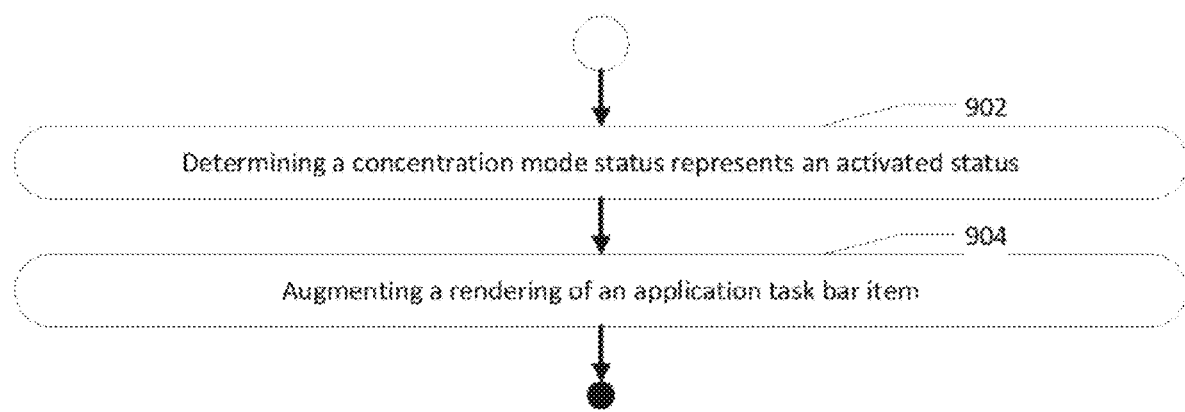
FIG. 9 illustrates a flowchart depicting example operations for managing a concentration mode associated with a client device, specifically, for modifying one or more rendering(s), based on a concentration mode status that is set according to a concentration mode activation indicator, where the rendering(s) are within a user interface associated with a group-based communication application executed via a client device, in accordance with example embodiments of the present disclosure.

FIG. 9 illustrates another flowchart depicting example operations for managing a concentration mode associated with a client device, in accordance with some example embodiments of the present disclosure. Specifically, the operations depicted with respect to FIG. 9 include operations for modifying one or more rendering(s), based on a concentration mode status that is set according to a concentration mode activation indicator, where the rendering(s) are within a user interface associated with a group-based communication service application executed via a client device. In this regard, the operations depicted with respect to FIG. 9 may replace, supplant, or occur currently or in addition to block 718 as depicted in FIG. 7, or block 816 as depicted in FIG. 8.

At block 902, the apparatus 300 includes means, such as client group-based communication management module 310, client context-based concentration module 312, processor 302, and/or the like, or a combination thereof, for determining a concentration mode status represents an activated status. For example, in some embodiments, a concentration mode activation indicator generated, determined, or received for setting the concentration mode status is analyzed and/or compared to determine whether the concentration mode status is to be activated. For example, the concentration mode activation indicator may be compared with a predetermined binary activation status or predetermined set of concentration mode statuses to determine whether the concatenation mode activation indicator indicates that a concentration mode status should be activated.

At block 904, the apparatus 300 includes means, such as client group-based communication management module 310, client context-based concentration module 312, communications module 308, processor 302, and/or the like, or a combination thereof, for augmenting a rendering of an application task bar. In some embodiments, the apparatus 300 augments the application task bar itself. Additionally or alternatively, in some embodiments, the apparatus 300 augments an application task bar item of the task bar. to indicate the concentration mode is active (e.g., set to an activated status). In some embodiments, to augment the application task bar and/or application task bar item, a color, icon, size, or other visual element of the application task bar and/or application task bar item is changed, or a visual effect is applied.

In other embodiments, additionally or alternatively, one or more other renderings are augmented based on the concentration mode status. For example, a group-based communication interface may be augmented based on the concentration mode status. In some such embodiments, the group-based communication interface may be augmented based on one concentration mode status. The group-based communication interface may be augmented to indicate when concentration mode is active (e.g., by changing from a default view when concentration mode is inactive).

Figure 10:
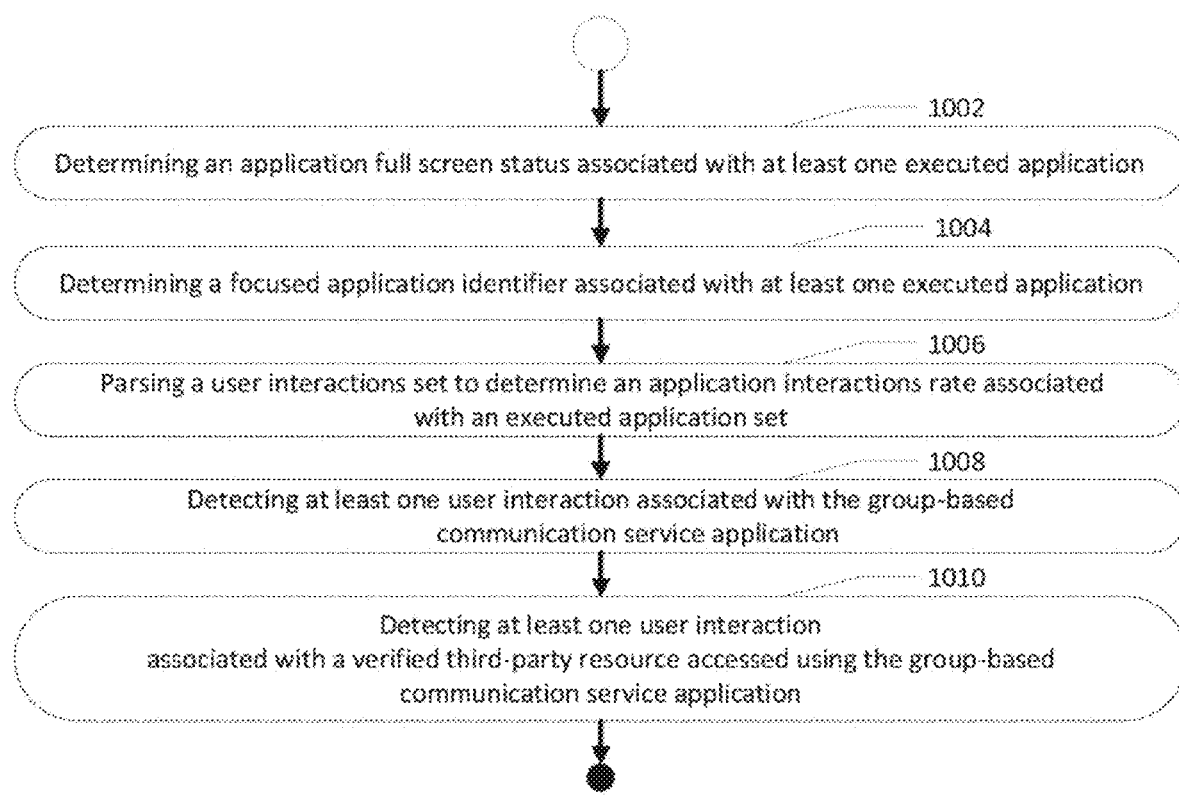
FIG. 10 illustrates a flowchart depicting example operations for managing a concentration mode associated with a client device, specifically, for detecting or otherwise receiving an application context signal set, in accordance with some example embodiments of the present disclosure.

FIG. 10 illustrates another flowchart depicting example operations for managing a concentration mode associated with a client device, in accordance with some example embodiments of the present disclosure. Specifically, the operations depicted with respect to FIG. 10 include operations for detecting or otherwise receiving an application context signal set. In this regard, some or all of the operations depicted with respect to FIG. 10 may replace, supplant, or occur concurrently or in addition to block 708 as depicted in FIG. 7, or block 808 as depicted in FIG. 8.

At block 1002, the apparatus 300 includes means, such as client group-based communication management module 310, client context-based concentration module 312, processor 302, and/or the like, or a combination thereof, for determining an application full screen status associated with at least one executed application. In some embodiments, the application full screen status for at least one executed application is determined by detecting a user interaction associated with setting an executed application to a full screen status, or detecting a user interaction associated with cancelling full screen status associated with an executed application.

In some embodiments, the application full screen status includes an electronic data value indicating whether a particular application executed on a client device is rendered to a display associated with the client device as a full screen application. In some embodiments, an executed application is a full screen application when the executed application is rendered occupying a majority of the display. Additionally or alternatively, in some embodiments, an executed application is a full screen application when the executed application is rendering in an exclusive full-screen rendering mode, which may be set automatically or by a user via the client device.

The full screen status of an executed application may be used in determining a focus level associated with a user, and for generating a corresponding application context-based concentration score and/or concentration mode activation indicator. For example, in some embodiments, if a full screened application is associated with a low concentration level (e.g., a video game application), the full screen status may lower the likelihood that the user is concentrating. Additionally or alternatively, if a full screened application is associated with a high concentration level (e.g., a word processing application), the full screen status may increase the likelihood that the user is concentrating. Additionally, in some embodiments, a full screen duration data object may be determined and used to generate a corresponding application context-based concentration determination score and/or concentration mode activation indicator. For example, as an application remains in a full-screened state, full screen status may increase the user's concentration level. For example, in some embodiments, a concentration level weight associated with the full screen status may increase based on a difference between the full screen status timestamp interval, representing a length of time an application has been in a full screened status, and a maximum concentration full screen threshold.

At block 1004, the apparatus 300 includes means, such as client group-based communication management module 310, client context-based concentration module 312, processor 302, and/or the like, or a combination thereof, for determining a focused application identifier associated with at least one executed application. The focused application identifier may be associated with an executed application that the user has focused, or in other words selected to engage with. In some embodiments, a concentration level associated with the focused application may be identified and used to adjust a concentration level associated with the user. For example, in some embodiments, if a focused application is associated with a high concentration level (e.g., a word processing application, the concentration level associated with the user may be increased. For example, an application context-based determination model may, during training, learn a weight associated with various focused executed applications and corresponding user concentration levels.

In some embodiments, the focused application identifier can include a string, number, or other identifier that uniquely identifies the software application being focused on a particular client device. In some embodiments, the focused software application is the software application currently receiving user input (e.g., via the client device and/or one or more associated peripheral devices, such as a mouse and/or keyboard).

At block 1006, the apparatus 300 includes means, such as client group-based communication management module 310, client context-based concentration module 312, input/output module 306, communications module 308, processor 302, and/or the like, or a combination thereof, for parsing a user interactions set to determine an application interactions rate associated with an executed application set. In some such embodiments, the apparatus 300 may detect a user interaction set associated with user interaction with all executed applications. Alternatively, in some such embodiments, the apparatus 300 may detect a user interaction set associated with user interaction with a particular executed application (e.g., one particular executed application of an executed applications set). The user interaction set may be parsed and/or analyzed to determine a number of keystrokes, taps, clicks, or other interactions performed by a user over a particular timestamp interval (e.g., within a minute, within 10 minutes, or the like).

In some embodiments, the application interactions rate includes an electronically managed number indicating a number of user actions performed via a client device or associated with one or more particular software applications within an associated timestamp interval. Examples of an application interaction rate include, without limitation, a number of keystrokes per timestamp interval, a number of clicks per timestamp interval, a number of voice commands per timestamp interval, or a combination thereof. In some embodiments, an application interactions rate is represented by a particular actions per minute value. In some embodiments, an application interactions rate is determined based on one or more user interactions set.

It should be appreciated that each user interaction in the user interactions set may include, or be associated with, data indicating at least the executed application(s) associated with the user interaction (e.g., in which application the interaction was performed, or which applications interacted during an action, or the like), a timestamp at which the interaction occurred, an interaction type identifier, and/or interaction detail data. The user interaction set may be associated with a particular user account or client device. Each of these data objects may be parsed and/or otherwise extracted from the user interaction set for analysis alone or in combination with one or more other data objects.

In some embodiments, a user interactions rate is associated with the user's concentration level. For example, if a user has a high interactions rate, they may be determined to have a higher concentration level. The weight of the interactions rate may further be based on the executed application associated with the user interactions set. For example, if the user is associated with a high interactions rate within a particular executed application associated with a high concentration level (e.g., a word processing application), the user may be more likely to be associated with a high concentration level. Similarly, a user associated with a low interactions rate may be determined to have a low concentration level. For example, an application context-based determination model may, during training, learn a weight associated with an overall application interactions rate and corresponding user concentration levels, and/or an application interactions rate associated with a particular executed application and corresponding user concentration levels.

At block 1008, the apparatus 300 includes means, such as client group-based communication management module 310, client context-based concentration module 312, input/output module 306, communications module 308, processor 302, and/or the like, or a combination thereof, for detecting at least one user interaction associated with a group-based communication service application. In some embodiments, user interaction(s) may be detected via one or more APIs. For example, in some embodiments, user interactions may be detected natively by an executed application. The group-based communication service application, for example, may be configured to detect such user interactions and store such user interactions in a user engagement set. The group-based communication service application may provide its own API for detecting the user interactions and/or retrieving stored user interactions.

Alternatively or additionally, in some embodiments, user interactions associated with the group-based communication service application may be detected using one or more operating system APIs. For example, the apparatus 300 may utilize one or more operating system APIs for detecting input received in response to user action, regardless of the target executed application meant to receive the user action. Additionally or alternatively, the apparatus may use one or more operating system APIs for detecting requests and/or processes that result from user action. For example, when a user has clicked to execute a particular application, a corresponding user interaction may be detected and/or data embodying the user interaction may be detected.

At block 1010, the apparatus 300 includes means, such as client group-based communication management module 310, client context-based concentration module 312, input/output module 306, communications module 308, processor 302, and/or the like, or a combination thereof, for detecting at least one user interaction associated with a verified third-party resource accessed using a group-based communication service application.

User interactions may similarly be detected for executed applications other than the group-based communication service application. For example, user interactions may be detected for any of the aforementioned executed applications, such as the executed applications 402 illustrated with respect to FIG. 4. The user interaction associated with a particular executed application may be detected via use of one or more custom APIs provided by the executed application, or via use of one or more operating system APIs as described above.

In example embodiments, the apparatus 300 may perform any of the above detection operations, and/or any combination of the above detection operations. In some embodiments, user interactions may be detected and analyzed one at a time as they are detected. In other embodiments user interactions may be detected and/or analyzed in batches, for example based on a particular timestamp interval (e.g., every 30 seconds, every minute, 15 minutes, or the like).

Figure 11:
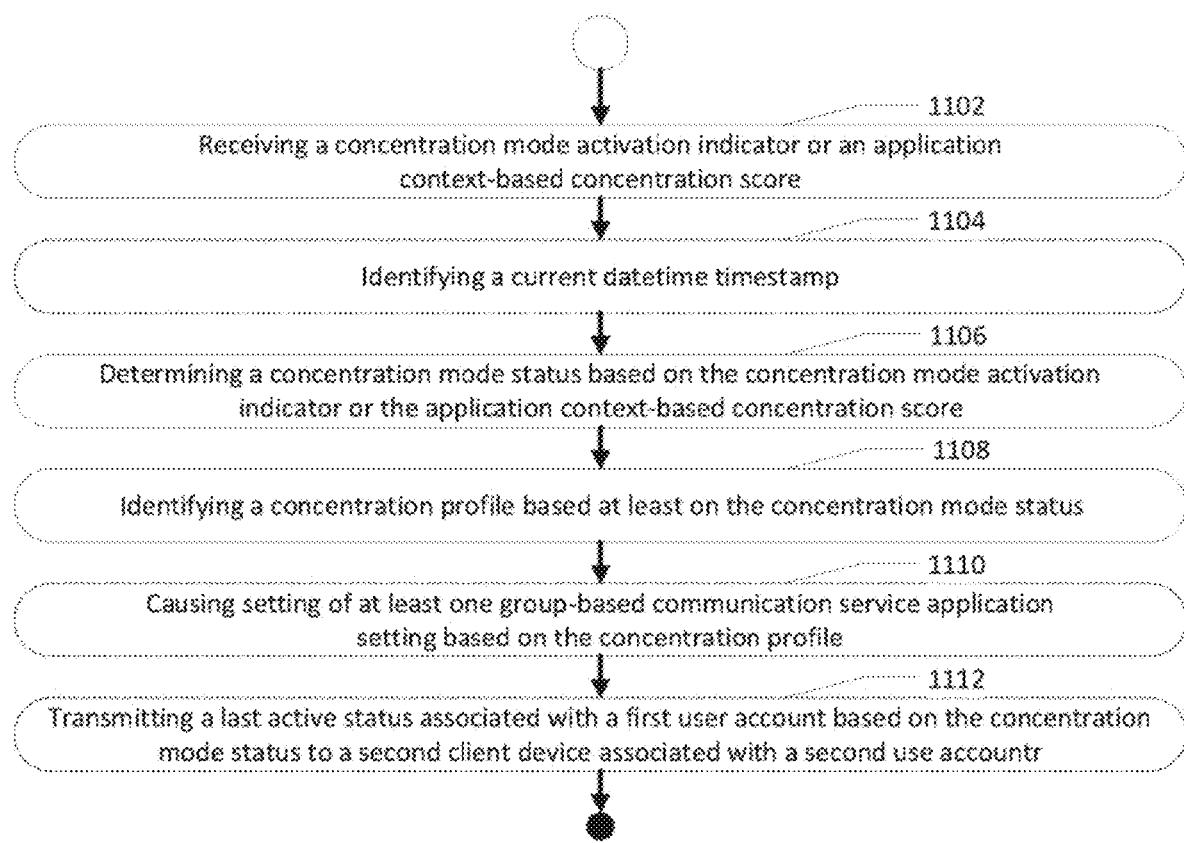
FIG. 11 illustrates a flowchart depicting example operations for managing a concentration mode associated with a client device, specifically, for causing concentration mode activation by setting one or more group-based communication application setting, in accordance with example embodiments of the present disclosure.

FIG. 11 illustrates another flowchart depicting example operations for managing a concentration mode associated with a client device, in accordance with some example embodiments of the present disclosure. Specifically, the operations depicted with respect to FIG. 11 include operations for causing concentration mode activation by setting one or more group-based communication service application setting. In this regard, the operations depicted, in some embodiments, are performed by entirely by a client device, entirely by a group-based communication system, or a combination thereof. For example, in some embodiments, some or all of the operations depicted are performed by a client device embodied by the apparatus 300. In some embodiments, some or all of the operations depicted are performed by a group-based communication system embodied by the apparatus 200. In yet other embodiments, some of the operations are performed by the apparatus 300 and others are performed by the apparatus 200.

At block 1102, the apparatus 300 includes means, such as client group-based communication management module 310, client context-based concentration module 312, communications module 308, processor 302, and/or the like, or a combination thereof, or the apparatus 200 includes means, such as database management module 210, group-based communication management module 212, concentration analysis module 214, input/output module 206, communications module 208, processor 202, and/or the like, or a combination thereof, for receiving a concentration mode activation indicator or an application context-based concentration score. In some embodiments, the apparatus 300 or apparatus 200 may detect an application context signal set, and generate the concentration mode activation indicator or application context-based concentration score based on the detected application context signal set. Alternatively, in some embodiments, the apparatus 200 may receive the concentration mode activation indicator or application context-based concentration score from the apparatus 300 embodying the client device.

At block 1104, the apparatus 300 includes means, such as client group-based communication management module 310, client context-based concentration module 312, communications module 308, processor 302, and/or the like, or a combination thereof, or the apparatus 200 includes means, such as database management module 210, group-based communication management module 212, concentration analysis module 214, input/output module 206, communications module 208, processor 202, and/or the like, or a combination thereof, for identifying a current datetime timestamp. In some embodiments, the apparatus 300 or apparatus 200 may be configured to identify the current datetime timestamp using an API provided by the operating system, one or more applications, or a programming environment (e.g., provided by one or more programming language implementations).

In some embodiments, the current datetime timestamp includes an electronic representation of the current system or network time and date. In some embodiments, a current datetime timestamp is retrievable using one or more APIs. For example, in some embodiments, the current datetime timestamp can be retrieved using an operating system API, an executed application API, or a programming language specific API.

At block 1106, the apparatus 300 includes means, such as client group-based communication management module 310, client context-based concentration module 312, communications module 308, processor 302, and/or the like, or a combination thereof, or the apparatus 200 includes means, such as database management module 210, group-based communication management module 212, concentration analysis module 214, input/output module 206, communications module 208, processor 202, and/or the like, or a combination thereof, for generating a concentration mode status based on the concentration mode activation indicator or the application context-based concentration score. In some embodiments, the generate concentration mode status is an activated status when the concentration mode activation indicator matches an activated status. Alternatively, the concentration mode status may match any status represented by the concentration mode activation indicator.

In yet some other embodiments, the apparatus 300 or apparatus 200 is configured to generate the concentration mode status by comparing the application context-based concentration score to a concentration threshold generate a concentration mode status. For example, in some embodiments, the generated concentration mode status is an activated status when the application context-based concentration score satisfies (for example in some embodiments by exceeding, or in some embodiments not exceeding) the concentration threshold.

In some embodiments, the concentration threshold may be predetermined. In other embodiments, the concentration threshold may be predetermined by the apparatus 200 or apparatus 300. In other embodiments, the concentration threshold may be generated using a concentration threshold generation model. The concentration threshold generation model may be trained to generate a concentration threshold that, when satisfied, indicates a corresponding user is concentrating at a particular level such that a concentration mode should be activated. in some embodiments, multiple concentration thresholds may be determined and/or generated, for example where a user may be associated with no concentration, a lower concentration level, a moderate concentration mode, and a high concentration mode.

At block 1108, the apparatus 300 includes means, such as client group-based communication management module 310, client context-based concentration module 312, communications module 308, processor 302, and/or the like, or a combination thereof, or the apparatus 200 includes means, such as database management module 210, group-based communication management module 212, concentration analysis module 214, input/output module 206, communications module 208, processor 202, and/or the like, or a combination thereof, for identifying a concentration profile based at least the concentration mode status. In some embodiments, for example, the apparatus 200 and/or apparatus 300 may store a concentration profile associated with each possible concentration mode status. In an example embodiment where concentration mode activation is binary, the apparatus 200 and/or apparatus 300 may store a concentration profile for a deactivated status, and a second concentration profile for an activated status. In other embodiments, for example where more than two concentration mode statuses are used, a concentration profile may be stored associated with each status.

In some embodiments, a concentration profile includes a group-based communication service application setting set associated with a corresponding application context-based concentration score. In some embodiments, additionally or alternatively, a concentration profile is associated with a timestamp interval (e.g., a particular day, month, year, season, calendar quarter, or the like). In some embodiments, a group-based communication service application being accessed by a user account is configured to set one or more group-based communication service application setting values set based on the values defined by a concentration profile corresponding to the application context-based concentration score associated with the user account. In some embodiments, a user account is associated with a concentration mode concentration profile and a non-concentration mode concentration profile. In other embodiments, a user account is associated with a myriad of concentration profiles, for example a concentration profile for each encoded representation from a predefined set of encoded representations associated with a user account.

In some embodiments, a group-based communication service application setting includes an electronically managed rule for managing rendering of communications, associated notification information, and/or alert settings, to a group-based communication service application executed via a client device. The term "group-based communication service application setting set" refers to zero or more group-based communication service application setting(s) in a structured or unstructured order.

Each concentration profile may be associated with one or more values for one or more group-based communication service application settings. For example, the concentration profile may include values for a group-based communication service application setting set associated with modifying renderings associated with a group-based communication interface. For example, the settings may change the background of the group-based communication interface, apply a visual effect to the group-based communication interface, or the like.

In some embodiments, the concentration profile(s) may be configurable by a user. For example, in some embodiments, a user may, via the apparatus 300, create a new concentration profile and assign one or more group-based communication service application settings to the concentration profile, each setting associated with a corresponding value. Additionally or alternatively, the apparatus 300 may provide functionality for editing one or more existing concentration profiles. For example, group-based communication service application settings may be assigned to or removed from the concentration profile, and/or corresponding values may be set by the user. Additionally or alternatively, in some embodiments, the user may provide, for example via the apparatus 300, a concentration threshold associated with the concentration profile, or a minimum concentration threshold and a maximum concentration threshold for use in identifying such concentration profiles.

Additionally or alternatively, in some embodiments, the settings may be associated with rendering notification information for newly received group-based communications. For example, a group-based communication service application setting may be set while concentration mode is activated (or a particular concentration mode status is set) for rendering notification information only for group-based communications of a certain type (e.g., tagged communications). In some embodiments, as a concentration mode status is set for higher concentration levels, one or more settings may be adjusted for rendering notification information associated with less newly received group-based communications. For example, notification information may be rendered for all group-based communication types when concentration mode is inactive, notification information may be rendered for a first subset of group-based communication types in a concentration mode status associated with a low concentration level, notification information may be rendered for a smaller subset of group-based communication types in a concentration mode status associated with a moderate concentration level, and no notification information may be rendered for any group-based communications in a concentration mode status associated with a high concentration level.

The apparatus 200 and/or apparatus 300 may be configured to generate each concentration profile for the user account. For example, the apparatus 200 and/or apparatus 300 may store user interactions associated with received group-based communications. In an example context, the interactions may be analyzed to determine a group-based communication type set that the user interacts with above a certain threshold percentage (e.g., what communications are interacted with above 50% when received, above 70% when received, or the like) at different focus levels. The apparatus 200 and/or apparatus 300 may then generate group-based communication service application setting values based on the analysis such that, for each concentration mode status, a concentration profile is created with group-based communication service application settings values that enable rendering of notification information for group-based communications that the user is likely to respond to based on the analysis.

At block 1110, the apparatus 300 includes means, such as client group-based communication management module 310, client context-based concentration module 312, communications module 308, processor 302, and/or the like, or a combination thereof, or the apparatus 200 includes means, such as database management module 210, group-based communication management module 212, concentration analysis module 214, input/output module 206, communications module 208, processor 202, and/or the like, or a combination thereof, for transmitting a last active status associated with a first user, based on the concentration mode status to a second client associated with a second user account. For example, when concentration mode is set to an active status (e.g. any status other than inactive), the apparatus 200 and/or apparatus 300 may store the timestamp at the time the concentration mode is set to inactive. The timestamp may be associated with the user account for the client device as the last active status, which may be stored associated with the user account.

In some embodiments, the last active status includes a timestamp and/or status associated with a user account corresponding to a client device that indicates the user account was not associated with an activated concentration mode status. In some embodiments, the last active status indicates the timestamp that concentration mode was deactivated and is updated, for example continuously or at a predefined timestamp interval (e.g., every minute) until concentration mode is activated.

The last active status may be transmitted to one or more client devices associated with other users that communicate with, or otherwise are associated with, the user account linked to the last active status. For example, the apparatus 200 and/or apparatus 300 may identify one or more user accounts that are also members of group-based communication interfaces shared by the user account associated with the last active status. The last active status may be transmitted to client devices associated with the one or more identified user accounts to cause rendering of the last active status associated with the user account, such that each user identified as related may see when a user is not concentrated.

Figure 12:
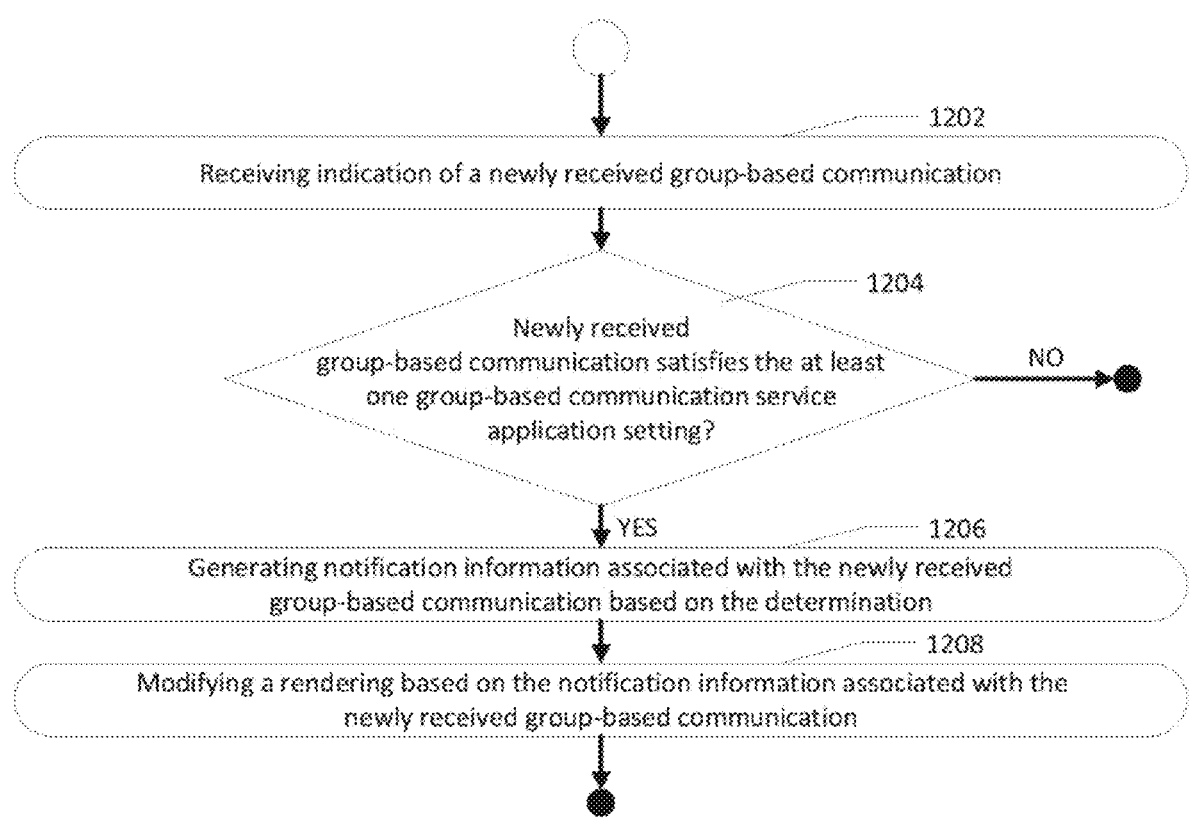
FIG. 12 illustrates a flowchart depicting example operations for managing a concentration mode associated with a client device, specifically for rendering group-based communication notification information associated with newly received group-based communications based on a set concentration mode, in accordance with example embodiments of the present disclosure.

FIG. 12 illustrates another flowchart depicting example operations for managing a concentration mode associated with a client device, in accordance with some example embodiments of the present disclosure. Specifically, the operations depicted with respect to FIG. 12 include operations for rendering group-based communication notification information associated with newly received group-based communications based on a set concentration mode. In this regard, the operations depicted with respect to FIG. 12 may be combined with one or more of the operations of the remaining flowcharts for managing a concentration mode associated with a client device.

In this regard, the operations depicted, in some embodiments, are performed by entirely by a client device, entirely by a group-based communication system, or a combination thereof. For example, in some embodiments, some or all of the operations depicted are performed by a client device embodied by the apparatus 300. In some embodiments, some or all of the operations depicted are performed by a group-based communication system embodied by the apparatus 200. In yet other embodiments, some of the operations are performed by the apparatus 300 and others are performed by the apparatus 200.

At block 1202, the apparatus 300 includes means, such as client group-based communication management module 310, client context-based concentration module 312, communications module 308, processor 302, and/or the like, or a combination thereof, or the apparatus 200 includes means, such as database management module 210, group-based communication management module 212, concentration analysis module 214, input/output module 206, communications module 208, processor 202, and/or the like, or a combination thereof, for receiving an indication of a newly received group-based communication. In some embodiments, a newly received group-based communication is received from another user account permissioned to communicate within a particular group-based communication interface and group-based communication channel. For example, a second user account may post a group-based communication within a particular group-based communication channel via a second client device. The first user account, upon authenticating user account details and beginning an authenticated session, may access the group-based communication channel via the first client device (e.g., to render a group-based communication channel interface within the group-based communication interface) and receive all newly posted group-based communications. The apparatus 300 may store the received group-based communication received from the client device associated with the second user account. Further, the apparatus 300 may retrieve and transmit the retrieved group-based communications to the client device associated with the first user account.

At decision block 1204, the apparatus 300 includes means, such as client group-based communication management module 310, client context-based concentration module 312, communications module 308, processor 302, and/or the like, or a combination thereof, or the apparatus 200 includes means, such as database management module 210, group-based communication management module 212, concentration analysis module 214, input/output module 206, communications module 208, processor 202, and/or the like, or a combination thereof, to determine whether the newly received group-based communication satisfies at least one group-based communication service application setting. In an example context, the group-based communication service application setting may be satisfied based on communication contents, the communication sender identifier, communication type, or a combination thereof. For example, in some embodiments, a group-based communication service application setting may be set to a value such that only a particular subset of group-based communication types satisfy the setting. Alternatively or additionally, a second group-based communication service application setting may be set such that only group-based communications from a particular user account satisfy the setting. It should be appreciated that a group-based communication service application setting may be embody any check, transformation, or the like associated with any metadata, content data, or other data associated with a group-based communication. The particular example settings described herein are for example and descriptive purposes, and not to limit the scope and spirit of the disclosure.

If, at block 1204, the apparatus 200 and/or apparatus 300 determines the group-based communication does not satisfy the at least one group-based communication service application setting, the flow may end and no notification information may be rendered for the group-based communication. In this regard, notification information may only be generated based on the setting values, for example set associated with a concentration profile associated with a currently set concentration mode.

If, at block 1204, the apparatus 200 and/or apparatus 300 determines the group-based communication satisfies the at least one group-based communication service application setting, flow continues to block 1206. At block 1206, the apparatus 300 includes means, such as client group-based communication management module 310, client context-based concentration module 312, communications module 308, processor 302, and/or the like, or a combination thereof, or the apparatus 200 includes means, such as database management module 210, group-based communication management module 212, concentration analysis module 214, input/output module 206, communications module 208, processor 202, and/or the like, or a combination thereof, for generating notification information associated with the newly received group-based communication. In some embodiments, the apparatus 200 and/or apparatus 300 may be configured to identify summary information associated with the group-based communication. The summary information may include at least a communication sender identifier, communication text, and a communication transmission timestamp, for example. The summary information may be provided for rendering to the group-based communication service application, or via an operating system of the apparatus 200. For example, the summary information may be rendered as a desktop notification or push notification via the client device embodied by apparatus 300.

At block 1208, the apparatus 300 includes means, such as client group-based communication management module 310, client context-based concentration module 312, communications module 308, processor 302, and/or the like, or a combination thereof, or the apparatus 200 includes means, such as database management module 210, group-based communication management module 212, concentration analysis module 214, input/output module 206, communications module 208, processor 202, and/or the like, or a combination thereof, for modifying a rendering based on the notification information associated with the newly received group-based communication. In some embodiments, the notification information may be rendered above the group-based communication interface, or rendered to a notifications section of the group-based communication interface.

Figure 13:
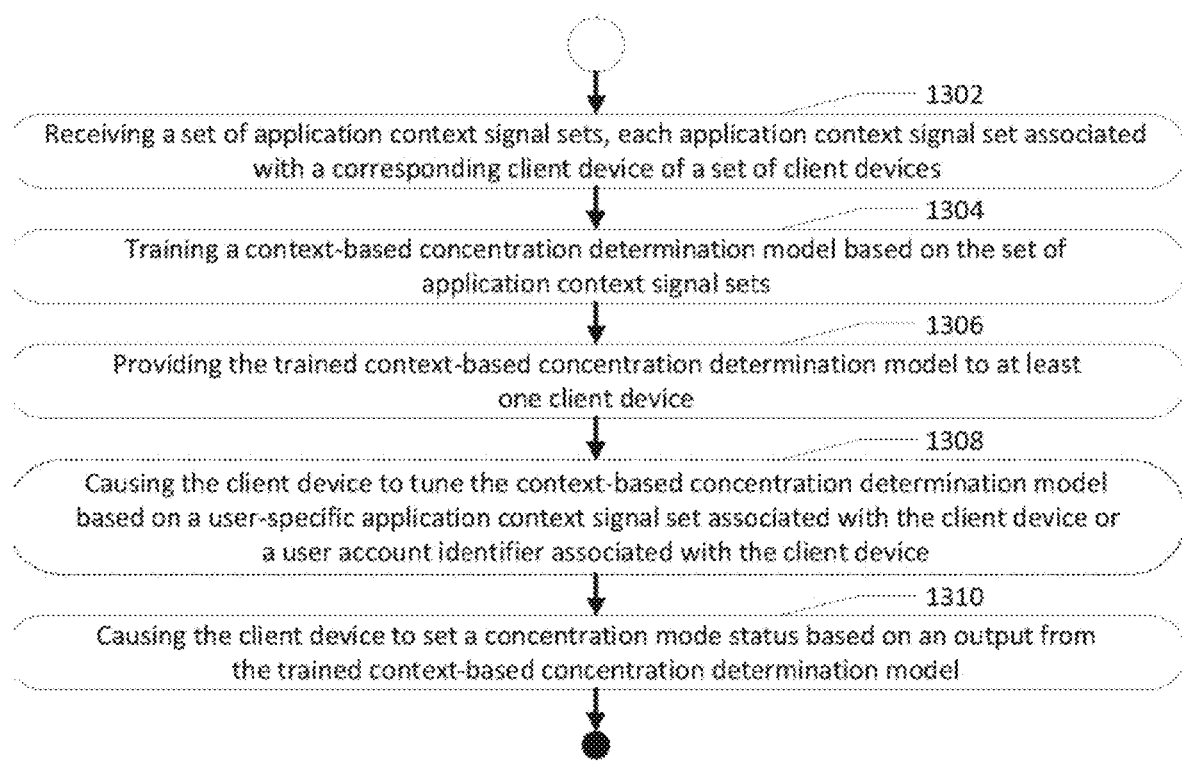
FIG. 13 illustrates a flowchart depicting example operations for managing a concentration mode associated with a client device, specifically for training a context-based concentration determination model for use in setting a concentration mode status, in accordance with example embodiments of the present disclosure.

FIG. 13 illustrates another flowchart depicting example operations for managing a concentration mode associated with a client device, in accordance with some example embodiments of the present disclosure. Specifically, the operations depicted with respect to FIG. 13 include operations for training a context-based concentration determination model for use in setting a concentration mode status. The operations depicted with respect to FIG. 13, in some embodiments, are performed by a group-based communication system, for example embodied by the apparatus 200. The apparatus 200 may be in communication with a client device, which may be embodied by the apparatus 300.

At block 1302, the apparatus 200 includes means, such as database management module 210, group-based communication management module 212, concentration analysis module 214, input/output module 206, communications module 208, processor 202, and/or the like, or a combination thereof, for receiving a set of application context signal sets, each application context signal set associated with a corresponding client device of a set of client devices. In some embodiments, the apparatus 200 may be associated with a client device set for various user accounts. Each client device, in an example context, may be embodied by an instance of the apparatus 300. Each client device may detect an application context signal set corresponding to the user account associated with the user device. For example, the set of application context signal sets may include a first application context signal set detected via a first client device, and a second application context signal set detected via a second client device. Any number of application context signal sets may be received associated with any number of client devices.

Each user device may transmit its detected application context signal set, or a subset and/or modified version of the application context signal set, to the apparatus 200. In some embodiments, the application context signal set received from one or more client devices may be anonymized, such that information identifying the user account and/or user associated with the application context signal set is removed. In this regard, the received application context signal set may be analyzed without compromising user privacy, for example for use as training data for training a context-based concentration determination model. Alternatively or additionally, summary information associated with the detected application context signal set may be sent. For example, the application context signal set may include interactions associated with particular executed application types rather instead of specific applications, to further enhance user privacy.

At block 1304, the apparatus 200 includes means, such as database management module 210, group-based communication management module 212, concentration analysis module 214, input/output module 206, communications module 208, processor 202, and/or the like, or a combination thereof, for training a context-based concentration determination model based on the set of application context signal sets. In some embodiments, the context-based concentration determination model is embodied by one or more machine learning models. The context-based concentration determination model may be trained using any of a number of supervised learning implementations, or any of a number of unsupervised learning implementations. The context-based concentration determination model may be trained to minimize error between predictions generated using an application context signal set, or a subset thereof, and a labelled and/or otherwise enumerated concentration mode status. Alternatively, the context-based concentration determination model may be trained to cluster and/or classify application context signal set(s), or portions thereof, to associate them with a corresponding concentration mode status.

At block 1306, the apparatus 200 includes means, such as database management module 210, group-based communication management module 212, concentration analysis module 214, input/output module 206, communications module 208, processor 202, and/or the like, or a combination thereof, for providing the trained context-based determination model to at least one client device. In some embodiments, the apparatus 200 may transmit the trained context-based determination model to each client device connected to and/or otherwise communicable with the apparatus 200. The trained context-based determination model may have been trained, for example at block 1304, based on aggregate application context signal set(s) associated with each connected client device, or a subset thereof. The apparatus 200 may cause each client device, for example each embodied by an implementation of the apparatus 300, to store the trained context-based determination model for subsequent use.

At optional block 1308, the apparatus 200 includes means, such as database management module 210, group-based communication management module 212, concentration analysis module 214, input/output module 206, communications module 208, processor 202, and/or the like, or a combination thereof, for causing the client device to tune the context-based concentration determination model based on a user-specific application context signal set associated with the client device. For example, each client device may be caused to retrieve a user-specific application context signal set detected via the client device, such as a user-specific application context signal set stored on the client device. The context-based concentration determination model may be tuned by further training the context-based concentration determination model or otherwise adjusting one or more weights of the context-based concentration determination model based on the user-specific application context signal set.

At block 1310, the apparatus 200 includes means, such as database management module 210, group-based communication management module 212, concentration analysis module 214, input/output module 206, communications module 208, processor 202, and/or the like, or a combination thereof, for causing a client device, for example of the client device set, to set a concentration mode status based on an output from the trained context-based concentration determination model. In some embodiments, one or more of the client devices may generate an application context-based concentration score using the trained context-based concentration determination model, and use the application context-based concentration score to generate a concentration mode. For example, client device may be caused to set a concentration mode status via the process described above with respect to FIG. 7. In other embodiments, one or more of the client devices may be caused to generate a concentration mode activation indicator using the trained context-based concentration determination model, and use the concentration mode activation indicator to generate a concentration mode status. For example, a client device may be caused to set a concentration mode status via the process described above with respect to FIG. 8.

Figure 14:
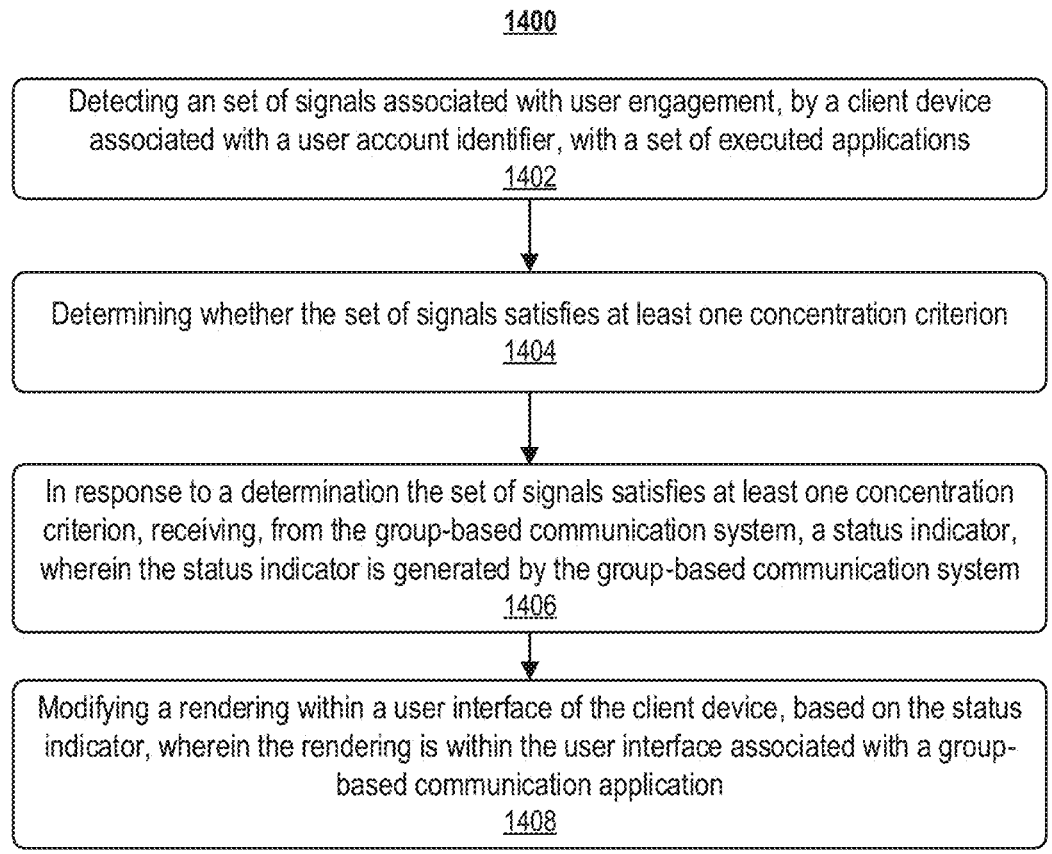
FIG. 14 illustrates a flowchart depicting example operations for managing a concentration mode associated with a client device, in accordance with example embodiments of the present disclosure.

FIG. 14 illustrates an exemplary computer-implemented method for managing an concentration mode. At block 1402, the system (e.g., one or more electronic devices) detects an set of signals associated with user engagement, by a client device associated with a user account identifier, with a set of executed applications; at block 1404, the system determines whether the set of signals satisfies at least one concentration criterion; at block 1406, the system, in response to a determination the set of signals satisfies at least one concentration criterion, receives, from the group-based communication system, a status indicator, wherein the status indicator is generated by the group-based communication system; at block 1408, the system modifies a rendering within a user interface of the client device, based on the status indicator, wherein the rendering is within the user interface associated with a group-based communication application.

Figure 15:
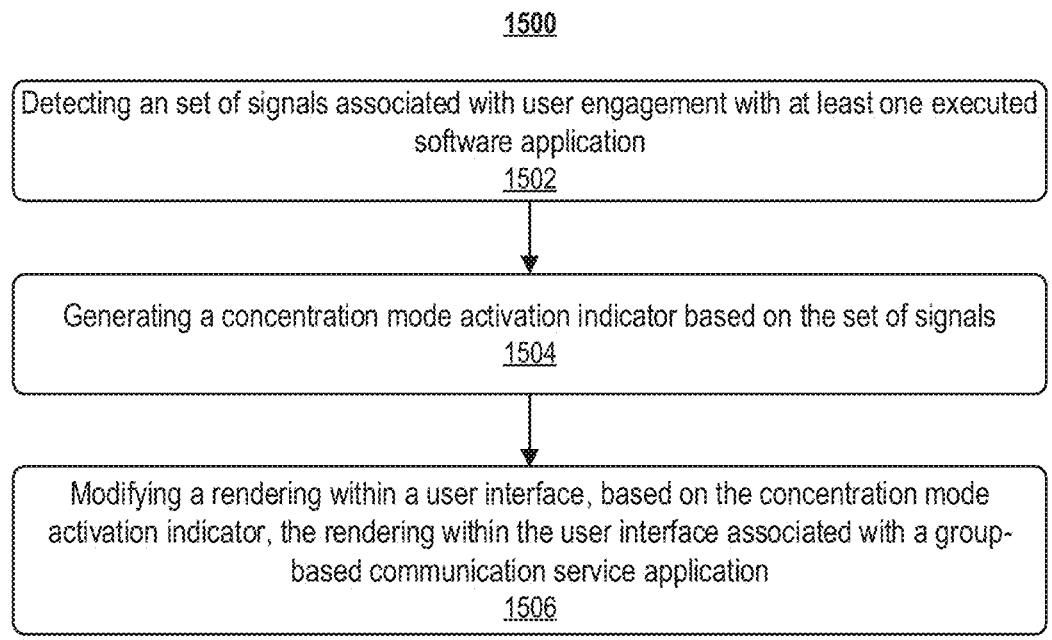
FIG. 15 illustrates a flowchart depicting example operations for managing a concentration mode associated with a client device, in accordance with example embodiments of the present disclosure.

FIG. 15 illustrates an exemplary computer-implemented method for managing an concentration mode. At block 1502, the system (e.g., one or more electronic devices) detects an set of signals associated with user engagement with at least one executed software application; at block 1504, the system generates a concentration mode activation indicator based on the set of signals; at block 1506, the system modifies a rendering within a user interface, based on the concentration mode activation indicator, the rendering within the user interface associated with a group-based communication application.

Figure 16:
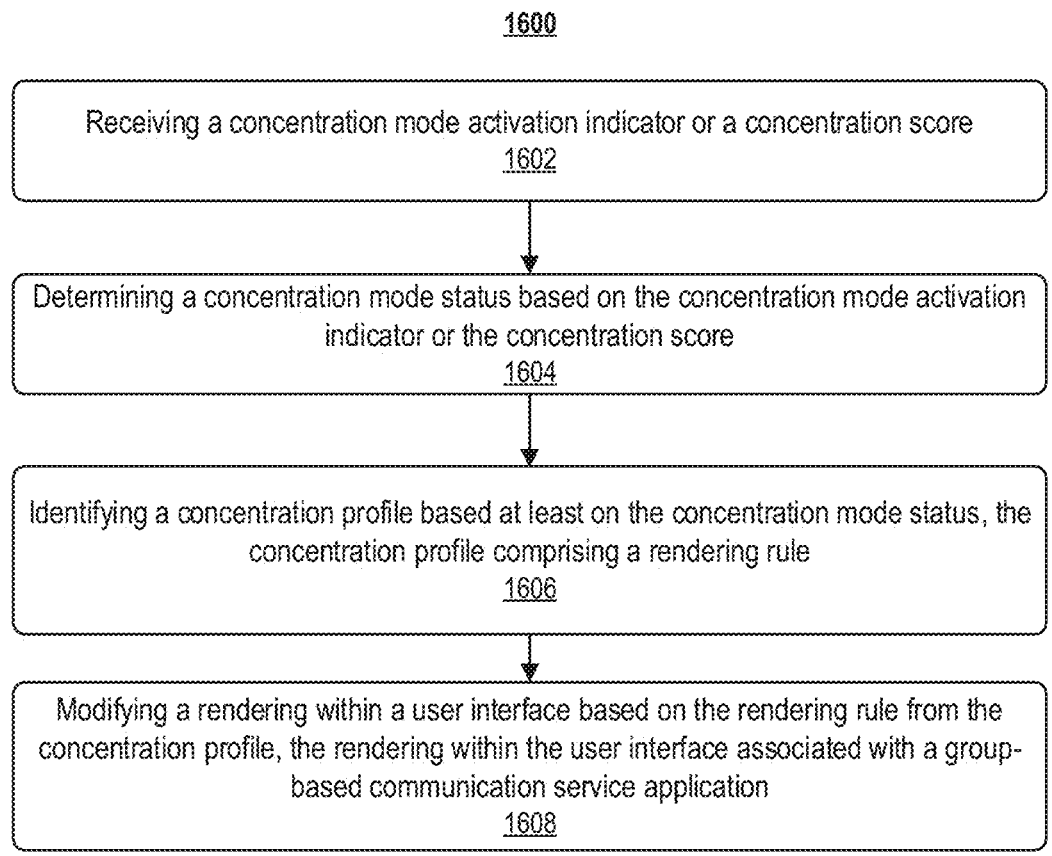
FIG. 16 illustrates a flowchart depicting example operations for managing a concentration mode associated with a client device, in accordance with example embodiments of the present disclosure.

FIG. 16 illustrates an exemplary computer-implemented method for managing an concentration mode. At block 1602, the system (e.g., one or more electronic devices) receives a concentration mode activation indicator or a concentration score; at block 1604, the system determines a concentration mode status based on the concentration mode activation indicator or the concentration score; at block 1606, the system identifies a concentration profile based at least on the concentration mode status, the concentration profile comprising a rendering rule; at block 1608, the system modifies a rendering within a user interface based on the rendering rule from the concentration profile, the rendering within the user interface associated with a group-based communication application.

Figure 17:
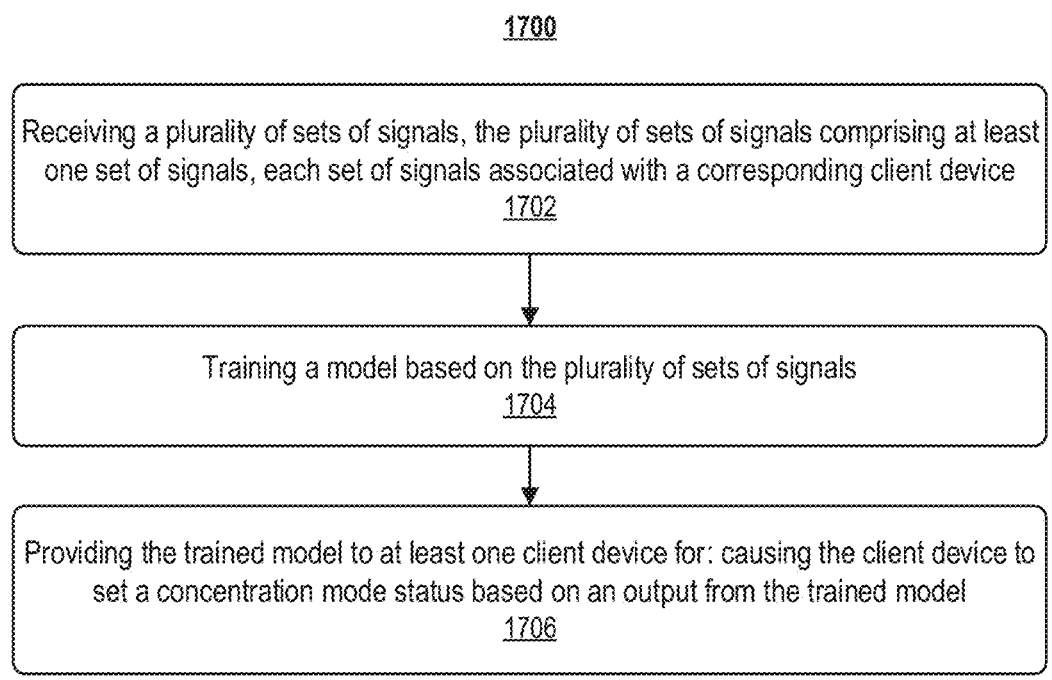
FIG. 17 illustrates a flowchart depicting example operations for managing a concentration mode associated with a client device, in accordance with example embodiments of the present disclosure.

FIG. 17 illustrates an exemplary computer-implemented method for managing an concentration mode. At block 1702, the system (e.g., one or more electronic devices) receives a plurality of sets of signals, the plurality of sets of signals comprising at least one set of signals, each set of signals associated with a corresponding client device; at block 1704, the system trains a model based on the plurality of sets of signals; at block 1706, the system provides the trained model to at least one client device for: causing the client device to set a concentration mode status based on an output from the trained model.

CONCLUSION

In some embodiments, some of the operations above may be modified or further amplified. Furthermore, in some embodiments, additional optional operations may be included. Modifications, amplifications, or additions to the operations above may be performed in any order and in any combination.

Many modifications and other embodiments of the disclosure set forth herein will come to mind to one skilled in the art to which this disclosure pertain having the benefit of the teachings presented in the foregoing description and the associated drawings. Therefore, it is to be understood that the embodiments of the disclosure herein are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. An apparatus for managing a concentration mode, the apparatus comprising at least one processor and at least one memory, the at least one memory having computer-coded instructions therein, the computer-coded instructions configured to, in execution with the at least one processor, cause the apparatus to:

detect a set of context signals associated with user engagement for a user of a group-based communication system with a set of executed applications, a context signal of the set of context signals corresponding to a timestamp at which time a respective user engagement occurred, and wherein an application of the set of executed applications corresponds to a respective concentration level indicator;

generate a concentration score corresponding to a particular timestamp interval for the set of context signals, the concentration score generated based at least in part on a first weight for a first interaction rate for the user with a first application, the first weight corresponding to a first concentration level indicator for the first application, and a second weight for a second interaction rate for the user with a second application, the second weight corresponding to a second concentration level indicator for the second application, wherein the second concentration level indicator is different from the first concentration level indicator;

determine whether the concentration score corresponding to the particular timestamp interval satisfies at least one concentration criterion;

in response to a determination that the concentration score satisfies the at least one concentration criterion, receive, from the group-based communication system, a status indicator associated with the user, wherein the status indicator associated with the user is generated by the group-based communication system; and automatically modify, based on the status indicator associated with the user, a rendering within a user interface belonging to the user of the group-based communication system.

2. The apparatus of claim 1, wherein determining whether the concentration score corresponding to the particular timestamp interval satisfies the at least one concentration criterion comprises at least one of:

identifying an output from a model based on the concentration score;

determining an application full screen status associated with at least one executed application of the set of executed applications; and determining a focused application identifier.

3. The apparatus of claim 1, wherein, to automatically modify the rendering within the user interface, the apparatus is configured to:

determine the status indicator associated with the user represents an activated status; and in response to determining that the status indicator associated with the user represents the activated status, update the rendering within the user interface.

4. The apparatus of claim 1, wherein, to generate the concentration score, the apparatus is configured to:

identify a trained model based on a user account identifier of the user, the set of executed applications, or a combination thereof, and apply the set of context signals to the trained model to generate the concentration score.

5. The apparatus of claim 1, wherein to detect at least a portion of the set of context signals, the apparatus is configured to:

parse a set of user interactions to determine an application interactions rate associated with the set of executed applications.

6. The apparatus of claim 1, wherein to detect at least a portion of the set of context signals, the apparatus is configured to:

detect at least one context signal comprising a user interaction associated with an external resource accessed using the group-based communication system;

generate a set of user interactions comprising the at least one context signal; and store the set of user interactions associated with the group-based communication system or associated with a user account identifier of the user.

7. The apparatus of claim 1, wherein the apparatus is further configured to:

render a signal gathering approval interface;

receive a signal gathering authentication in response to additional user engagement, via the group-based communication system, with the signal gathering approval interface; and store, in a user approval database, the signal gathering authentication associated with the group-based communication system or associated with a user service account for the user.

8. A computer-implemented method for managing a concentration mode, the computer-implemented method comprising:

detecting a set of context signals associated with user engagement for a user of a group-based communication system with a set of executed applications, a context signal of the set of context signals corresponding to a timestamp at which time a respective user engagement occurred, and wherein an application of the set of executed applications corresponds to a respective concentration level indicator;

generating a concentration score corresponding to a particular timestamp interval for the set of context signals, the concentration score generated based at least in part on a first weight for a first interaction rate for the user with a first application, the first weight corresponding to a first concentration level indicator for the first application, and a second weight for a second interaction rate for the user with a second application, the second weight corresponding to a second concentration level indicator for the second application, wherein the second concentration level indicator is different from the first concentration level indicator;

determining whether the concentration score corresponding to the particular timestamp interval satisfies at least one concentration criterion;

in response to a determination that the concentration score satisfies the at least one concentration criterion, receiving, from the group-based communication system, a status indicator associated with the user, wherein the status indicator associated with the user is generated by the group-based communication system; and automatically modifying, based on the status indicator associated with the user, a rendering within a user interface belonging to the user of the group-based communication system.

9. The computer-implemented method of claim 8, wherein determining whether the concentration score corresponding to the particular timestamp interval satisfies the at least one concentration criterion comprises at least one of:

identifying an output from a model based on the concentration score;

determining an application full screen status associated with at least one executed application of the set of executed applications; and determining a focused application identifier.

10. The computer-implemented method of claim 8, wherein automatically modifying the rendering within the user interface comprises:

determining the status indicator associated with the user represents an activated status; and in response to determining that the status indicator associated with the user represents the activated status, updating the rendering within the user interface.

11. The computer-implemented method of claim 8, wherein, to generate the concentration score, the computer-implemented method comprises:

identifying a trained model based on a user account identifier of the user, the set of executed applications, or a combination thereof; and applying the set of context signals to the trained model to generate the concentration score.

12. The computer-implemented method of claim 8, wherein receiving at least a portion of the set of context signals comprises:

parsing a set of user interactions to determine an application interactions rate associated with the set of executed applications.

13. The computer-implemented method of claim 8, wherein receiving at least a portion of the set of context signals comprises:
   detecting at least one context signal comprising a user interaction associated with an external resource accessed using the group-based communication system;
   generating a set of user interactions comprising the at least one context signal; and
   storing the set of user interactions associated with the group-based communication system or associated with a user account identifier of the user.

14. The computer-implemented method of claim 8, further comprising:
   rendering a signal gathering approval interface;
   receiving a signal gathering authentication in response to additional user engagement, via the group-based communication system, with the signal gathering approval interface; and
   storing, in a user approval database, the signal gathering authentication associated with the group-based communication system or associated with a user service account for the user.

15. A non-transitory computer-readable storage medium storing one or more programs, the one or more programs comprising instructions, which when executed by one or more processors of an electronic device having a display, cause the electronic device to:
   detect a set of context signals associated with user engagement for a user of a group-based communication system with a set of executed applications, a context signal of the set of context signals corresponding to a timestamp at which time a respective user engagement occurred, and wherein an application of the set of executed applications corresponds to a respective concentration level indicator;
   generate a concentration score corresponding to a particular timestamp interval for the set of context signals, the concentration score generated based at least in part on a first weight for a first interaction rate for the user with a first application, the first weight corresponding to a first concentration level indicator for the first application, and a second weight for a second interaction rate for the user with a second application, the second weight corresponding to a second concentration level indicator for the second application, wherein the second concentration level indicator is different from the first concentration level indicator;
   determine whether the concentration score corresponding to the particular timestamp interval satisfies at least one concentration criterion;
   in response to a determination that the concentration score satisfies the at least one concentration criterion, receive, from the group-based communication system, a status indicator associated with the user, wherein the status indicator associated with the user is generated by the group-based communication system; and
   automatically modify, based on the status indicator associated with the user, a rendering within a user interface belonging to the user of the group-based communication system.

16. The non-transitory computer-readable storage medium of claim 15, wherein determining whether the concentration score corresponding to the particular timestamp interval satisfies the at least one concentration criterion comprises at least one of:
   identifying an output from a model based on the concentration score;
   determining an application full screen status associated with at least one executed application of the set of executed applications; and
   determining a focused application identifier.

17. The non-transitory computer-readable storage medium of claim 15, wherein, to automatically modify the rendering within the user interface, the instructions cause the electronic device to:
   determine the status indicator associated with the user represents an activated status; and
   in response to determining that the status indicator associated with the user represents the activated status, update the rendering within the user interface.

18. The non-transitory computer-readable storage medium of claim 15, wherein, to generate the concentration score, the instructions cause the electronic device to:
   identify a trained model based on a user account identifier of the user, the set of executed applications, or a combination thereof; and
   apply the set of context signals to the trained model to generate the concentration score.

19. The non-transitory computer-readable storage medium of claim 15, wherein to detect at least a portion of the set of context signals, the instructions cause the electronic device to:
   parse a set of user interactions to determine an application interactions rate associated with the set of executed applications.

20. The non-transitory computer-readable storage medium of claim 15, wherein the instructions cause the electronic device to:
   render a signal gathering approval interface;
   receive a signal gathering authentication in response to additional user engagement, via the group-based communication system, with the signal gathering approval interface; and
   store, in a user approval database, the signal gathering authentication associated with the group-based communication system or associated with a user service account for the user.

* * * * *